US011977386B2

(12) United States Patent
Hari et al.

(10) Patent No.: US 11,977,386 B2
(45) Date of Patent: May 7, 2024

(54) ADVERSARIAL SCENARIOS FOR SAFETY TESTING OF AUTONOMOUS VEHICLES

(71) Applicant: NVIDIA Corp., Santa Clara, CA (US)

(72) Inventors: Siva Kumar Sastry Hari, Sunnyvale, CA (US); Iuri Frosio, San Jose, CA (US); Zahra Ghodsi, New York, NY (US); Anima Anandkumar, Santa Clara, CA (US); Timothy Tsai, Santa Clara, CA (US); Stephen W. Keckler, Austin, TX (US); Alejandro Troccoli, San Jose, CA (US)

(73) Assignee: NVIDIA CORP., Santa Clara, CA (US)

( * ) Notice: Subject to any disclaimer, the term of this patent is extended or adjusted under 35 U.S.C. 154(b) by 0 days.

(21) Appl. No.: 18/057,079

(22) Filed: Nov. 18, 2022

(65) Prior Publication Data

US 2023/0079196 A1 Mar. 16, 2023

Related U.S. Application Data

(63) Continuation of application No. 16/898,308, filed on Jun. 10, 2020, now Pat. No. 11,550,325.

(51) Int. Cl.
*G05D 1/00* (2024.01)
*B60W 60/00* (2020.01)
*G01S 13/931* (2020.01)
*G05B 13/02* (2006.01)

(52) U.S. Cl.
CPC ....... *G05D 1/0214* (2013.01); *B60W 60/0015* (2020.02); *G01S 13/931* (2013.01); *G05B 13/027* (2013.01); *G05D 1/0088* (2013.01); *B60W 2554/4046* (2020.02); *B60W 2710/20* (2013.01); *B60W 2720/106* (2013.01); *B60W 2720/125* (2013.01)

(58) Field of Classification Search
None
See application file for complete search history.

(56) References Cited

U.S. PATENT DOCUMENTS

| | | | |
|---|---|---|---|
| 11,216,674 B2 | 1/2022 | Ogale et al. | |
| 11,390,301 B2 | 7/2022 | Hari et al. | |
| 2004/0193347 A1 | 9/2004 | Harumoto et al. | |
| 2016/0321381 A1 | 11/2016 | English et al. | |
| 2019/0196464 A1 | 6/2019 | Lockwood et al. | |
| 2019/0235521 A1 | 8/2019 | Mudalige et al. | |
| 2019/0278290 A1 | 9/2019 | Zhang et al. | |
| 2019/0377352 A1 | 12/2019 | Weißwange et al. | |
| 2020/0130709 A1 | 4/2020 | Rodionova et al. | |
| 2020/0209872 A1 | 7/2020 | Xu et al. | |
| 2020/0249683 A1 | 8/2020 | Rosales et al. | |

(Continued)

FOREIGN PATENT DOCUMENTS

WO 2019172104 A1 9/2019

OTHER PUBLICATIONS

Madas et al., "On Path Planning Methods for Automotive Collision Avoidance", 2013 IEEE Intelligent Vehicles Symposium (IV), Jun. 23-26, 2013, Gold Coast, Australia, pp. 931-937 (Year: 2013).*

(Continued)

*Primary Examiner* — Tamara L Weber
(74) *Attorney, Agent, or Firm* — Rowan TELS LLC

(57) ABSTRACT

Techniques to generate driving scenarios for autonomous vehicles characterize a path in a driving scenario according to metrics such as narrowness and effort. Nodes of the path are assigned a time for action to avoid collision from the node. The generated scenarios may be simulated in a computer.

21 Claims, 28 Drawing Sheets

(a)

(b)

(56) References Cited

U.S. PATENT DOCUMENTS

| | | |
|---|---|---|
| 2021/0072397 A1 | 3/2021 | Caspers et al. |
| 2021/0256616 A1 | 8/2021 | Hayward et al. |
| 2021/0276546 A1 | 9/2021 | Rahman et al. |
| 2021/0294333 A1* | 9/2021 | Jing ............... G05D 1/0276 |
| 2021/0300348 A1 | 9/2021 | Yasui |
| 2021/0347382 A1* | 11/2021 | Huang ............. G05D 1/0212 |
| 2021/0370980 A1* | 12/2021 | Ramamoorthy ...... G06F 18/214 |

OTHER PUBLICATIONS

Paden et al., "A Survey of Motion Planning and Control Techniques for Self-Driving Urban Vehicles", IEEE Transactions on Intelligent Vehicles, vol. 1, No. 1, Mar. 2016, pp. 33-55 (Year: 2016).*

Best et al., "AutonoVi: Autonomous Vehicle Planning with Dynamic Maneuvers and Traffic Constraints", 2017 IEEE/RSJ International Conference on Intelligent Robots and Systems (IROS), Sep. 24-28, 2017, Vancouver, BC, Canada, pp. 2629-2636 (Year: 2017).*

Abeysirigoonawardena, Yasasa, et al., Generating Adversarial Driving Scenarios in High-Fidelity Simulators, 2019 International Conference on Robotics and Automation (ICRA), Palais des congres de Montreal, Montreal, Canada, May 20-24, 2019, pp. 8271-8277.

Corso, Anthony, et al., Adaptive Stress Testing with Reward Augmentation for Autonomous Vehicle Validation, IEEE ITSC 2019, arXiv:1908.01046 [cs.RO], Aug. 6, 2019.

Hauer et al., "Fitness Functions for Testing Automated and Autonomous Driving Systems", Computer Safety, Reliability, and Security, Aug. 8, 2019, pp. 69-84 (Year: 2019).

O'Kelly, Matthew, et al., Scalable End-to-End Autonomous Vehicle Testing via Rare-event Simulation, arXiv:1811.00145v3 [cs.LG] Jan. 12, 2019, pp. 1-18.

* cited by examiner

ADVERSARIAL SCENARIOS FOR SAFETY TESTING OF AUTONOMOUS VEHICLES

BACKGROUND

Research and development on Autonomous Vehicles (AV) have increased in recent years in part due to advances in computer vision and deep learning. Comprehensive safety testing is crucial to a successful adoption of AV technology, which remains challenging due to its complexity.

Traditional software testing methods utilize formal verification techniques, or techniques such as code coverage and fuzzing. However, these techniques are not readily applicable to testing of AVs due to the complexity of the AV software that often includes components such as deep neural networks (DNNs). An alternative is to use computers to simulate driving scenarios for testing AVs. Custom scenarios and corner cases can be tested in simulation under various conditions that are rare to encounter in reality. Physics-based simulators enable comprehensive testing of AVs under conditions similar to the real-world, and photo-realistic simulators enable testing of perception modules (e.g., based on deep neural networks).

Implementing scenarios for testing AVs in a simulation environment can be difficult. Conventional practice is to utilize a human expert to specify the driving scenario. This is time consuming and difficult to scale and may miss many corner cases.

Other methods have been proposed for generating scenarios for safety testing of AVs, including reinforcement learning (e.g., Koren et al. 2018) and optimization methods (e.g., Abeysirigoonawardena et al. 2019). In these approaches a scenario is considered useful for testing if it involves a collision or a near collision. These scenarios are often insufficient for testing purposes at least because they do not provide information as to whether the accident is avoidable or not.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
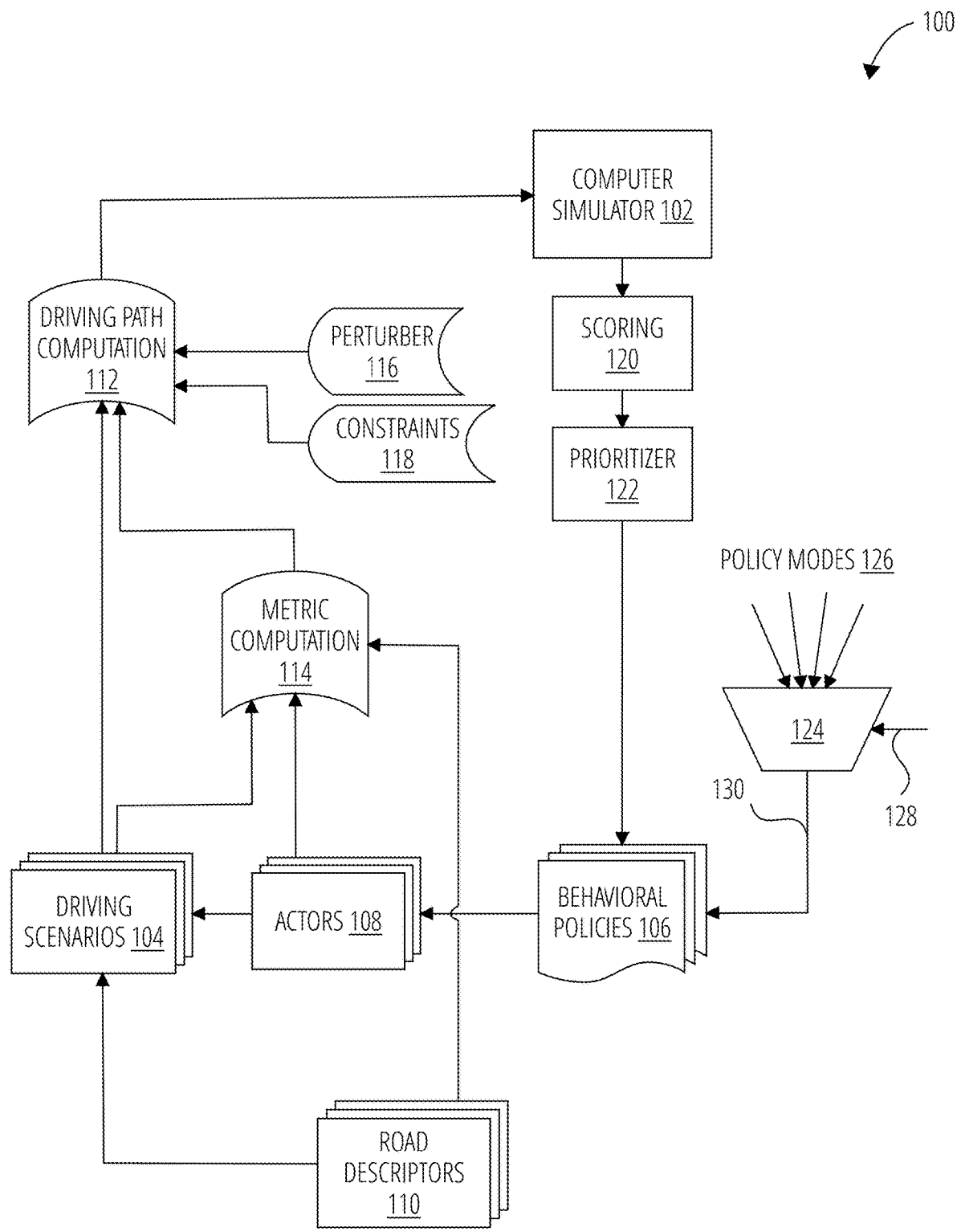
FIG. 1 depicts an autonomous vehicle simulation environment 100 in accordance with one embodiment.

Autonomous vehicles undergo rigorous safety and reliability testing before being deployed on the road. Real-world testing involve arduous driving times to encounter scenarios involving a collision or an unsafe condition, which are rare. Formal testing methods are often impractical to apply to AVs. Simulators provide a scalable alternative to real-world testing. Disclosed herein are comprehensive techniques for characterizing the safety of driving scenarios based on behavior policies having various levels of difficulty. The techniques are independent of the driver model and are readily applied to computer simulators and well as to real driving scenarios. The techniques may be utilized to generate driving scenarios that end in an unsafe condition with high probability.

The driving scenarios may be characterized based on (1) a multivariate metric for a number of possible safe driving paths (policies) in the scenarios, (2) a narrowness metric for these paths, (3) an effort metric that considers actuator values, and (4) a minimum amount of time needed for action to avoid collision. AV specific metrics can also be used to characterize the scenarios. For example, metrics based on the error of the perception modules and NVIDIA® Safety Force Field assumptions may aid in characterizing and selecting/developing scenarios customized test the deployed AV.

A driving scenario comprises environment initial states of a set of actors and the driving policies of these actors. The inclusion of the driving policy for the AV is optional. A driving scenario in one embodiment comprises the following: (1) a set of descriptors for the environment, e.g., the number of lanes, their widths, and the road curvature, (2) N vehicles $\{w_i\}_{i=1\ldots N}$ and their states $\{s_i(t_0)\}_{i=1\ldots N}$ at time $t_0$; the state includes the vehicle position $x_i$, orientation $\theta_i$, speed $v_i$, and size of each vehicle, (3) a set of driving policies $\{\pi_i\}_{i=1\ldots N}$ associated with each non-AV vehicle, (4) one particular vehicle that is an AV, designated the 'ego vehicle' $w_E$, and its state at time $t_0$, $s_E(t_0)$. A driving policy $\pi_E$ of the AV may also be included.

A scenario may be classified as unsafe when there is an incident between the AV and other actors. The incident may be a collision or a condition that is not safe for any of the involved actors (including the AV). An unsafe scenario may include a driving policy for the AV.

A sequence indicates a temporal succession of states of all the vehicles. A sequence may be obtained by executing a scenario on a simulator using a specific AV policy or may be derived from real-world driving data. During a driving sequence, environment and states of actors any time t may be used to seed a new scenario.

An unsafe sequence is one wherein the AV ($w_E$) collides with another actor (or actors) or comes close to other actors such that the distance between them is designated unsafe. The time when $w_E$ collides with another actor (say $w_A$) is indicated as $t_{acc}$ (acc being an abbreviation for accident).

From an unsafe sequence, a critical scenario is determined by analyzing back across a time variable from a time when a collision is detected ($t_{acc}$) until a time $t_0$ such that a safe path for $w_E$ is identified that avoids any collision. In one embodiment, the trajectories are frozen (made unchanging) for all the other vehicles other than the AV and vehicles creating the unsafe condition in the unsafe sequence, leading up to $t_{acc}$. The time variable of the scenario is stepped back one step from $t_{acc}$ and the trajectory extrapolated at the same speed after the accident (assuming the accident did not take pace). This estimates positions of all actors after $t_{acc}$ as the actors involved in the accident typically stop moving after the accident and the accident might take place at a different time than $t_{acc}$ if the AV policy is different.

Safe paths for the AV would conventionally be identified by executing simulations with different driving policies, a computation-intensive and time-consuming process. Embodiments of the disclosed new approach begin from a defined $t_0$ (e.g., one time step before $t_{acc}$) and compute a set of possible locations of $w_E$ in the next time step based on its current state (location, speed, steering, and acceleration) and configured realistic ranges for steering and acceleration values that can applied at the current state. Possible locations in the next time step are determined by calculating the annulus sector corresponding to all the possible locations for the center of the vehicle, based on a maximum possible acceleration (positive or negative) and steering of the AV at its current state. The 2D sector may be discretized with a grid with a specific spacing between the cells computed based on the size of the vehicle (typically ½ or ¼ the vehicle width/height). The cells whose centers fall into the annulus are recorded as valid next states and the ones that are either off-road or result in a collision with another vehicle are discarded. For each new valid state, this procedure is repeated until some configured number of time steps after $t_{acc}$ and a tree is built with all the possible trajectories that can be executed by $w_E$ (starting at $t_0$). Finding a safe trajectory is then carried out by finding a path with all valid nodes from the root of the tree to a leaf at the last level of the tree (one level in the tree corresponds to one time step). If no safe path is found, the algorithm backs up one timestep from $t_0$ and repeats the procedure until a critical scenario is found.

Figure 4:
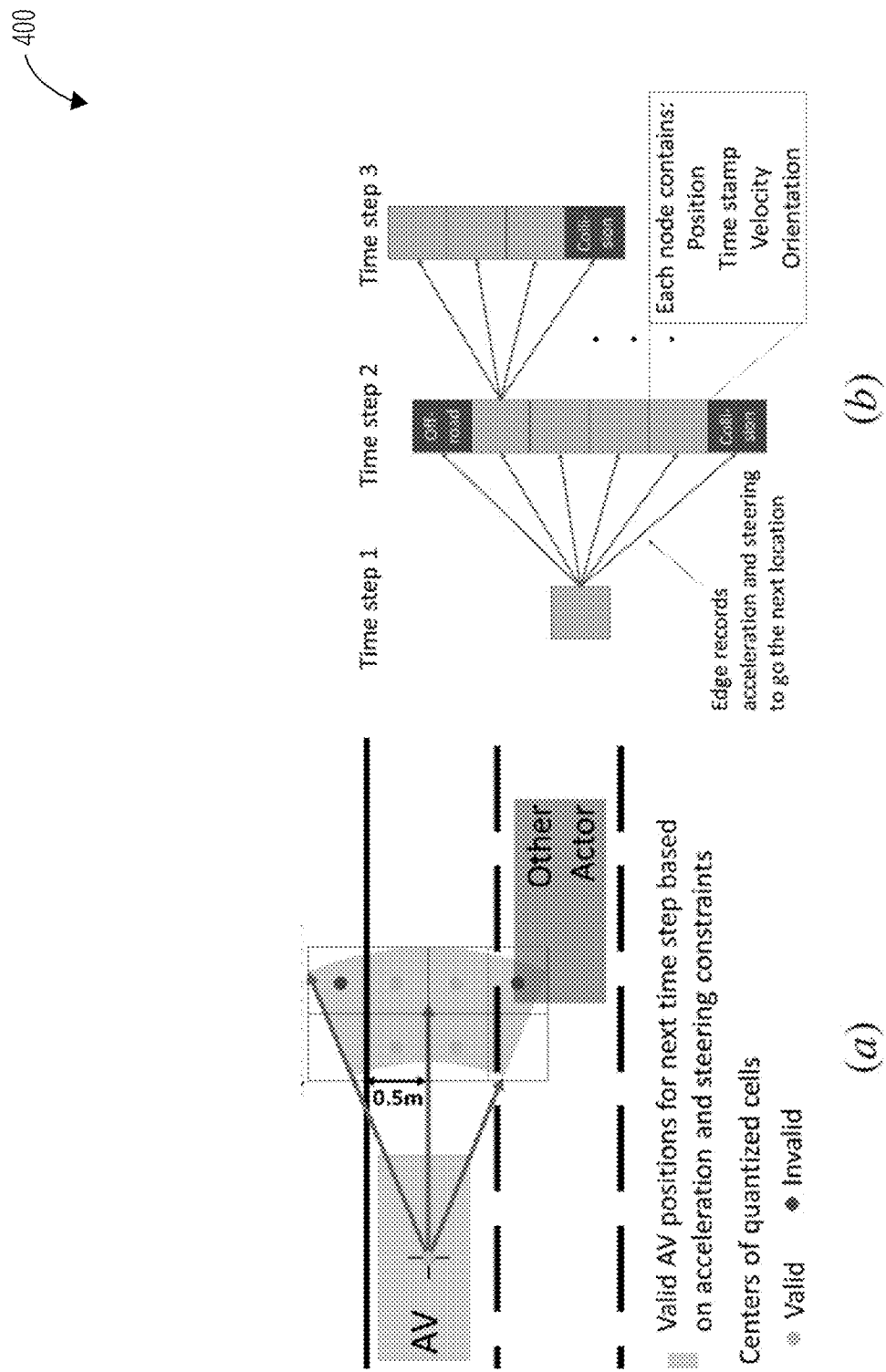
FIG. 4 depicts a scenario scoring algorithm 400 in accordance with one embodiment.

Unsafe scenarios may be characterized based on the possible future driving states that may be computed depending on diving choices made by the AV, and from these states a set of metrics may be computed. Six different metrics may be utilized to characterize a scenario based on possible driving policies and their efforts. These metrics are described in further detail below. They are defined such that a higher value implies that the scenario is more challenging. Applying these metrics to score a scenario provides an assessment of the performance of the AV and prioritizes scenarios based on their difficulty and risk to be applied to further improve the vehicle's behavioral policy. FIG. 4 provides a depiction of one embodiment of such a scenario scoring algorithm 400.

CriticalTime (tcritical): The minimum time (in seconds) required before tacc such that the accident can be avoided by an AV. A large $t_{critical}$ value implies that the AV should take an action early to avoid the collision. This is set to zero whenever the base sequence has no accident.

SafePathInv (I/#p): Inverse of the number of safe paths (#p) available to the AV until one timestep beyond $t_{acc}$. When I/#p is one, the AV is constrained to follow a single trajectory to stay safe on the road. As I/#p tends to zero, the AV has many ways to avoid the accident.

UnsafePercent (pc %): The percentage of paths leading to a collision within a given scenario, among all the paths that do not lead the AV off-road, in absence of other vehicles.

AvgEffort (E[es]): The effort to navigate from a parent to a child node is determined as a sum of the absolute values of the steering and acceleration controls. To compute the effort needed to navigate a safe path (es), effort values of all the edges in the path are added. The average effort is computed for all the safe paths found in a tree to obtain AvgEffort (E[es]). A large value indicates that, on the average, high-effort navigations are needed to avoid the accident.

MinEffort (min[es]): The minimum effort required to navigate through a safe path.

NarrowInv (I/E[min[cs]]): Measures how narrow a safe path is by computing the minimum number of children for each of the nodes in a safe path(s). This is referred to as min[cs], where cs indicates the number of children of a node along the path. E[min[cs]] is the average of the minimum number of children each safe path; its inverse (referred to as NarrowInv) is one (or close to one) when the AV has only one (or few) options at each node to navigate through a safe path. A narrow path suggests that an evasive maneuver requires precision during execution.

Other metrics based on (1) AV system's perception quality and (2) assumptions of accident avoidance system (e.g., Safety Force Field) may also be used along with all or a subset of the above metrics to characterize scenarios.

The state of an actor may be represented as s=[v 0], where v is the scalar velocity and θ is the angular direction. These parameters correspond to the vehicle speed and steering direction, which are primary factors of vehicle operation that may be adjusted by a driver, or by control systems in an AV. The rate of change of the state may be represented by a control policy:

$$f = \frac{ds}{dt} = \left[a \frac{v \tan(\delta)}{L}\right]$$

where a is the acceleration, δ is the steering angle, and L is the wheelbase (distance between front and rear wheels).

Figure 5:
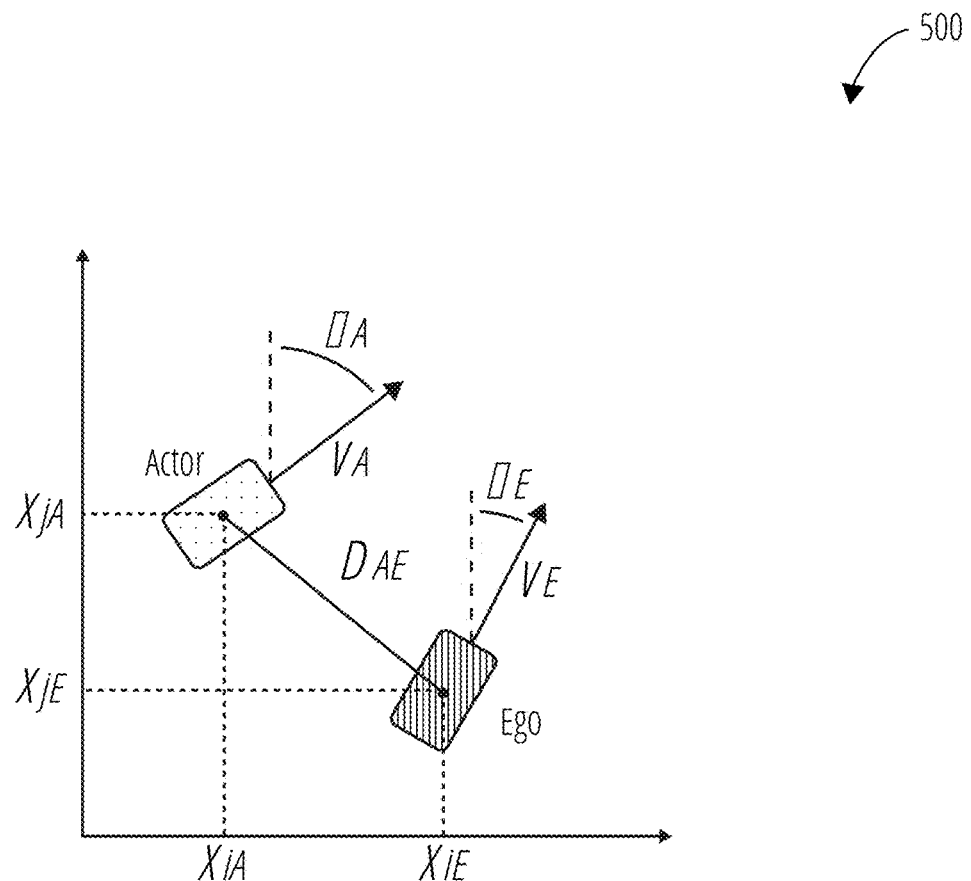
FIG. 5 depicts a driving scenario 500 in accordance with one embodiment.

The position of any actor in a scenario may be represented by a vector $x=[x_i \ x_j]$ of Cartesian coordinates. The formulation for the ego car and an unsafe actor is derived as shown in FIG. 5, and this formulation is readily extensible to multiple actors in a scenario. The square of the Euclidean distance between the unsafe actor (A) and the ego car (E) may then be minimized. To achieve this, the control policy for the unsafe actor may be applied to generate a trajectory that minimizes an objective function $\gamma$ defined as:

$$\gamma_{AE} = D_{AE}^2 = \|x_A - x_E\|_2^2 = (x_{iA} - x_{iE})^2 + (x_{jA} - x_{jE})^2$$

where D is the distance between the actor and ego vehicles and $\|x_A - x_E\|_2^2$ corresponds to the square of the L2 norm, in linear algebraic terms.

The objective function may be reduced over time by setting a constraint on the derivative of $\gamma_{AE}$ such that:

$$\frac{\partial \gamma AE}{\partial t} < 0$$

Thus:

Equation 1

$$\frac{\partial \gamma_{AE}}{\partial t} = \frac{\partial \gamma_{AE}}{\partial s_A} \frac{ds_A}{dt} + \frac{\partial \gamma_{AE}}{\partial s_E} \frac{ds_E}{dt} < 0 \tag{1}$$

Equation 1 becomes:

$$(\Delta x_i \sin(\theta_A) + \Delta x_j \cos(\theta_A))a_A + (\Delta x_i v_A^2 \cos(\theta_A) - \Delta x_j v_A^2 \sin(\theta_A))\tan(\delta_A)/L_A \leq \text{const}$$

which may be further simplified to:

$$\beta_1 a_A + \beta_2 \tan(\delta_A) < \text{const} \qquad \text{Equation 2}$$

The control policy for actor A is characterized by steering angle and acceleration and defines a 2D control space generated by $(\delta_A)$ and $a_A$. In this control space, the constraint described in Equation 2 creates a linear half-space where the boundary between the half-spaces is a line. One of the linear half-spaces of the control space represents conditions in which the actors are moving away from each other, which is not useful for studying potential collision conditions. Thus computation may focus on the linear half-space representing the motion of the actors towards each other. Additionally, constraints may be placed on the maximum values of steering angle and acceleration. Combining these constraints, the control policy of the unsafe actor may be characterized by points at the intersection of linear half-spaces that bring the actors closer together.

Figure 7:
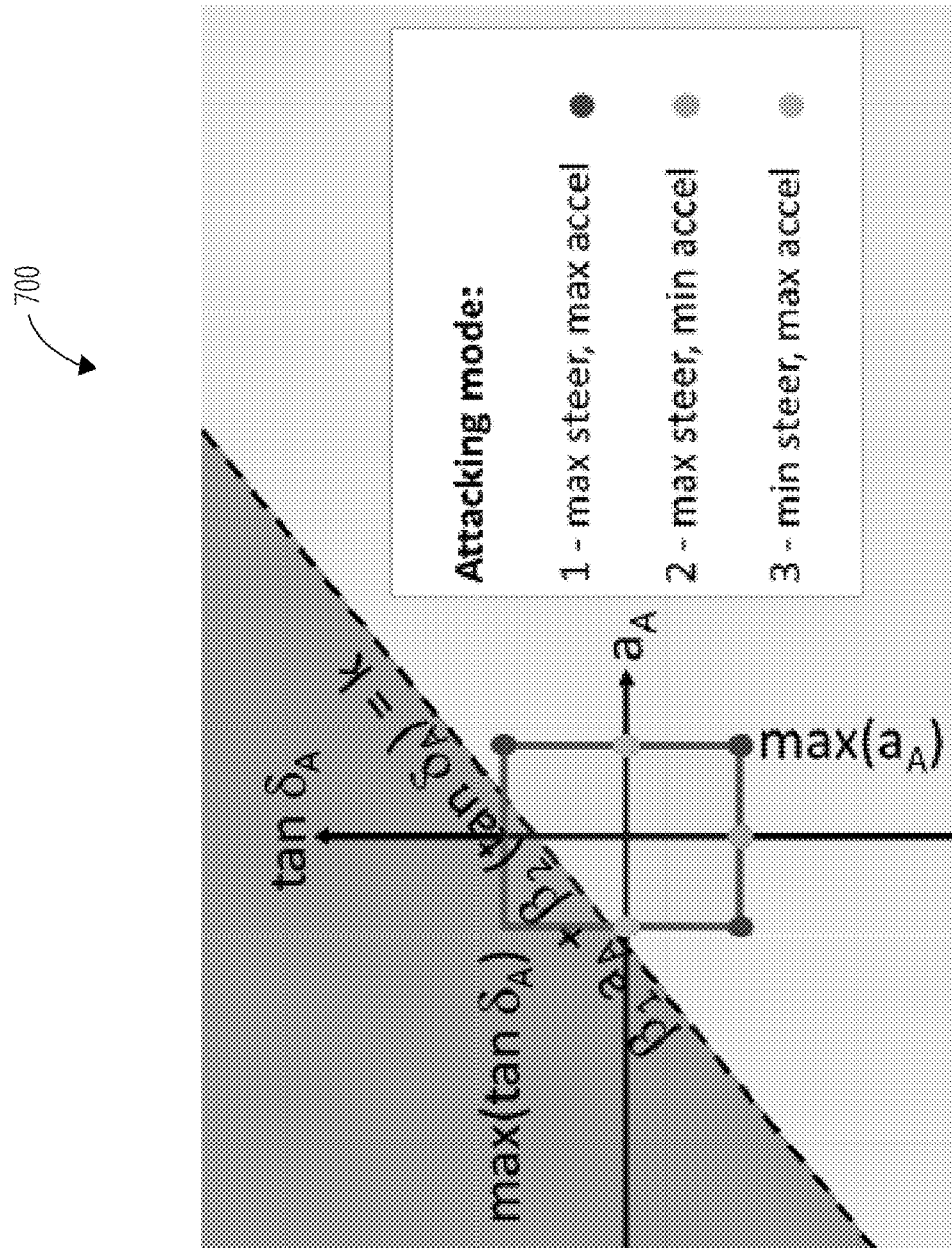
FIG. 7 depicts control policy selection modes 700 in accordance with one embodiment.

Three modes for selecting a control policy for the unsafe actor in this constrained control space are: (1) mode 1, a policy with maximum acceleration and maximum steering, (2) mode 2, a policy with maximum acceleration and minimum steering, and (3) mode 3, a policy with maximum steering and minimum acceleration. An example of control policy selection modes 700 is depicted in FIG. 7. The effort of a policy may be computed as the sum of square values of acceleration and steering applied during scenario simulation. With this definition, mode 1 corresponds to maximum effort for creating an unsafe scenario satisfying the constraints. A further mode 4 may be defined as the minimum effort mode for creating an unsafe scenario satisfying the constraints.

Once the unsafe scenarios are created, they may be characterized or categorized based on how difficult it is to avoid simulated accidents within the scenario, and thus how useful the scenarios may be in training an AV for accident avoidance. It may not be helpful to train the AV using only safe scenarios, or using unsafe scenarios in which accidents are unavoidable or very difficult to avoid. By efficiently providing a set of unsafe scenarios, automatically (using metrics, not subjective human intuition) characterized by difficulty of avoidance, the described techniques may improve AV training quality and time.

FIG. 1 depicts an autonomous vehicle simulation environment 100 in one embodiment. The autonomous vehicle simulation environment 100 may comprise a computer simulator 102, driving scenarios 104, behavioral policies 106, actors 108, road descriptors 110, a driving path computation 112, a metric computation 114, a perturber 116, constraints 118, scoring 120 computations, a prioritizer 122, and a policy mode selector 124. Although scoring and prioritization are depicted in this embodiment based on results of simulation, other embodiments may perform one or both of scoring and prioritization prior to simulation, or may score and/or prioritize both before and after simulation.

The policy mode selector 124 selects from among available policy modes 126 that each implement a different methodology for controlling an unsafe actor in a scenario. The policy mode selector 124 responds to a mode selection 128 to select among configured policy modes 126 to apply as the control policy 130 for an actor. The policy mode selector 124 determines a control policy 130 for assigning behavioral policies 106 may in turn be used to model the behavior of actors 108 in driving scenarios.

The actors 108 and a set of road descriptors 110 are applied to model driving scenarios 104. The driving scenarios 104, actors 108, and road descriptors 110 are subject to a metric computation 114.

The driving scenarios 104 and metric computation 114 results are applied to a driving path computation 112. Constraints 118 may be applied to limit the range of driving paths to evaluate. A perturber 116 is applied to the driving path computation 112 to generate perturbations in the path computations to increase the likelihood that an unsafe driving condition results.

The driving path computation 112 results may be input to a computer simulator 102. Simulation results are subject to scoring 120. The scenario may be scored based on possible driving policies and the effort each may expend to avoid unsafe conditions at various points in the simulated scenario time. The scoring 120 may provide an assessment of the performance of an AV. The scored scenarios are prioritized by a prioritizer 122 based on their difficulty and risk. Higher scoring scenarios may be applied to improve the utility of AV behavioral policies.

Those of ordinary skill in the art may readily recognize that the autonomous vehicle simulation environment 100 may comprise additional or different elements not depicted and unnecessary to this description. The autonomous vehicle simulation environment 100 may in one embodiment operate according to the process depicted in FIG. 2.

Figure 2:
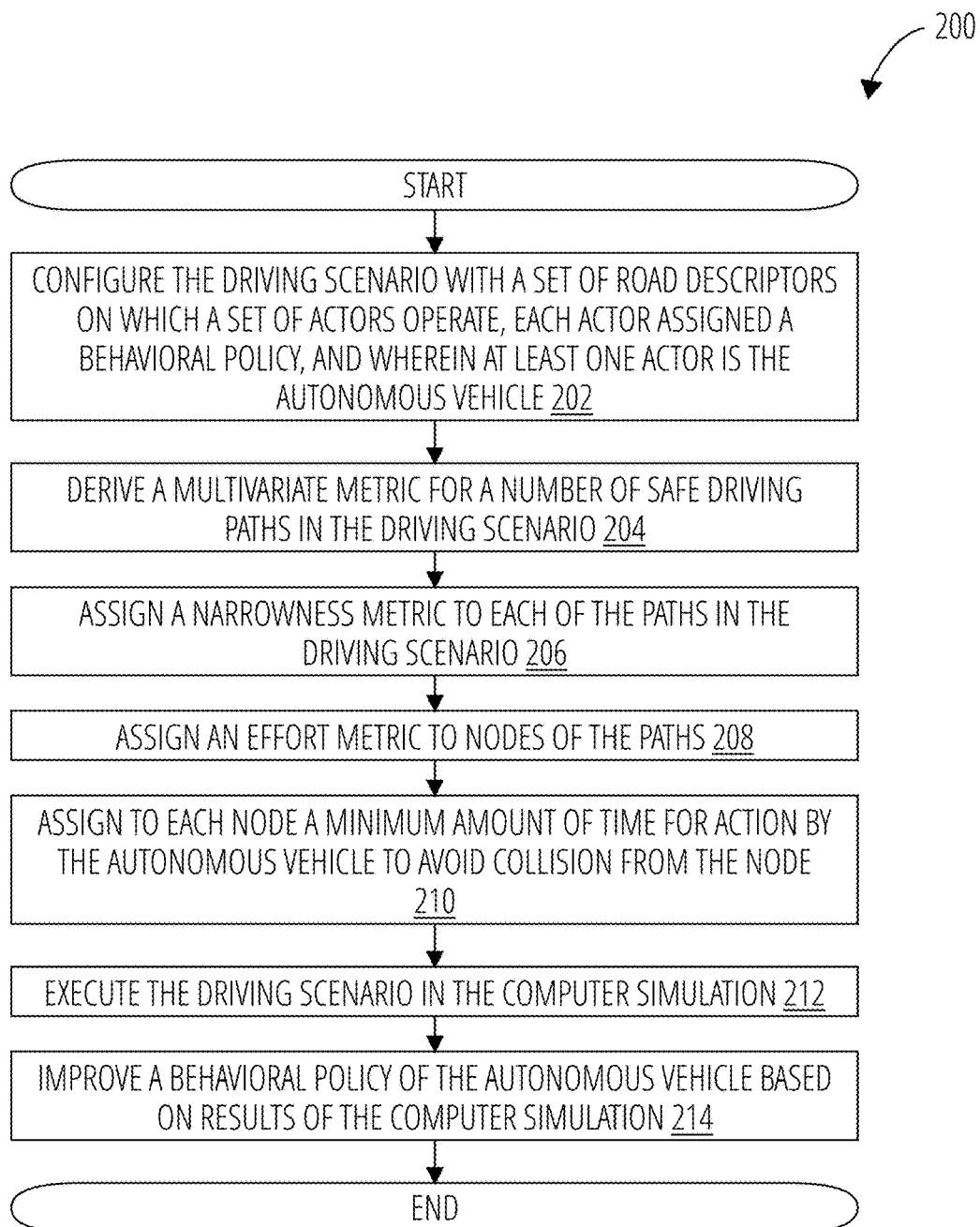
FIG. 2 depicts a computer-implemented process 200 in accordance with one embodiment.

FIG. 2 depicts a computer-implemented process 200 in one embodiment. The computer-implemented process 200 may be used for computer simulation of a driving scenario for an autonomous vehicle. The actions depicted should not be presumed to occur in the order presented, unless an action depends on the result of a previous action to be carried out. If two or more actions are not conditioned on one another in some way, one skilled in the art may readily ascertain that they may be carried out in parallel, in a time-division fashion, or in a different order.

At block 202, a driving scenario may be configured with a set of road descriptors on which a set of actors operate. Each actor may be assigned a behavioral policy, and at least one actor may be the autonomous vehicle. This action may be carried out, for example, by the computer forming the driving scenarios 104 first introduced in FIG. 1, which receives actors 108 configured with the behavioral policies 106, as well as the road descriptors 110.

At block 204, a multivariate metric for a number of safe driving paths in the driving scenario may be derived. This may be carried out, for example, by the computer performing the metric computation 114 of FIG. 1, which accepts the driving scenarios 104, actors 108, and road descriptors 110 as input.

At block 206, a narrowness metric may be assigned to each of the paths in the driving scenario. At block 208, an effort metric may be assigned to nodes of the paths through the driving scenario. These tasks may also be carried out by the computer performing the metric computation 114 of FIG. 1 based on the driving scenarios 104, actors 108, and road descriptors 110. The metric computation 114 results may then be applied to the driving path computation 112.

At block 210, each node of the driving path may be assigned a minimum amount of time for action by the autonomous vehicle to avoid collision from the node. This may be performed by the computer as part of the driving path computation 112 introduced in FIG. 1. The driving path computation 112 is subject to the constraints 118 and perturbations introduced in FIG. 1.

At block 212, the driving scenario may be executed in a computer simulation. This may be performed by the computer simulator 102 introduced in FIG. 1. The output from the computer simulator 102 may be subject to scoring 120 by the computer and a prioritizer 122 algorithm based on performance (such algorithms are known in the art), which may act to improve a behavior policy of the autonomous vehicle based on the results of the computer simulation at block 214.

Again, computer simulation need not be applied in some cases before scoring and/or prioritization are carried out.

Figure 3:
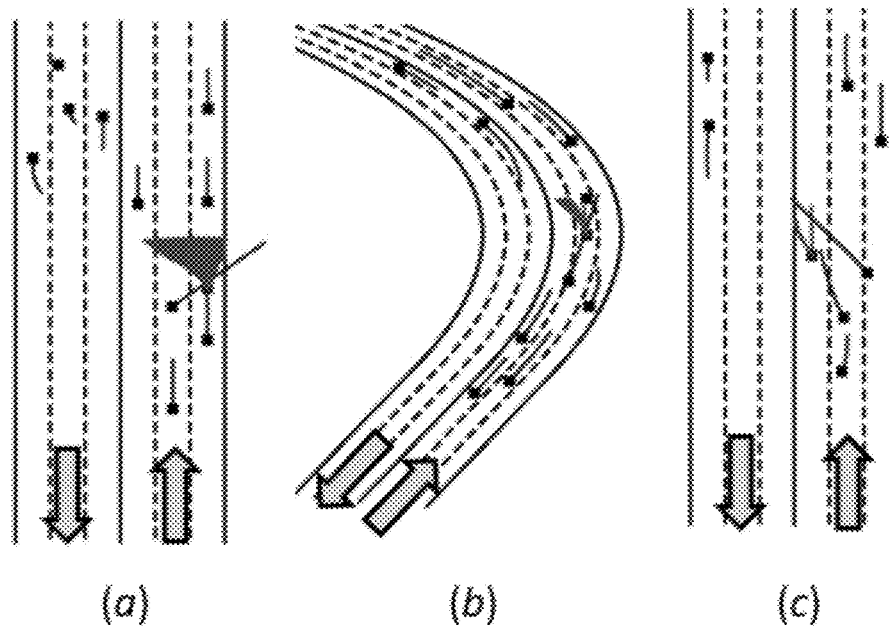
FIG. 3 depicts driving scenarios 300 in accordance with one embodiment.
Figure 3:
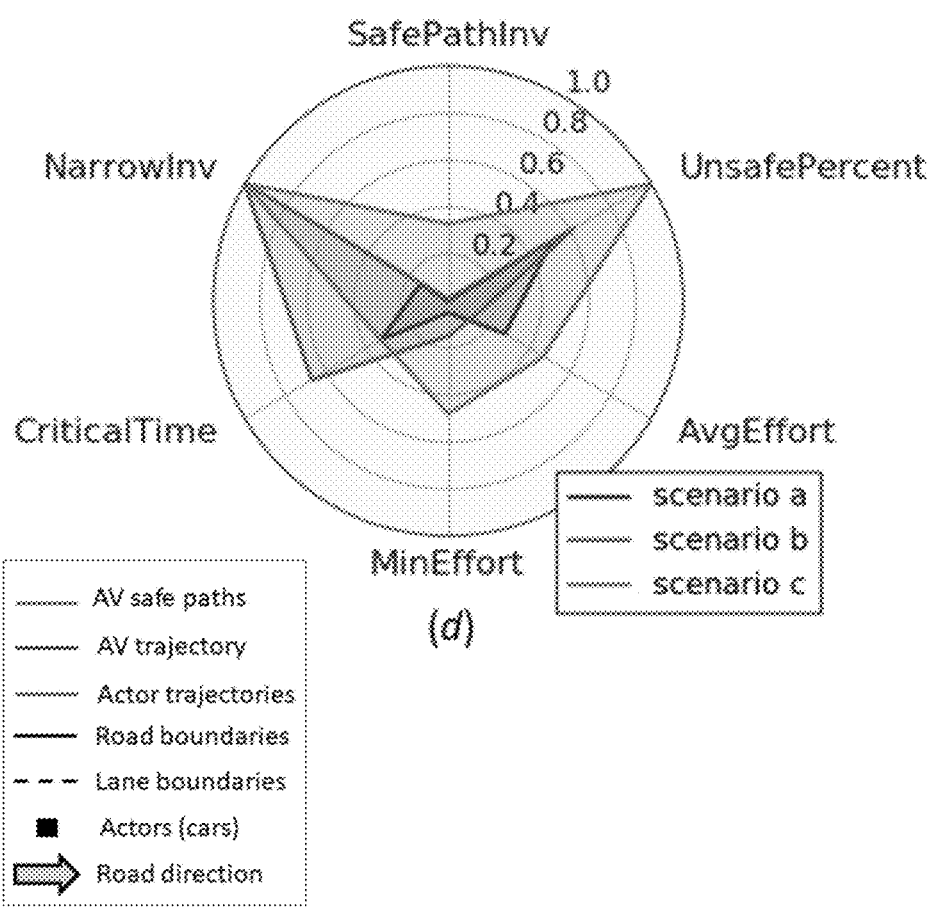

FIG. 3 depicts driving scenarios 300 in accordance with one embodiment. Three driving scenarios with low, medium, and high scores are depicted. Scenario (a) in FIG. 3 is a simple scenario in which the AV may avoid the vehicle attacking from the left by moving almost anywhere (small SafePathInv) in the open space in front of it. While the AvgEffort is not minimal due to the variety of the possible safe paths, the MinEffort is small, suggesting that $w_A$ can follow a simple trajectory to solve the scenario. Scenario (b) is comparatively more challenging with one attacker blocking the lane in front of the AV and the other attacking the AV from the back. In this case, the safe driving paths exist by driving the AV to the left. Because the options are limited, UnsafePercent is higher with respect to scenario (a). The MinEffort is higher because the safe trajectory is curved. Finally, scenario (c) is the most challenging scenario among the three, where two attackers are moving behind and in front of the AV. Most of the paths are unsafe (high UnsafePercent), and the road boundary limits the total number of paths (high SafePathInv). FIG. 3 (d) compares different metrics between these scenarios, where a larger area indicates a higher score.

FIG. 4 depicts a scenario scoring algorithm 400 in accordance with one embodiment. Depiction (a) in FIG. 4 shows the quantized region on the map where the AV can travel in the next time step based on maximum allowed steering and acceleration. Depiction (b) is the tree representation of cell locations for the AV in different time steps during the scenario execution. Cells marked "off road" or "collision" represent the invalid locations for the AV in the scenario.

FIG. 5 depicts a driving scenario 500 in accordance with one embodiment. Position and state of the unsafe actor and the ego car in the scenario are depicted. The square of the Euclidean distance between the actor and the ego car may be minimized to identify training scenarios for improving the behavioral policies of AVs.

Figure 6:
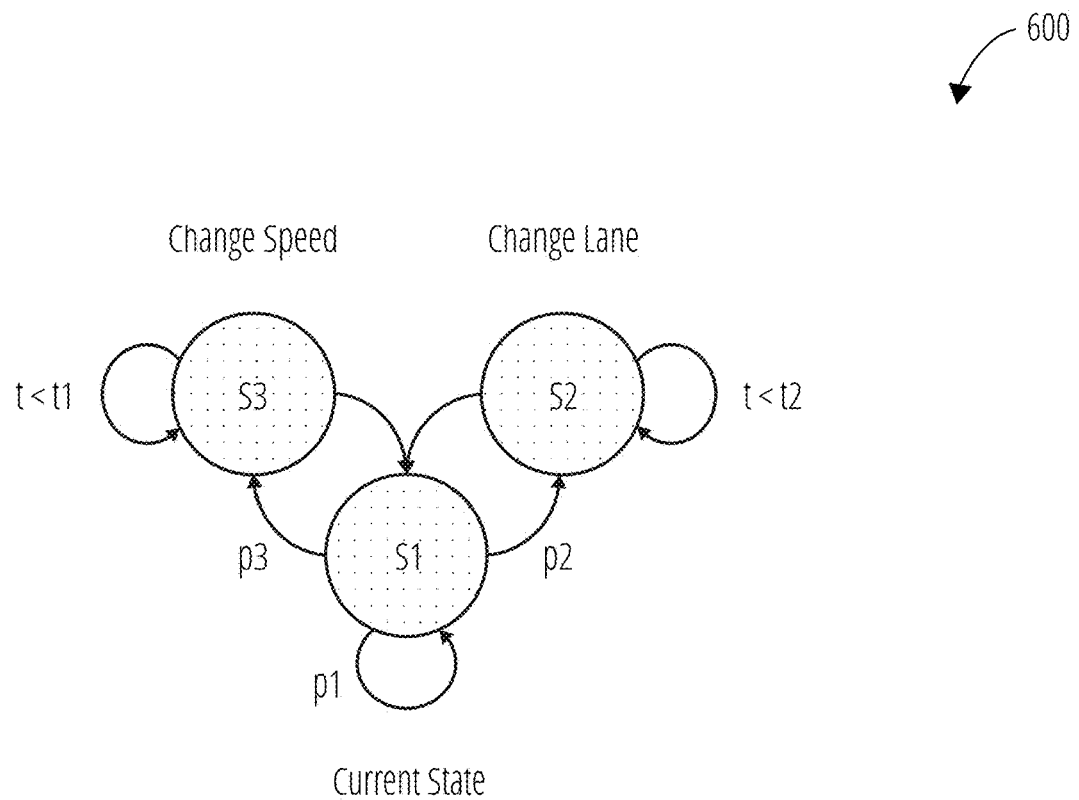
FIG. 6 depicts a driving model 600 in accordance with one embodiment.

FIG. 6 depicts a driving model 600 for dynamic actors in a scenario, in accordance with one embodiment. An actor stays in a state with probability p1, or changes lane or speed with probabilities p2 and p3, respectively.

FIG. 7 depicts control policy selection modes 700 in one embodiment. The attacking policy for actor $w_A$ is defined by steering angle $\delta_A$ and acceleration $a_A$. In the 2D space $(\tan(\delta_A); a_A)$, Equation 2 above defines a valid hemispace. Equation 2 divides the $(\tan(\delta_A); a_A)$ plane into a valid (green) and not valid (red) regions. Within the valid region, different attacking modes can be used to decrease $a_E$.

Additionally, constraints are placed on the maximum values of steering angle and acceleration (blue rectangle in FIG. 7). Because any point in space $(\tan(\delta_A); a_A)$ that satisfies the above constraint may be used as a control command for $w_A$, four different attacking modes may be distinguished. The first three—(1) maximum acceleration and steering, or maximum effort; (2) minimum acceleration and maximum steering; (3) minimum steering and maximum acceleration—are obtained by selecting the corresponding point on the edge of the blue rectangle in FIG. 7. The fourth policy (minimum effort) is obtained by selecting the point in the valid hemispace closest to the origin.

The algorithms and techniques disclosed herein may be executed by computing devices utilizing one or more graphic processing unit (GPU) and/or general purpose data processor (e.g., a 'central processing unit or CPU). For example elements of the autonomous vehicle simulation environment 100, and actions of the computer-implemented process 200, may be implemented or executed by such devices. Results may be applied to update the behavior logic (logic embodying behavioral policies) of autonomous vehicles. Exemplary architectures will now be described that may be configured to carry out the techniques disclosed herein on such devices.

The following description may use certain acronyms and abbreviations as follows:
  "DPC" refers to a "data processing cluster";
  "GPC" refers to a "general processing cluster";
  "I/O" refers to a "input/output";
  "L1 cache" refers to "level one cache";
  "L2 cache" refers to "level two cache";
  "LSU" refers to a "load/store unit";
  "MMU" refers to a "memory management unit";
  "MPC" refers to an "M-pipe controller";
  "PPU" refers to a "parallel processing unit";
  "PROP" refers to a "pre-raster operations unit";
  "ROP" refers to a "raster operations";
  "SFU" refers to a "special function unit";
  "SM" refers to a "streaming multiprocessor";
  "Viewport SCC" refers to "viewport scale, cull, and clip";
  "WDX" refers to a "work distribution crossbar"; and
  "XBar" refers to a "crossbar".

Parallel Processing Unit

Figure 8:
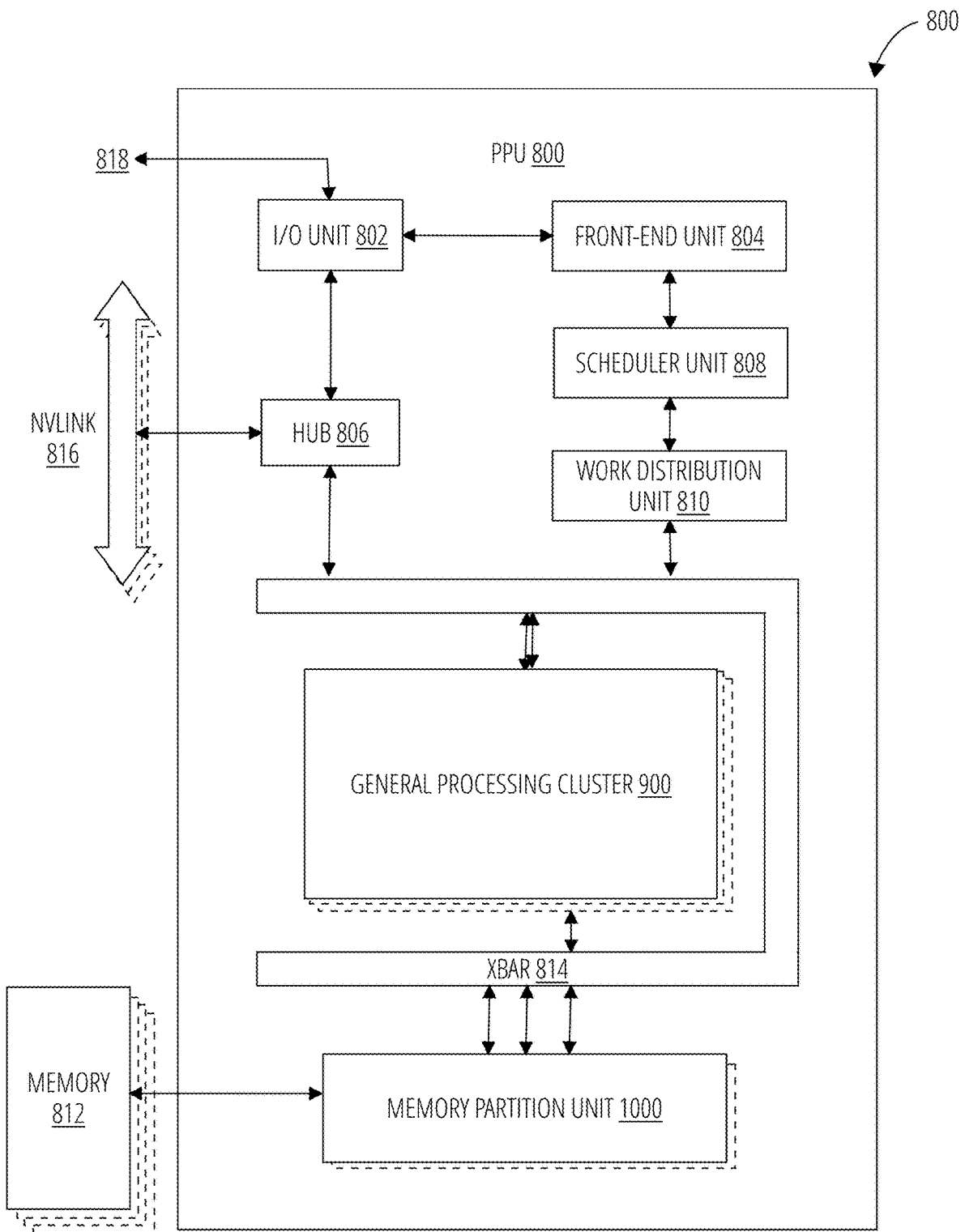
FIG. 8 depicts a parallel processing unit 800 in accordance with one embodiment.

FIG. 8 depicts a parallel processing unit 800, in accordance with an embodiment. In an embodiment, the parallel processing unit 800 is a multi-threaded processor that is implemented on one or more integrated circuit devices. The parallel processing unit 800 is a latency hiding architecture designed to process many threads in parallel. A thread (e.g., a thread of execution) is an instantiation of a set of instructions configured to be executed by the parallel processing unit 800. In an embodiment, the parallel processing unit 800 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 800 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 800 modules may be configured to accelerate thousands of High Performance Computing (HPC), data center, and machine learning applications. The parallel processing unit 800 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 8, the parallel processing unit 800 includes an I/O unit 802, a front-end unit 804, a scheduler unit 808, a work distribution unit 810, a hub 806, a crossbar 814, one or more general processing cluster 900 modules, and one or more memory partition unit 1000 modules. The parallel processing unit 800 may be connected to a host processor or other parallel processing unit 800 modules via one or more high-speed NVLink 816 interconnects. The parallel processing unit 800 may be connected to a host processor or other peripheral devices via an interconnect 818. The parallel processing unit 800 may also be connected to a local memory comprising a number of memory 812 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 812 may comprise logic to configure the parallel processing unit 800 to carry out aspects of the techniques disclosed herein.

The NVLink 816 interconnect enables systems to scale and include one or more parallel processing unit 800 modules combined with one or more CPUs, supports cache coherence between the parallel processing unit 800 modules and CPUs, and CPU mastering. Data and/or commands may be transmitted by the NVLink 816 through the hub 806 to/from other units of the parallel processing unit 800 such as one or more copy engines, a video encoder, a video decoder, a power management unit, etc. (not explicitly shown). The NVLink 816 is described in more detail in conjunction with FIG. 12.

The I/O unit 802 is configured to transmit and receive communications (e.g., commands, data, etc.) from a host processor (not shown) over the interconnect 818. The I/O unit 802 may communicate with the host processor directly via the interconnect 818 or through one or more intermediate devices such as a memory bridge. In an embodiment, the I/O unit 802 may communicate with one or more other processors, such as one or more parallel processing unit 800 modules via the interconnect 818. In an embodiment, the I/O unit 802 implements a Peripheral Component Interconnect Express (PCIe) interface for communications over a PCIe bus and the interconnect 818 is a PCIe bus. In alternative embodiments, the I/O unit 802 may implement other types of well-known interfaces for communicating with external devices.

The I/O unit 802 decodes packets received via the interconnect 818. In an embodiment, the packets represent commands configured to cause the parallel processing unit 800 to perform various operations. The I/O unit 802 transmits the decoded commands to various other units of the parallel processing unit 800 as the commands may specify. For example, some commands may be transmitted to the front-end unit 804. Other commands may be transmitted to the hub 806 or other units of the parallel processing unit 800 such as one or more copy engines, a video encoder, a video decoder, a power management unit, etc. (not explicitly shown). In other words, the I/O unit 802 is configured to route communications between and among the various logical units of the parallel processing unit 800.

In an embodiment, a program executed by the host processor encodes a command stream in a buffer that provides workloads to the parallel processing unit 800 for processing. A workload may comprise several instructions and data to be processed by those instructions. The buffer is a region in a memory that is accessible (e.g., read/write) by both the host processor and the parallel processing unit 800. For example, the I/O unit 802 may be configured to access the buffer in a system memory connected to the interconnect 818 via memory requests transmitted over the interconnect 818. In an embodiment, the host processor writes the command stream to the buffer and then transmits a pointer to the start of the command stream to the parallel processing unit 800. The front-end unit 804 receives pointers to one or more command streams. The front-end unit 804 manages the one or more streams, reading commands from the streams and forwarding commands to the various units of the parallel processing unit 800.

The front-end unit 804 is coupled to a scheduler unit 808 that configures the various general processing cluster 900 modules to process tasks defined by the one or more streams. The scheduler unit 808 is configured to track state information related to the various tasks managed by the scheduler unit 808. The state may indicate which general processing cluster 900 a task is assigned to, whether the task is active or inactive, a priority level associated with the task, and so forth. The scheduler unit 808 manages the execution of a plurality of tasks on the one or more general processing cluster 900 modules.

The scheduler unit 808 is coupled to a work distribution unit 810 that is configured to dispatch tasks for execution on the general processing cluster 900 modules. The work distribution unit 810 may track a number of scheduled tasks received from the scheduler unit 808. In an embodiment, the work distribution unit 810 manages a pending task pool and an active task pool for each of the general processing cluster 900 modules. The pending task pool may comprise a number of slots (e.g., 32 slots) that contain tasks assigned to be processed by a particular general processing cluster 900. The active task pool may comprise a number of slots (e.g., 4 slots) for tasks that are actively being processed by the general processing cluster 900 modules. As a general processing cluster 900 finishes the execution of a task, that task is evicted from the active task pool for the general processing cluster 900 and one of the other tasks from the pending task pool is selected and scheduled for execution on the general processing cluster 900. If an active task has been idle on the general processing cluster 900, such as while waiting for a data dependency to be resolved, then the active task may be evicted from the general processing cluster 900 and returned to the pending task pool while another task in the pending task pool is selected and scheduled for execution on the general processing cluster 900.

The work distribution unit 810 communicates with the one or more general processing cluster 900 modules via crossbar 814. The crossbar 814 is an interconnect network that couples many of the units of the parallel processing unit 800 to other units of the parallel processing unit 800. For example, the crossbar 814 may be configured to couple the work distribution unit 810 to a particular general processing cluster 900. Although not shown explicitly, one or more other units of the parallel processing unit 800 may also be connected to the crossbar 814 via the hub 806.

The tasks are managed by the scheduler unit 808 and dispatched to a general processing cluster 900 by the work distribution unit 810. The general processing cluster 900 is configured to process the task and generate results. The results may be consumed by other tasks within the general processing cluster 900, routed to a different general processing cluster 900 via the crossbar 814, or stored in the memory 812. The results can be written to the memory 812 via the memory partition unit 1000 modules, which implement a memory interface for reading and writing data to/from the memory 812. The results can be transmitted to another parallel processing unit 800 or CPU via the NVLink 816. In an embodiment, the parallel processing unit 800 includes a number U of memory partition unit 1000 modules that is equal to the number of separate and distinct memory 812 devices coupled to the parallel processing unit 800. A memory partition unit 1000 will be described in more detail below in conjunction with FIG. 10.

In an embodiment, a host processor executes a driver kernel that implements an application programming interface (API) that enables one or more applications executing on the host processor to schedule operations for execution on the parallel processing unit 800. In an embodiment, multiple compute applications are simultaneously executed by the parallel processing unit 800 and the parallel processing unit 800 provides isolation, quality of service (QoS), and independent address spaces for the multiple compute applications. An application may generate instructions (e.g., API calls) that cause the driver kernel to generate one or more tasks for execution by the parallel processing unit 800. The driver kernel outputs tasks to one or more streams being processed by the parallel processing unit 800. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 11.

Figure 9:
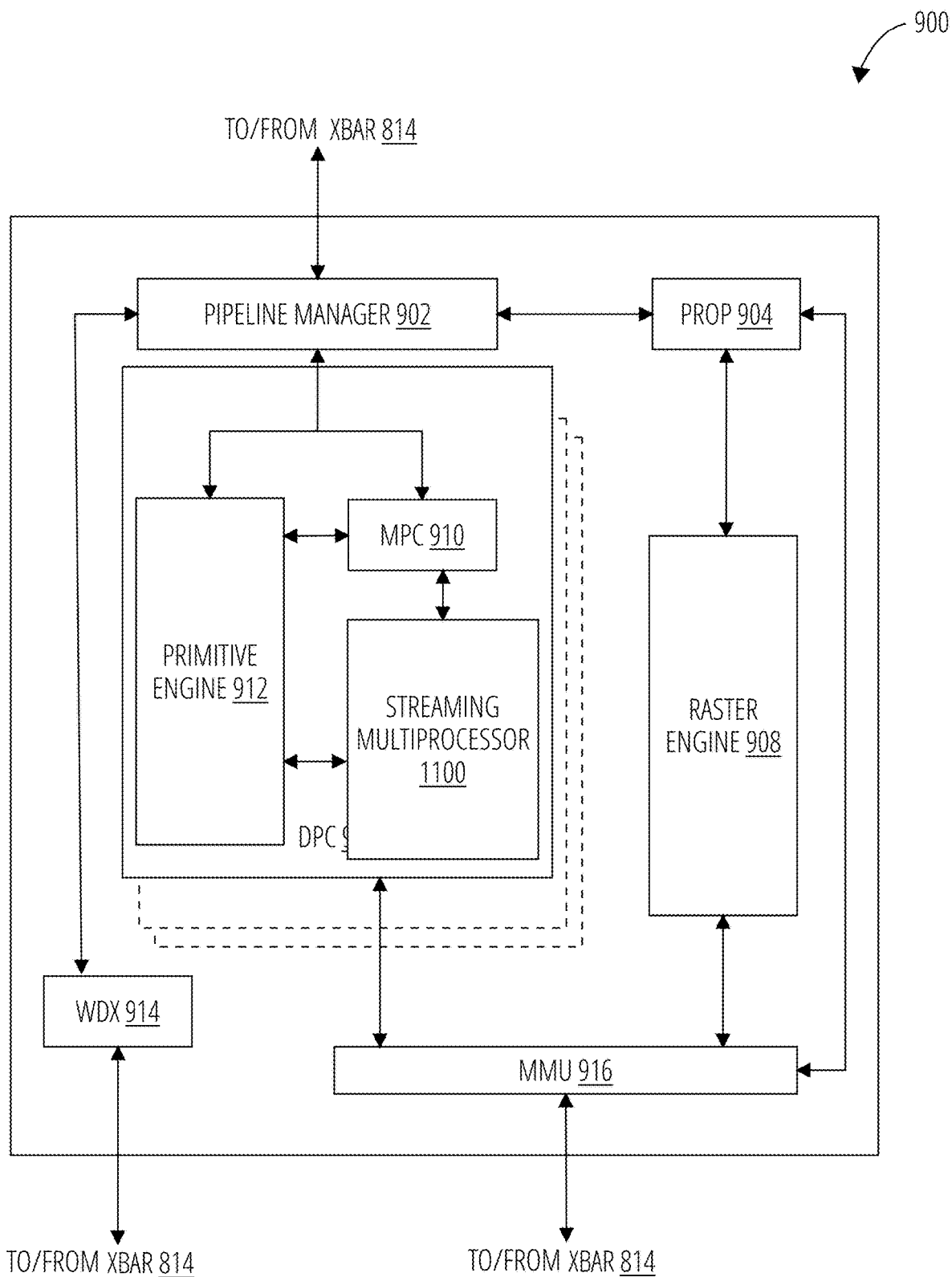
FIG. 9 depicts a general processing cluster 900 in accordance with one embodiment.

FIG. 9 depicts a general processing cluster 900 of the parallel processing unit 800 of FIG. 8, in accordance with an embodiment. As shown in FIG. 9, each general processing cluster 900 includes a number of hardware units for processing tasks. In an embodiment, each general processing cluster 900 includes a pipeline manager 902, a pre-raster operations unit 904, a raster engine 908, a work distribution crossbar 914, a memory management unit 916, and one or more data processing cluster 906. It will be appreciated that the general processing cluster 900 of FIG. 9 may include other hardware units in lieu of or in addition to the units shown in FIG. 9.

In an embodiment, the operation of the general processing cluster 900 is controlled by the pipeline manager 902. The pipeline manager 902 manages the configuration of the one or more data processing cluster 906 modules for processing tasks allocated to the general processing cluster 900. In an embodiment, the pipeline manager 902 may configure at least one of the one or more data processing cluster 906 modules to implement at least a portion of a graphics rendering pipeline. For example, a data processing cluster 906 may be configured to execute a vertex shader program on the programmable streaming multiprocessor 1100. The pipeline manager 902 may also be configured to route packets received from the work distribution unit 810 to the appropriate logical units within the general processing cluster 900. For example, some packets may be routed to fixed function hardware units in the pre-raster operations unit 904 and/or raster engine 908 while other packets may be routed to the data processing cluster 906 modules for processing by the primitive engine 912 or the streaming multiprocessor 1100. In an embodiment, the pipeline manager 902 may configure at least one of the one or more data processing cluster 906 modules to implement a neural network model and/or a computing pipeline.

Figure 10:
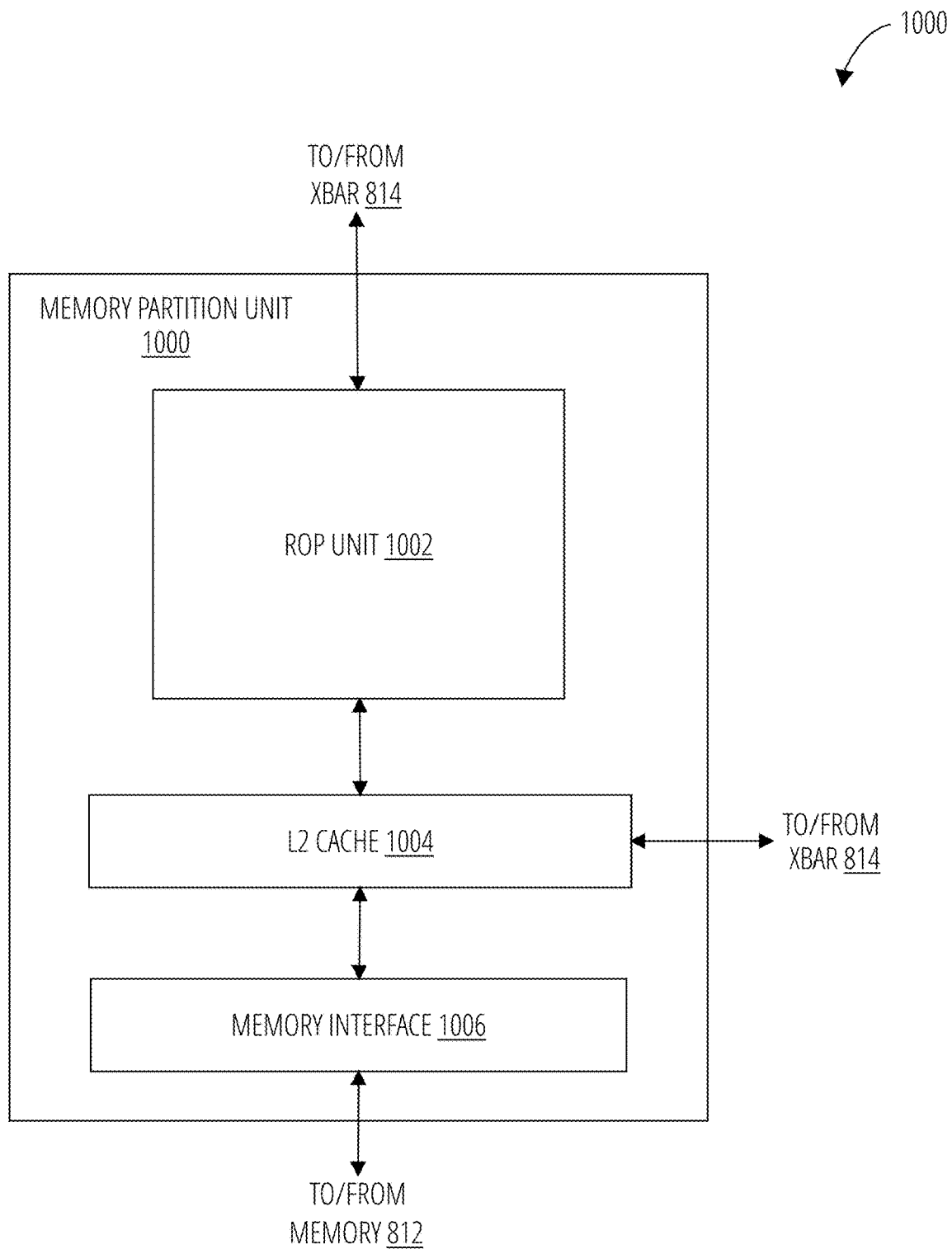
FIG. 10 depicts a memory partition unit 1000 in accordance with one embodiment.

The pre-raster operations unit 904 is configured to route data generated by the raster engine 908 and the data processing cluster 906 modules to a Raster Operations (ROP) unit, described in more detail in conjunction with FIG. 10. The pre-raster operations unit 904 may also be configured to perform optimizations for color blending, organize pixel data, perform address translations, and the like.

The raster engine 908 includes a number of fixed function hardware units configured to perform various raster operations. In an embodiment, the raster engine 908 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 908 comprises fragments to be processed, for example, by a fragment shader implemented within a data processing cluster 906.

Each data processing cluster 906 included in the general processing cluster 900 includes an M-pipe controller 910, a primitive engine 912, and one or more streaming multiprocessor 1100 modules. The M-pipe controller 910 controls the operation of the data processing cluster 906, routing packets received from the pipeline manager 902 to the appropriate units in the data processing cluster 906. For example, packets associated with a vertex may be routed to the primitive engine 912, which is configured to fetch vertex attributes associated with the vertex from the memory 812. In contrast, packets associated with a shader program may be transmitted to the streaming multiprocessor 1100.

The streaming multiprocessor 1100 comprises a programmable streaming processor that is configured to process tasks represented by a number of threads. Each streaming multiprocessor 1100 is multi-threaded and configured to execute a plurality of threads (e.g., 32 threads) from a particular group of threads concurrently. In an embodiment, the streaming multiprocessor 1100 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1100 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1100 will be described in more detail below in conjunction with FIG. 11.

The memory management unit 916 provides an interface between the general processing cluster 900 and the memory partition unit 1000. The memory management unit 916 may provide translation of virtual addresses into physical addresses, memory protection, and arbitration of memory requests. In an embodiment, the memory management unit 916 provides one or more translation lookaside buffers (TLBs) for performing translation of virtual addresses into physical addresses in the memory 812.

FIG. 10 depicts a memory partition unit 1000 of the parallel processing unit 800 of FIG. 8, in accordance with an embodiment. As shown in FIG. 10, the memory partition unit 1000 includes a raster operations unit 1002, a level two cache 1004, and a memory interface 1006. The memory interface 1006 is coupled to the memory 812. Memory interface 1006 may implement 32, 64, 128, 1024-bit data buses, or the like, for high-speed data transfer. In an embodiment, the parallel processing unit 800 incorporates U memory interface 1006 modules, one memory interface 1006 per pair of memory partition unit 1000 modules, where each pair of memory partition unit 1000 modules is connected to a corresponding memory 812 device. For example, parallel processing unit 800 may be connected to up to Y memory 812 devices, such as high bandwidth memory stacks or graphics double-data-rate, version 5, synchronous dynamic random access memory, or other types of persistent storage.

In an embodiment, the memory interface 1006 implements an HBM2 memory interface and Y equals half U. In an embodiment, the HBM2 memory stacks are located on the same physical package as the parallel processing unit 800, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 812 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 800 modules process very large datasets and/or run applications for extended periods.

In an embodiment, the parallel processing unit 800 implements a multi-level memory hierarchy. In an embodiment, the memory partition unit 1000 supports a unified memory to provide a single unified virtual address space for CPU and parallel processing unit 800 memory, enabling data sharing between virtual memory systems. In an embodiment the frequency of accesses by a parallel processing unit 800 to memory located on other processors is traced to ensure that memory pages are moved to the physical memory of the parallel processing unit 800 that is accessing the pages more frequently. In an embodiment, the NVLink 816 supports address translation services allowing the parallel processing unit 800 to directly access a CPU's page tables and providing full access to CPU memory by the parallel processing unit 800.

In an embodiment, copy engines transfer data between multiple parallel processing unit 800 modules or between parallel processing unit 800 modules and CPUs. The copy engines can generate page faults for addresses that are not mapped into the page tables. The memory partition unit 1000 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 812 or other system memory may be fetched by the memory partition unit 1000 and stored in the level two cache 1004, which is located on-chip and is shared between the various general processing cluster 900 modules. As shown, each memory partition unit 1000 includes a portion of the level two cache 1004 associated with a corresponding memory 812 device. Lower level caches may then be implemented in various units within the general processing cluster 900 modules. For example, each of the streaming multiprocessor 1100 modules may implement an L1 cache. The L1 cache is private memory that is dedicated to a particular streaming multiprocessor 1100. Data from the level two cache 1004 may be fetched and stored in each of the L1 caches for processing in the functional units of the streaming multiprocessor 1100 modules. The level two cache 1004 is coupled to the memory interface 1006 and the crossbar 814.

The raster operations unit 1002 performs graphics raster operations related to pixel color, such as color compression, pixel blending, and the like. The raster operations unit 1002 also implements depth testing in conjunction with the raster engine 908, receiving a depth for a sample location associated with a pixel fragment from the culling engine of the raster engine 908. The depth is tested against a corresponding depth in a depth buffer for a sample location associated with the fragment. If the fragment passes the depth test for the sample location, then the raster operations unit 1002 updates the depth buffer and transmits a result of the depth test to the raster engine 908. It will be appreciated that the number of partition memory partition unit 1000 modules may be different than the number of general processing cluster 900 modules and, therefore, each raster operations unit 1002 may be coupled to each of the general processing cluster 900 modules. The raster operations unit 1002 tracks packets received from the different general processing cluster 900 modules and determines which general processing cluster 900 that a result generated by the raster operations unit 1002 is routed to through the crossbar 814. Although the raster operations unit 1002 is included within the memory partition unit 1000 in FIG. 10, in other embodiment, the raster operations unit 1002 may be outside of the memory partition unit 1000. For example, the raster operations unit 1002 may reside in the general processing cluster 900 or another unit.

Figure 11:
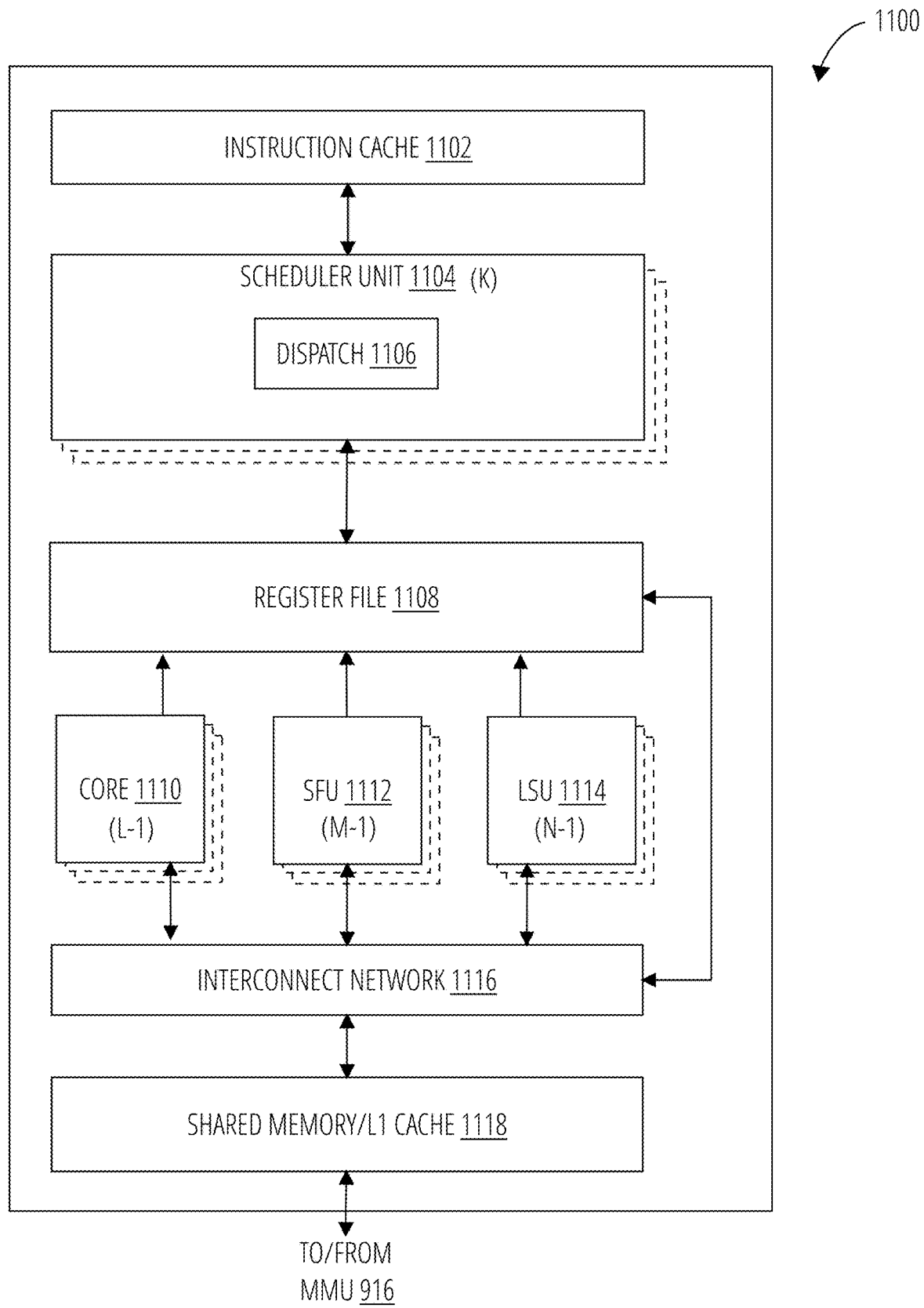
FIG. 11 depicts a streaming multiprocessor 1100 in accordance with one embodiment.

FIG. 11 illustrates the streaming multiprocessor 1100 of FIG. 9, in accordance with an embodiment. As shown in FIG. 11, the streaming multiprocessor 1100 includes an instruction cache 1102, one or more scheduler unit 1104 modules (e.g., such as scheduler unit 808), a register file 1108, one or more processing core 1110 modules, one or more special function unit 1112 modules, one or more load/store unit 1114 modules, an interconnect network 1116, and a shared memory/L1 cache 1118.

As described above, the work distribution unit 810 dispatches tasks for execution on the general processing cluster 900 modules of the parallel processing unit 800. The tasks are allocated to a particular data processing cluster 906 within a general processing cluster 900 and, if the task is associated with a shader program, the task may be allocated to a streaming multiprocessor 1100. The scheduler unit 808 receives the tasks from the work distribution unit 810 and manages instruction scheduling for one or more thread blocks assigned to the streaming multiprocessor 1100. The scheduler unit 1104 schedules thread blocks for execution as warps of parallel threads, where each thread block is allocated at least one warp. In an embodiment, each warp executes 32 threads. The scheduler unit 1104 may manage a plurality of different thread blocks, allocating the warps to the different thread blocks and then dispatching instructions from the plurality of different cooperative groups to the various functional units (e.g., core 1110 modules, special function unit 1112 modules, and load/store unit 1114 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1106 unit is configured within the scheduler unit 1104 to transmit instructions to one or more of the functional units. In one embodiment, the scheduler unit 1104 includes two dispatch 1106 units that enable two different instructions from the same warp to be dispatched during each clock cycle. In alternative embodiments, each scheduler unit 1104 may include a single dispatch 1106 unit or additional dispatch 1106 units.

Each streaming multiprocessor 1100 includes a register file 1108 that provides a set of registers for the functional units of the streaming multiprocessor 1100. In an embodiment, the register file 1108 is divided between each of the functional units such that each functional unit is allocated a dedicated portion of the register file 1108. In another embodiment, the register file 1108 is divided between the different warps being executed by the streaming multiprocessor 1100. The register file 1108 provides temporary storage for operands connected to the data paths of the functional units.

Each streaming multiprocessor 1100 comprises L processing core 1110 modules. In an embodiment, the streaming multiprocessor 1100 includes a large number (e.g., 128, etc.) of distinct processing core 1110 modules. Each core 1110 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1110 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1110 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1100 also comprises M special function unit 1112 modules that perform special functions (e.g., attribute evaluation, reciprocal square root, and the like). In an embodiment, the special function unit 1112 modules may include a tree traversal unit configured to traverse a hierarchical tree data structure. In an embodiment, the special function unit 1112 modules may include texture unit configured to perform texture map filtering operations. In an embodiment, the texture units are configured to load texture maps (e.g., a 2D array of texels) from the memory 812 and sample the texture maps to produce sampled texture values for use in shader programs executed by the streaming multiprocessor 1100. In an embodiment, the texture maps are stored in the shared memory/L1 cache 1118. The texture units implement texture operations such as filtering operations using mip-maps (e.g., texture maps of varying levels of detail). In an embodiment, each streaming multiprocessor 1100 includes two texture units.

Each streaming multiprocessor 1100 also comprises N load/store unit 1114 modules that implement load and store operations between the shared memory/L1 cache 1118 and the register file 1108. Each streaming multiprocessor 1100 includes an interconnect network 1116 that connects each of the functional units to the register file 1108 and the load/store unit 1114 to the register file 1108 and shared memory/L1 cache 1118. In an embodiment, the interconnect network 1116 is a crossbar that can be configured to connect any of the functional units to any of the registers in the register file 1108 and connect the load/store unit 1114 modules to the register file 1108 and memory locations in shared memory/L1 cache 1118.

The shared memory/L1 cache 1118 is an array of on-chip memory that allows for data storage and communication between the streaming multiprocessor 1100 and the primitive engine 912 and between threads in the streaming multiprocessor 1100. In an embodiment, the shared memory/L1 cache 1118 comprises 128 KB of storage capacity and is in the path from the streaming multiprocessor 1100 to the memory partition unit 1000. The shared memory/L1 cache 1118 can be used to cache reads and writes. One or more of the shared memory/L1 cache 1118, level two cache 1004, and memory 812 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1118 enables the shared memory/L1 cache 1118 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 8, are bypassed, creating a much simpler programming model. In the general purpose parallel computation configuration, the work distribution unit 810 assigns and distributes blocks of threads directly to the data processing cluster 906 modules. The threads in a block execute the same program, using a unique thread ID in the calculation to ensure each thread generates unique results, using the streaming multiprocessor 1100 to execute the program and perform calculations, shared memory/L1 cache 1118 to communicate between threads, and the load/store unit 1114 to read and write global memory through the shared memory/L1 cache 1118 and the memory partition unit 1000. When configured for general purpose parallel computation, the streaming multiprocessor 1100 can also write commands that the scheduler unit 808 can use to launch new work on the data processing cluster 906 modules.

The parallel processing unit 800 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 800 is embodied on a single semiconductor substrate. In another embodiment, the parallel processing unit 800 is included in a system-on-a-chip (SoC) along with one or more other devices such as additional parallel processing unit 800 modules, the memory 812, a reduced instruction set computer (RISC) CPU, a memory management unit (MMU), a digital-to-analog converter (DAC), and the like.

In an embodiment, the parallel processing unit 800 may be included on a graphics card that includes one or more memory devices. The graphics card may be configured to interface with a PCIe slot on a motherboard of a desktop computer. In yet another embodiment, the parallel processing unit 800 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 12:
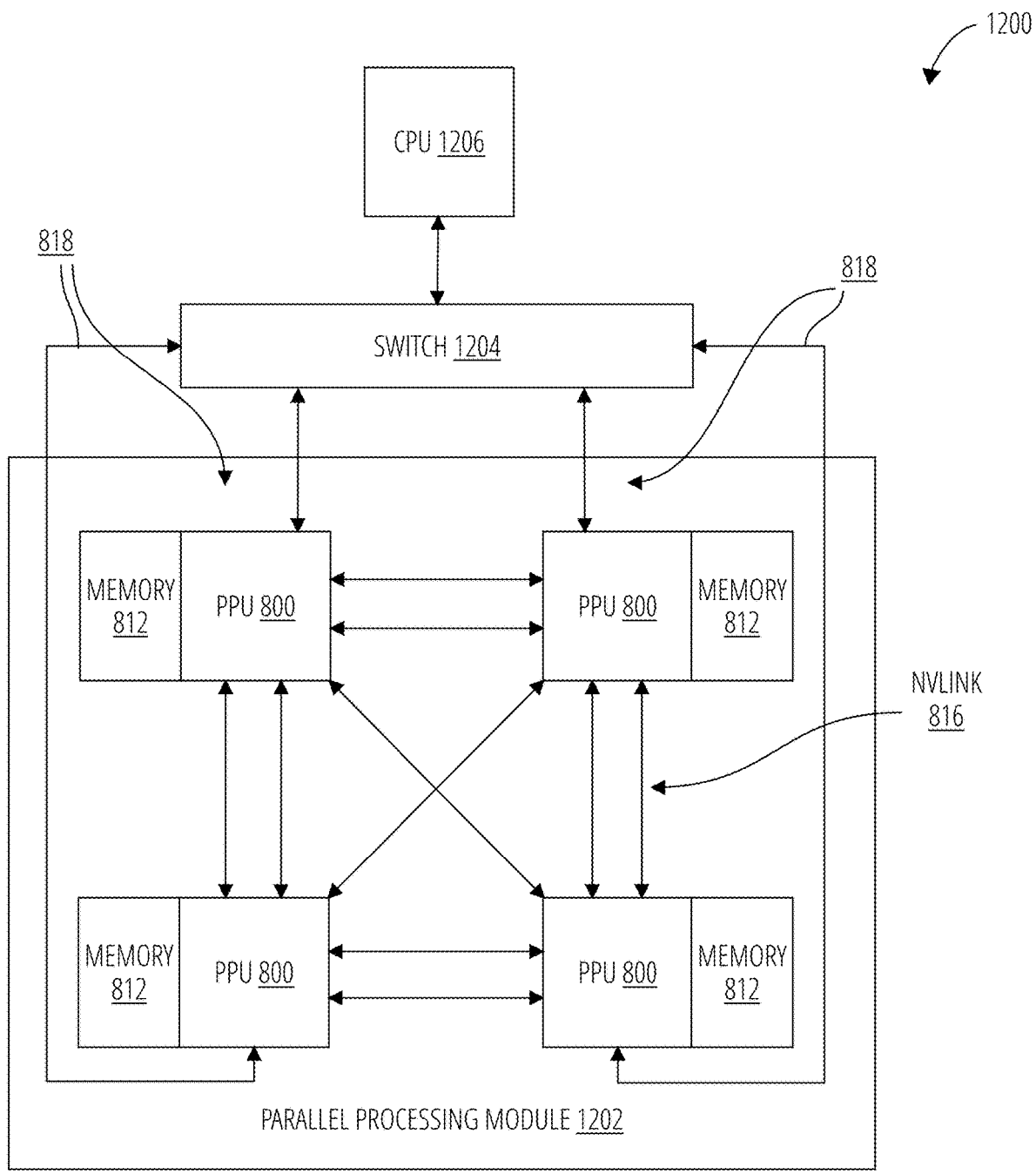
FIG. 12 depicts a processing system 1200 in accordance with one embodiment.

FIG. 12 is a conceptual diagram of a processing system 1200 implemented using the parallel processing unit 800 of FIG. 8, in accordance with an embodiment. The processing system 1200 includes a central processing unit 1206, switch 1204, and multiple parallel processing unit 800 modules each and respective memory 812 modules. The NVLink 816 provides high-speed communication links between each of the parallel processing unit 800 modules. Although a particular number of NVLink 816 and interconnect 818 connections are illustrated in FIG. 12, the number of connections to each parallel processing unit 800 and the central processing unit 1206 may vary. The switch 1204 interfaces between the interconnect 818 and the central processing unit 1206. The parallel processing unit 800 modules, memory 812 modules, and NVLink 816 connections may be situated on a single semiconductor platform to form a parallel processing module 1202. In an embodiment, the switch 1204 supports two or more protocols to interface between various different connections and/or links.

In another embodiment (not shown), the NVLink 816 provides one or more high-speed communication links between each of the parallel processing unit 800 modules and the central processing unit 1206 and the switch 1204 interfaces between the interconnect 818 and each of the parallel processing unit 800 modules. The parallel processing unit 800 modules, memory 812 modules, and interconnect 818 may be situated on a single semiconductor platform to form a parallel processing module 1202. In yet another embodiment (not shown), the interconnect 818 provides one or more communication links between each of the parallel processing unit 800 modules and the central processing unit 1206 and the switch 1204 interfaces between each of the parallel processing unit 800 modules using the NVLink 816 to provide one or more high-speed communication links between the parallel processing unit 800 modules. In another embodiment, the NVLink 816 provides one or more high-speed communication links between the parallel processing unit 800 modules and the central processing unit 1206 through the switch 1204. In yet another embodiment (not shown), the interconnect 818 provides one or more communication links between each of the parallel processing unit 800 modules directly. One or more of the NVLink 816 high-speed communication links may be implemented as a physical NVLink interconnect or either an on-chip or on-die interconnect using the same protocol as the NVLink 816.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1202 may be implemented as a circuit board substrate and each of the parallel processing unit 800 modules and/or memory 812 modules may be packaged devices. In an embodiment, the central processing unit 1206, switch 1204, and the parallel processing module 1202 are situated on a single semiconductor platform.

In an embodiment, the signaling rate of each NVLink 816 is 20 to 25 Gigabits/second and each parallel processing unit 800 includes six NVLink 816 interfaces (as shown in FIG. 12, five NVLink 816 interfaces are included for each parallel processing unit 800). Each NVLink 816 provides a data transfer rate of 25 Gigabytes/second in each direction, with six links providing 300 Gigabytes/second. The NVLink 816 can be used exclusively for PPU-to-PPU communication as shown in FIG. 12, or some combination of PPU-to-PPU and PPU-to-CPU, when the central processing unit 1206 also includes one or more NVLink 816 interfaces.

In an embodiment, the NVLink 816 allows direct load/ store/atomic access from the central processing unit 1206 to each parallel processing unit 800 module's memory 812. In an embodiment, the NVLink 816 supports coherency operations, allowing data read from the memory 812 modules to be stored in the cache hierarchy of the central processing unit 1206, reducing cache access latency for the central processing unit 1206. In an embodiment, the NVLink 816 includes support for Address Translation Services (ATS), allowing the parallel processing unit 800 to directly access page tables within the central processing unit 1206. One or more of the NVLink 816 may also be configured to operate in a low-power mode.

Figure 13:
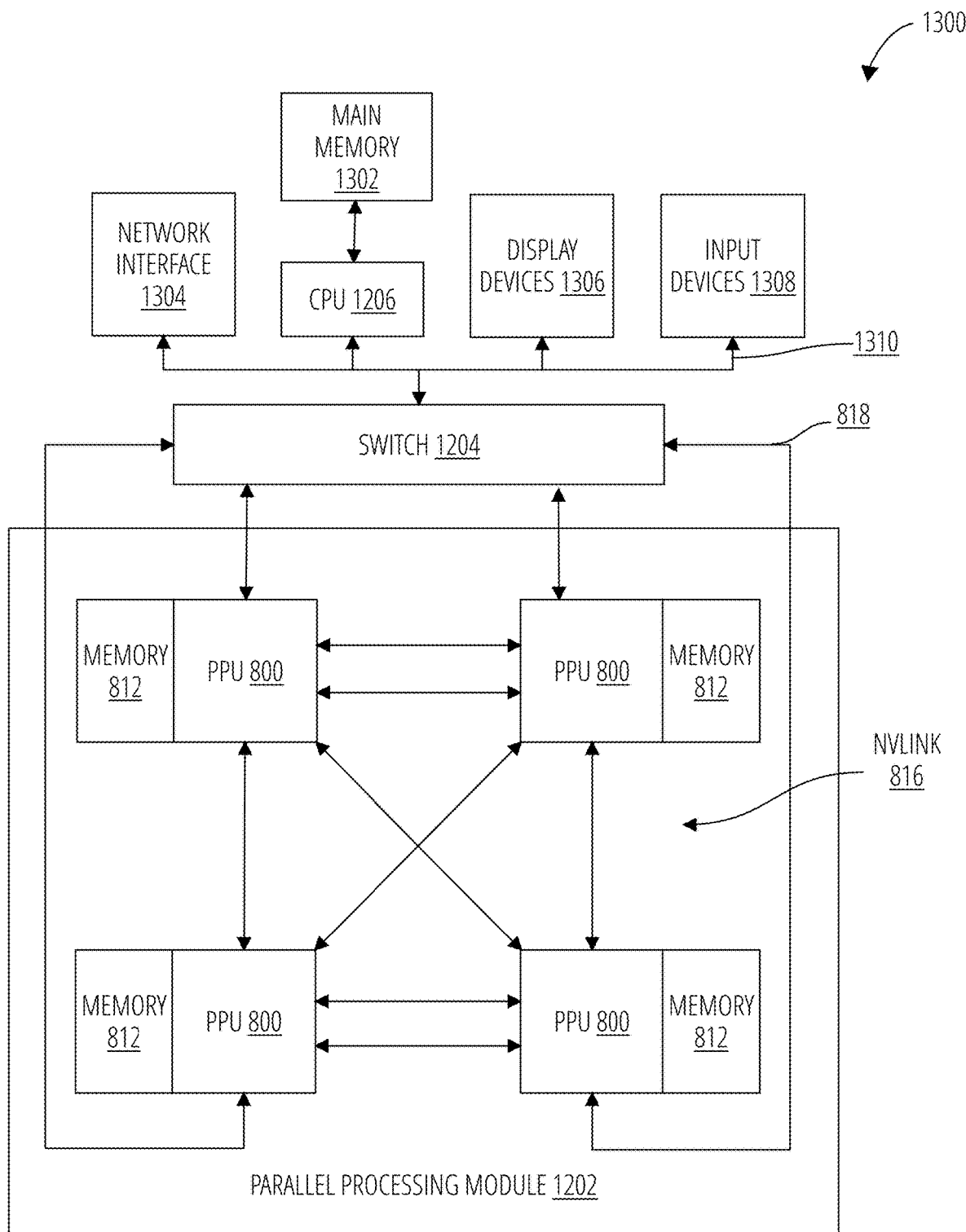
FIG. 13 depicts an exemplary processing system 1300 in accordance with another embodiment.

FIG. 13 depicts an exemplary processing system 1300 in which the various architecture and/or functionality of the various previous embodiments may be implemented. As shown, an exemplary processing system 1300 is provided including at least one central processing unit 1206 that is connected to a communications bus 1310. The communication communications bus 1310 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1300 also includes a main memory 1302. Control logic (software) and data are stored in the main memory 1302 which may take the form of random access memory (RAM).

The exemplary processing system 1300 also includes input devices 1308, the parallel processing module 1202, and display devices 1306, e.g. a conventional CRT (cathode ray tube), LCD (liquid crystal display), LED (light emitting diode), plasma display or the like. User input may be received from the input devices 1308, e.g., keyboard, mouse, touchpad, microphone, and the like. Each of the foregoing modules and/or devices may even be situated on a single semiconductor platform to form the exemplary processing system 1300. Alternately, the various modules may also be situated separately or in various combinations of semiconductor platforms per the desires of the user.

Further, the exemplary processing system 1300 may be coupled to a network (e.g., a telecommunications network, local area network (LAN), wireless network, wide area network (WAN) such as the Internet, peer-to-peer network, cable network, or the like) through a network interface 1304 for communication purposes.

The exemplary processing system 1300 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1302 and/or the secondary storage. Such computer programs, when executed, enable the exemplary processing system 1300 to perform various functions. The main memory 1302, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1300 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

FIG. 13 is a conceptual diagram of a graphics processing pipeline 1400 implemented by the parallel processing unit 800 of FIG. 8, in accordance with an embodiment. In an embodiment, the parallel processing unit 800 comprises a graphics processing unit (GPU). The parallel processing unit 800 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 800 can be configured to process the graphics primitives to generate a frame buffer (e.g., pixel data for each of the pixels of the display).

An application writes model data for a scene (e.g., a collection of vertices and attributes) to a memory such as a system memory or memory 812. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1100 modules of the parallel processing unit 800 including one or more of a vertex shader, hull shader, domain shader, geometry shader, and a pixel shader. For example, one or more of the streaming multiprocessor 1100 modules may be configured to execute a vertex shader program that processes a number of vertices defined by the model data. In an embodiment, the different streaming multiprocessor 1100 modules may be configured to execute different shader programs concurrently. For example, a first subset of streaming multiprocessor 1100 modules may be configured to execute a vertex shader program while a second subset of streaming multiprocessor 1100 modules may be configured to execute a pixel shader program. The first subset of streaming multiprocessor 1100 modules processes vertex data to produce processed vertex data and writes the processed vertex data to the level two cache 1004 and/or the memory 812. After the processed vertex data is rasterized (e.g., transformed from three-dimensional data into two-dimensional data in screen space) to produce fragment data, the second subset of streaming multiprocessor 1100 modules executes a pixel shader to produce processed fragment data, which is then blended with other processed fragment data and written to the frame buffer in memory 812. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1400 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1400 receives input data 601 that is transmitted from one stage to the next stage of the graphics processing pipeline 1400 to generate output data 1404. In an embodiment, the graphics processing pipeline 1400 may represent a graphics processing pipeline defined by the OpenGL® API. As an option, the graphics processing pipeline 1400 may be implemented in the context of the functionality and architecture of the previous Figures and/or any subsequent Figure(s).

Figure 14:
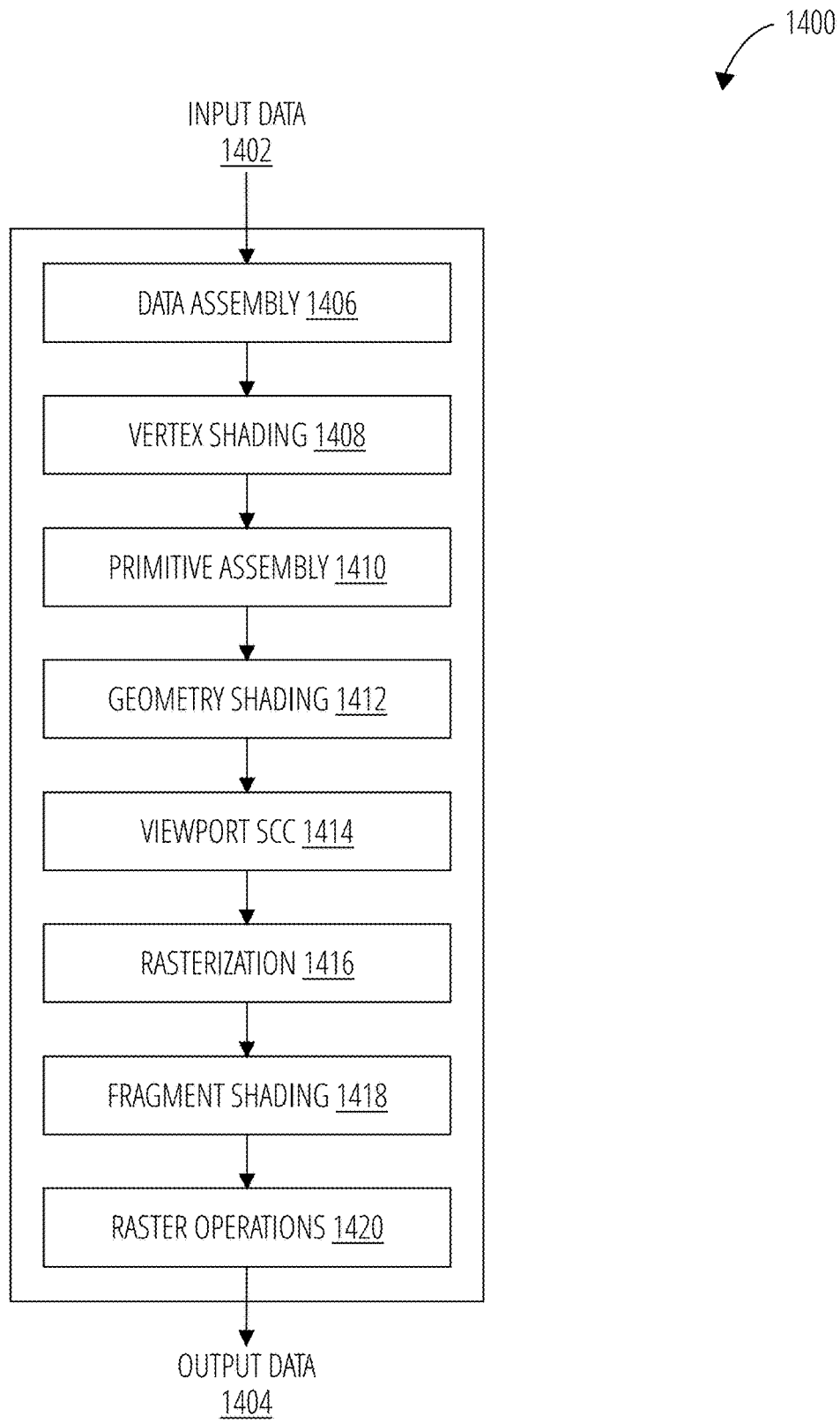
FIG. 14 depicts a graphics processing pipeline 1400 in accordance with one embodiment.

As shown in FIG. 14, the graphics processing pipeline 1400 comprises a pipeline architecture that includes a number of stages. The stages include, but are not limited to, a data assembly 1406 stage, a vertex shading 1408 stage, a primitive assembly 1410 stage, a geometry shading 1412 stage, a viewport SCC 1414 stage, a rasterization 1416 stage, a fragment shading 1418 stage, and a raster operations 1420 stage. In an embodiment, the input data 1402 comprises commands that configure the processing units to implement the stages of the graphics processing pipeline 1400 and geometric primitives (e.g., points, lines, triangles, quads, triangle strips or fans, etc.) to be processed by the stages. The output data 1404 may comprise pixel data (e.g., color data) that is copied into a frame buffer or other type of surface data structure in a memory.

The data assembly 1406 stage receives the input data 1402 that specifies vertex data for high-order surfaces, primitives, or the like. The data assembly 1406 stage collects the vertex data in a temporary storage or queue, such as by receiving a command from the host processor that includes a pointer to a buffer in memory and reading the vertex data from the buffer. The vertex data is then transmitted to the vertex shading 1408 stage for processing.

The vertex shading 1408 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1408 stage may manipulate individual vertex attributes such as position, color, texture coordinates, and the like. In other words, the vertex shading 1408 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1408 stage generates transformed vertex data that is transmitted to the primitive assembly 1410 stage.

The primitive assembly 1410 stage collects vertices output by the vertex shading 1408 stage and groups the vertices into geometric primitives for processing by the geometry shading 1412 stage. For example, the primitive assembly 1410 stage may be configured to group every three consecutive vertices as a geometric primitive (e.g., a triangle) for transmission to the geometry shading 1412 stage. In some embodiments, specific vertices may be reused for consecutive geometric primitives (e.g., two consecutive triangles in a triangle strip may share two vertices). The primitive assembly 1410 stage transmits geometric primitives (e.g., a collection of associated vertices) to the geometry shading 1412 stage.

The geometry shading 1412 stage processes geometric primitives by performing a set of operations (e.g., a geometry shader or program) on the geometric primitives. Tessellation operations may generate one or more geometric primitives from each geometric primitive. In other words, the geometry shading 1412 stage may subdivide each geometric primitive into a finer mesh of two or more geometric primitives for processing by the rest of the graphics processing pipeline 1400. The geometry shading 1412 stage transmits geometric primitives to the viewport SCC 1414 stage.

In an embodiment, the graphics processing pipeline 1400 may operate within a streaming multiprocessor and the vertex shading 1408 stage, the primitive assembly 1410 stage, the geometry shading 1412 stage, the fragment shading 1418 stage, and/or hardware/software associated therewith, may sequentially perform processing operations. Once the sequential processing operations are complete, in an embodiment, the viewport SCC 1414 stage may utilize the data. In an embodiment, primitive data processed by one or more of the stages in the graphics processing pipeline 1400 may be written to a cache (e.g. L1 cache, a vertex cache, etc.). In this case, in an embodiment, the viewport SCC 1414 stage may access the data in the cache. In an embodiment, the viewport SCC 1414 stage and the rasterization 1416 stage are implemented as fixed function circuitry.

The viewport SCC 1414 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1416 stage.

The rasterization 1416 stage converts the 3D geometric primitives into 2D fragments (e.g. capable of being utilized for display, etc.). The rasterization 1416 stage may be configured to utilize the vertices of the geometric primitives to setup a set of plane equations from which various attributes can be interpolated. The rasterization 1416 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1416 stage generates fragment data (e.g., interpolated vertex attributes associated with a particular sample location for each covered pixel) that are transmitted to the fragment shading 1418 stage.

The fragment shading 1418 stage processes fragment data by performing a set of operations (e.g., a fragment shader or a program) on each of the fragments. The fragment shading 1418 stage may generate pixel data (e.g., color values) for the fragment such as by performing lighting operations or sampling texture maps using interpolated texture coordinates for the fragment. The fragment shading 1418 stage generates pixel data that is transmitted to the raster operations 1420 stage.

The raster operations 1420 stage may perform various operations on the pixel data such as performing alpha tests, stencil tests, and blending the pixel data with other pixel data corresponding to other fragments associated with the pixel. When the raster operations 1420 stage has finished processing the pixel data (e.g., the output data 1404), the pixel data may be written to a render target such as a frame buffer, a color buffer, or the like.

It will be appreciated that one or more additional stages may be included in the graphics processing pipeline 1400 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1412 stage). Other types of graphics processing pipelines are contemplated as being within the scope of the present disclosure. Furthermore, any of the stages of the graphics processing pipeline 1400 may be implemented by one or more dedicated hardware units within a graphics processor such as parallel processing unit 800. Other stages of the graphics processing pipeline 1400 may be implemented by programmable hardware units such as the streaming multiprocessor 1100 of the parallel processing unit 800.

The graphics processing pipeline 1400 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 800. The API provides an abstraction for a programmer that lets a programmer utilize specialized graphics hardware, such as the parallel processing unit 800, to generate the graphical data without requiring the programmer to utilize the specific instruction set for the parallel processing unit 800. The application may include an API call that is routed to the device driver for the parallel processing unit 800. The device driver interprets the API call and performs various operations to respond to the API call. In some instances, the device driver may perform operations by executing instructions on the CPU. In other instances, the device driver may perform operations, at least in part, by launching operations on the parallel processing unit 800 utilizing an input/output interface between the CPU and the parallel processing unit 800. In an embodiment, the device driver is configured to implement the graphics processing pipeline 1400 utilizing the hardware of the parallel processing unit 800.

Various programs may be executed within the parallel processing unit 800 in order to implement the various stages of the graphics processing pipeline 1400. For example, the device driver may launch a kernel on the parallel processing unit 800 to perform the vertex shading 1408 stage on one streaming multiprocessor 1100 (or multiple streaming multiprocessor 1100 modules). The device driver (or the initial kernel executed by the parallel processing unit 800) may also launch other kernels on the parallel processing unit 800 to perform other stages of the graphics processing pipeline 1400, such as the geometry shading 1412 stage and the fragment shading 1418 stage. In addition, some of the stages of the graphics processing pipeline 1400 may be implemented on fixed unit hardware such as a rasterizer or a data assembler implemented within the parallel processing unit 800. It will be appreciated that results from one kernel may be processed by one or more intervening fixed function hardware units before being processed by a subsequent kernel on a streaming multiprocessor 1100.

Figure 15:
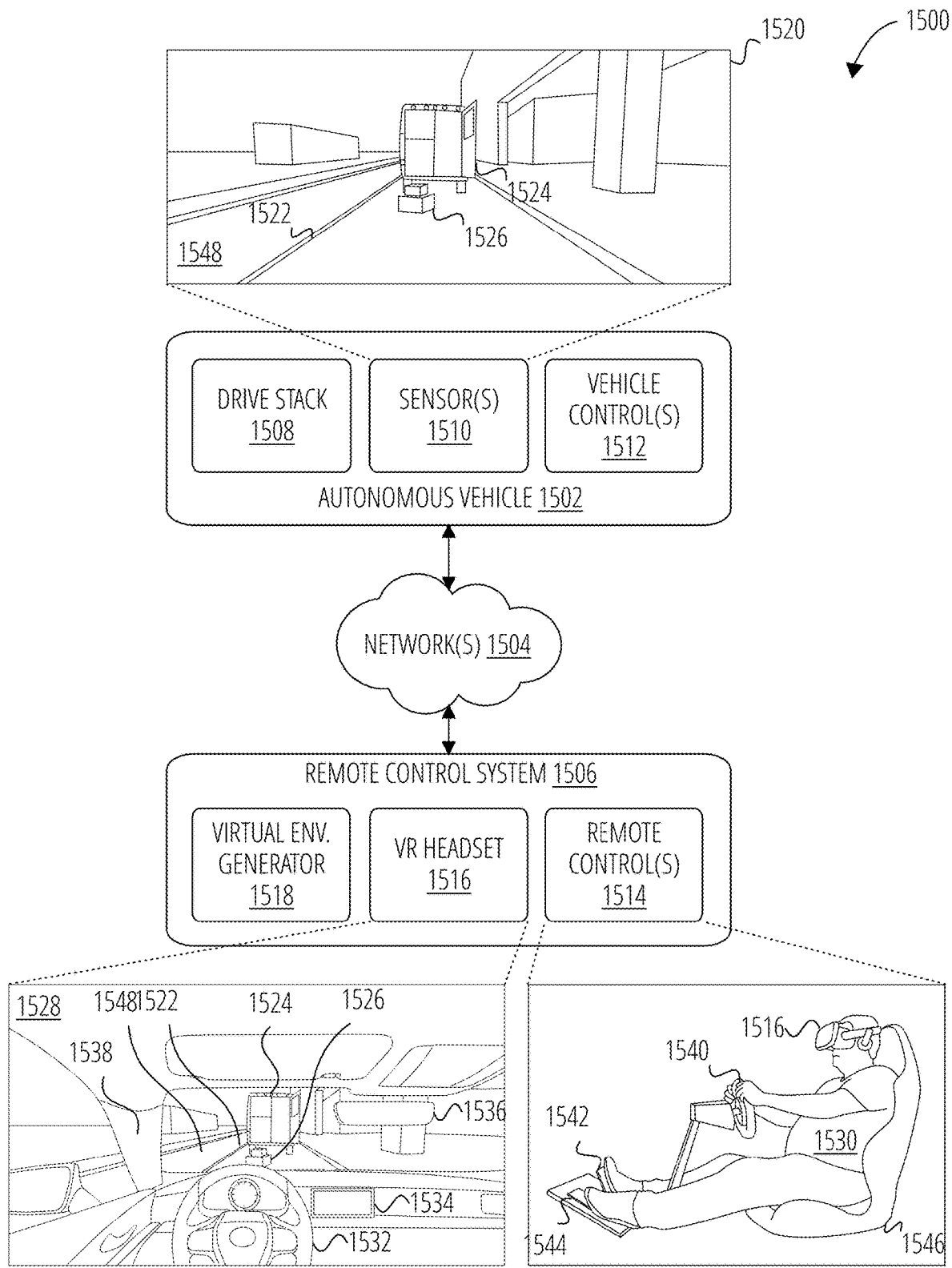
FIG. 15 illustrates an autonomous vehicle control system 1500 in accordance with one embodiment.
Figure 16:
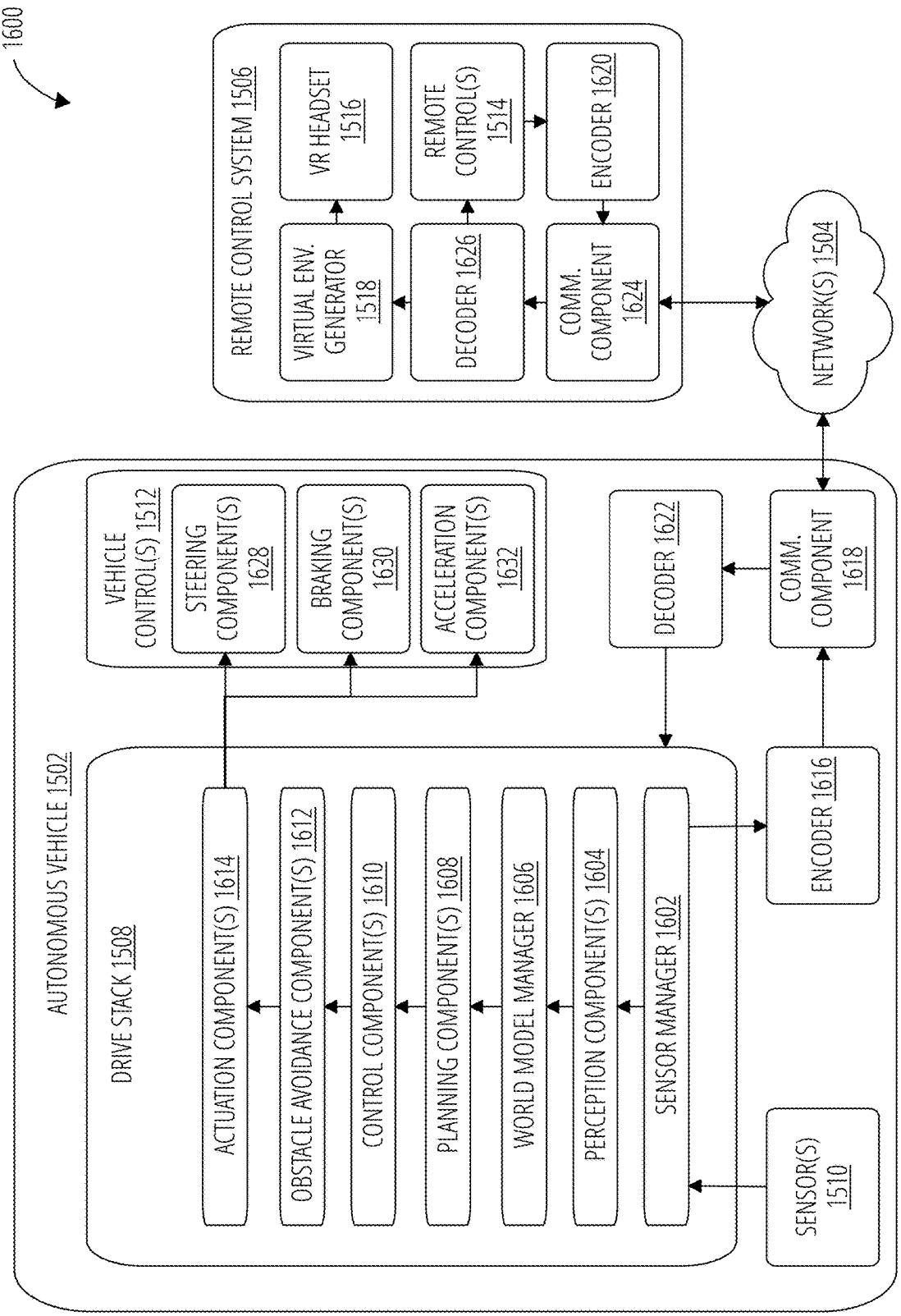
FIG. 16 illustrates an autonomous vehicle control system 1600 in accordance with one embodiment.

FIG. 15 and FIG. 16 are block diagrams of an example autonomous vehicle control system 1500, in accordance with some embodiments of the present disclosure. The disclosed mechanisms may be utilized to generate and/or improve behavioral policies for the autonomous vehicle control system 1500 and autonomous vehicle control system 1600. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The illustration of FIG. 15 may represent a more generalized illustration of the autonomous vehicle control system 1500 as compared to the illustration of FIG. 16. The components, features, and/or functionality of the autonomous vehicle 1502 described with respect to FIG. 15 and FIG. 16 may be implemented using the features, components, and/or functionality described in more detail herein with respect to FIG. 25-FIG. 28.

The autonomous vehicle control system 1500 may include an autonomous vehicle 1502, one or more network(s) 1504, and a remote control system 1506. The autonomous vehicle 1502 may include a drive stack 1508, sensor(s) 1510, and/or vehicle control(s) 1512. The drive stack 1508 may represent an autonomous driving software stack, as described in more detail herein with respect to FIG. 16. The sensor(s) 1510 may include any number of sensors of the autonomous vehicle 1502, including, with reference to FIGs. FIG. 25-FIG. 28, global navigation satellite system sensor(s) (GNSS sensor(s) 2514), RADAR sensor(s) 2528, ultrasonic sensor(s) 2542, LIDAR sensor(s) 2530, inertial measurement unit sensor(s) (IMU sensor(s) 2508), microphone(s) 2540, stereo camera(s) 2504, wide-view camera(s) 2506, infrared camera(s) 2502, surround camera(s) 2518, long range long-range and/or mid-range camera(s) 2602, and/or other sensor types. The sensor(s) 1510 may generate sensor data (e.g., image data) representing a field(s) of view of the sensor(s) 1510.

For example, the sensor data may represent a field of view of each of a number of cameras of the autonomous vehicle 1502. In some examples, the sensor data may be generated from any number of cameras that may provide a representation of substantially 360 degrees around the autonomous vehicle 1502 (e.g., fields of view that extend substantially parallel to a ground plane). In such an example, the fields of view may include a left side of the autonomous vehicle 1502, a rear of the autonomous vehicle 1502, a front of the autonomous vehicle 1502, and/or a side of the autonomous vehicle 1502. The sensor data may further be generated to include fields of view above and/or below the autonomous vehicle 1502 (e.g., of the ground or driving surface around the autonomous vehicle 1502 and/or of the space above the autonomous vehicle 1502). In some examples, the sensor data may be generated to include blind spots of the autonomous vehicle 1502 (e.g., using wing-mirror mounted camera(s)). As another example, the sensor data may be generated from some or all of the camera(s) illustrated in FIG. 26. As such, the sensor data generated by the autonomous vehicle 1502 may include sensor data from any number of sensors without departing from the scope of the present disclosure.

With reference to FIG. 15, an image 1520 may include a representation of sensor data (e.g., image data) generated from a front-facing camera of the autonomous vehicle 1502. The image 1520 may include a two-way, solid line 1522 divided street 1548, such that the autonomous vehicle 1502, when following the rules of the road, may not be allowed to cross the solid line 1522 to pass a vehicle or object in the lane of the autonomous vehicle 1502. In the image 1520, a van 1524 may be stopped in the lane of the autonomous vehicle 1502 to unload boxes, so the autonomous vehicle 1502 may have come to a stop a safe distance behind the van 1524. By following the constraints of the autonomous vehicle 1502 (e.g., due to the rules of the road), the autonomous vehicle 1502 may, without the features and functionality of the present disclosure, remain stopped behind the van 1524 until the van 1524 moves (or may pass control to a human operator, depending on the embodiment). However, in the current autonomous vehicle control system 1500, the autonomous vehicle 1502 may determine, in response to encountering the situation represented in the image 1520, to transfer at least partial control to the remote control system 1506. In other examples, the determination to transfer the control of the autonomous vehicle 1502 (e.g., to initiate a remote control session) may be made by the remote operator (or otherwise may be made at the remote control system 1506); by a passenger of the autonomous vehicle 1502 (e.g., using a command or signal, such as a voice command, an input to a user interface element, a selection of a physical button, etc.); and/or by another actor. For example, sensor data may be analyzed at the remote control system 1506 (and/or by another system remote from the autonomous vehicle 1502) and may be used to determine whether a remote control session should be initiated.

Although the situation represented in FIG. 15 includes a van 1524 blocking the lane of the autonomous vehicle 1502, this is not intended to be limiting. For example, any number of situations, scenarios, and/or environments, including but not limited to those described herein, may lead to a determination by the autonomous vehicle 1502 to transfer at least partial control to the remote control system 1506 without departing from the scope of the present disclosure. In other examples, the determination may be made by the remote control system 1506 to take over control of the autonomous vehicle 1502. In any examples, proper consent may be obtained from the owner and/or operator of the autonomous vehicle 1502 in order to enable takeover by the remote operator of the remote control system 1506.

In addition to the image 1520, the autonomous vehicle 1502 may also capture additional sensor data from additional sensor(s) 1510 of the autonomous vehicle 1502, such as from a side-view camera(s), a rear-view camera(s), a surround camera(s), a wing-mirror mounted camera(s), a roof-mounted camera(s), parking camera(s) (e.g., with a field(s) of view of the ground surface around the autonomous vehicle 1502), LIDAR sensor(s), RADAR sensor(s), microphone(s), etc. The sensor data generated by the sensor(s) 1510 may be transmitted over the network(s) 1504 to the remote control system 1506. In some examples, the sensor(s) 1510 may generate the sensor data in a first format (e.g., a raw format) that may be of a first data size. In order to minimize bandwidth requirements, the sensor data may be encoded in a second format that may be of a second data size less than the first data size (e.g., to decrease the amount of data being sent over the network(s) 1504).

In addition to the sensor data that may be used to generate a representation of the environment of the autonomous vehicle 1502, vehicle state data (e.g., representative of the state of the autonomous vehicle 1502) and/or calibration data (e.g., for calibrating the remote control(s) 1514 according to the vehicle control(s) 1512) may also be transmitted over the network(s) 1504 to the remote control system 1506. For example, the vehicle state data and/or the calibration data may be determined using one or more sensor(s) 1510 of the autonomous vehicle 1502, such as the steering sensor(s)

740, speed sensor(s) 2536, brake sensor(s), IMU sensor(s) 2508, GNSS sensor(s) 2514, and/or other sensor(s) 1510. The vehicle state data may include wheel angles, steering wheel angle, location, gear (e.g., Park, Reverse, Neutral, Drive (PRND)), tire pressure, speed, velocity, orientation, etc. The calibration data may include steering sensitivity, braking sensitivity, acceleration sensitivity, etc. In some examples, the calibration data may be determined based on a make, model, or type of the autonomous vehicle 1502. This information may be encoded in the calibration data by the autonomous vehicle 1502 and/or may be determined by the remote control system 1506, such as by accessing one or more data stores (e.g., after determining identification information for the autonomous vehicle 1502).

The sensor data, the vehicle state data, and/or the calibration data may be received by the remote control system 1506 over the network(s) 1504. The network(s) 1504 may include one or more network types, such as cellular networks (e.g., 5G, 4G, LTE, etc.), Wi-Fi networks (e.g., where accessible), low power wide-area networks (LPWANs) (e.g., LoRaWAN, SigFox, etc.), and/or other network types. In some examples, the autonomous vehicle 1502 may include one or more modems and/or one or more antennas for redundancy and/or for communicating over different network types depending on network availability.

The remote control system 1506 may include a virtual environment generator 1518, a VR headset 1516, and a remote control(s) 1514. The virtual environment generator 1518 may use the sensor data, the vehicle state data, and/or the calibration data to generate a virtual environment that may represent the environment (e.g., the real-world or physical environment, such as the ground surface, the vehicles, the people or animals, the buildings, the objects, etc.) in the field(s) of view of the sensor(s) 1510 of the autonomous vehicle 1502 (e.g., the camera(s), the LIDAR sensor(s), the RADAR sensor(s), etc.), as well as represent at least a portion of the autonomous vehicle 1502 (e.g., an interior, an exterior, components, features, displays, instrument panels, etc.) and/or controls of the autonomous vehicle 1502 (e.g., a virtual steering wheel, a virtual brake pedal, a virtual gas pedal, a virtual blinker, a virtual HMI display, etc.). In some examples, the virtual environment may include virtual representations of portions of the autonomous vehicle 1502 that may not be visible to a driver or passenger of the autonomous vehicle 1502 in the real-world environment, such as the wheels at an angle (e.g., corresponding to the angle of the wheels of the autonomous vehicle 1502 in the real-world environment as determined by the vehicle state data and/or the calibration data), which may be viewable from within a virtual cockpit of the virtual vehicle by making one or more other components of the virtual vehicle fully transparent, semi-transparent (e.g., translucent), or removed from the rendering altogether.

Figure 17:
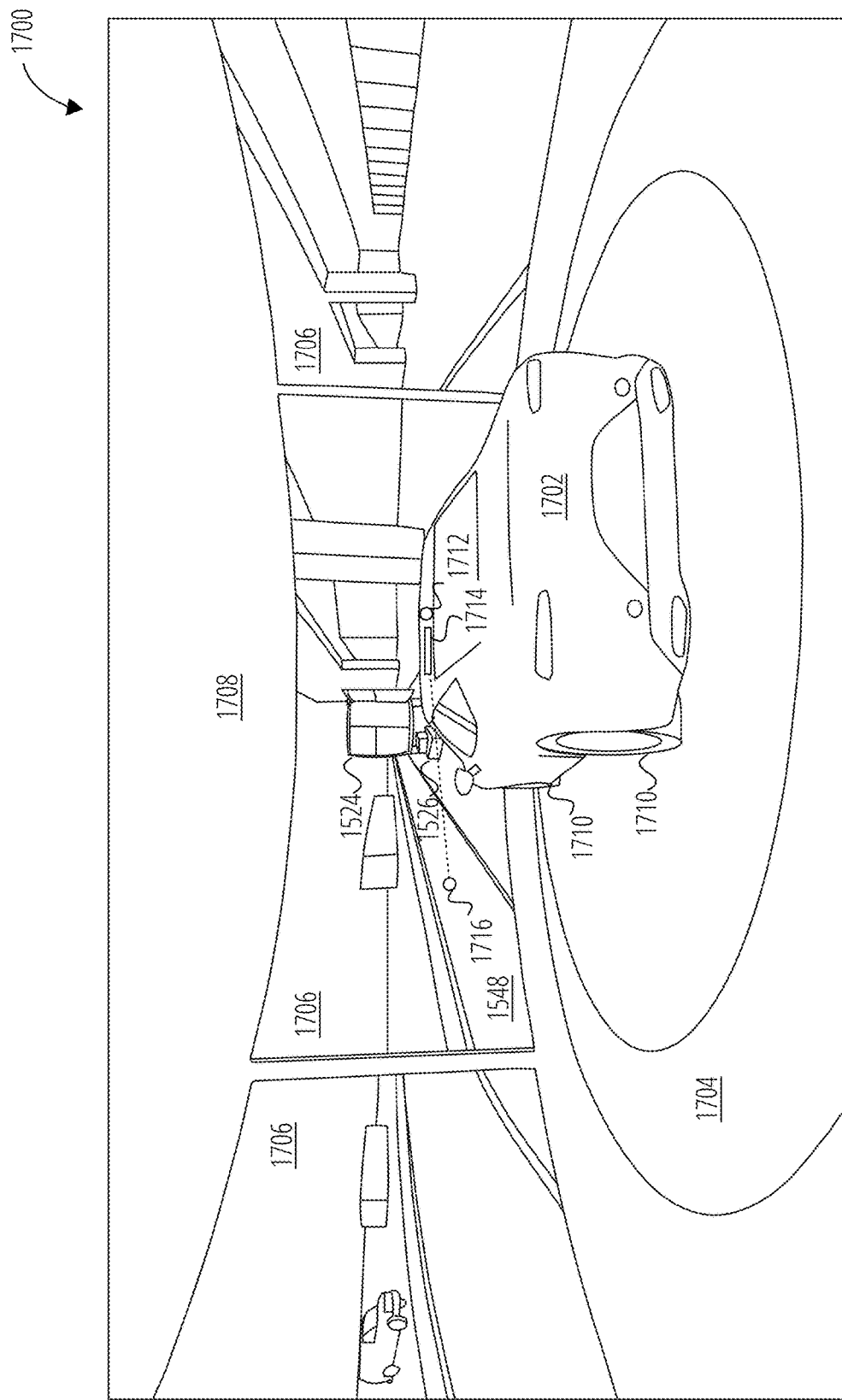
FIG. 17 illustrates a virtual environment 1700 in accordance with one embodiment.
Figure 18:
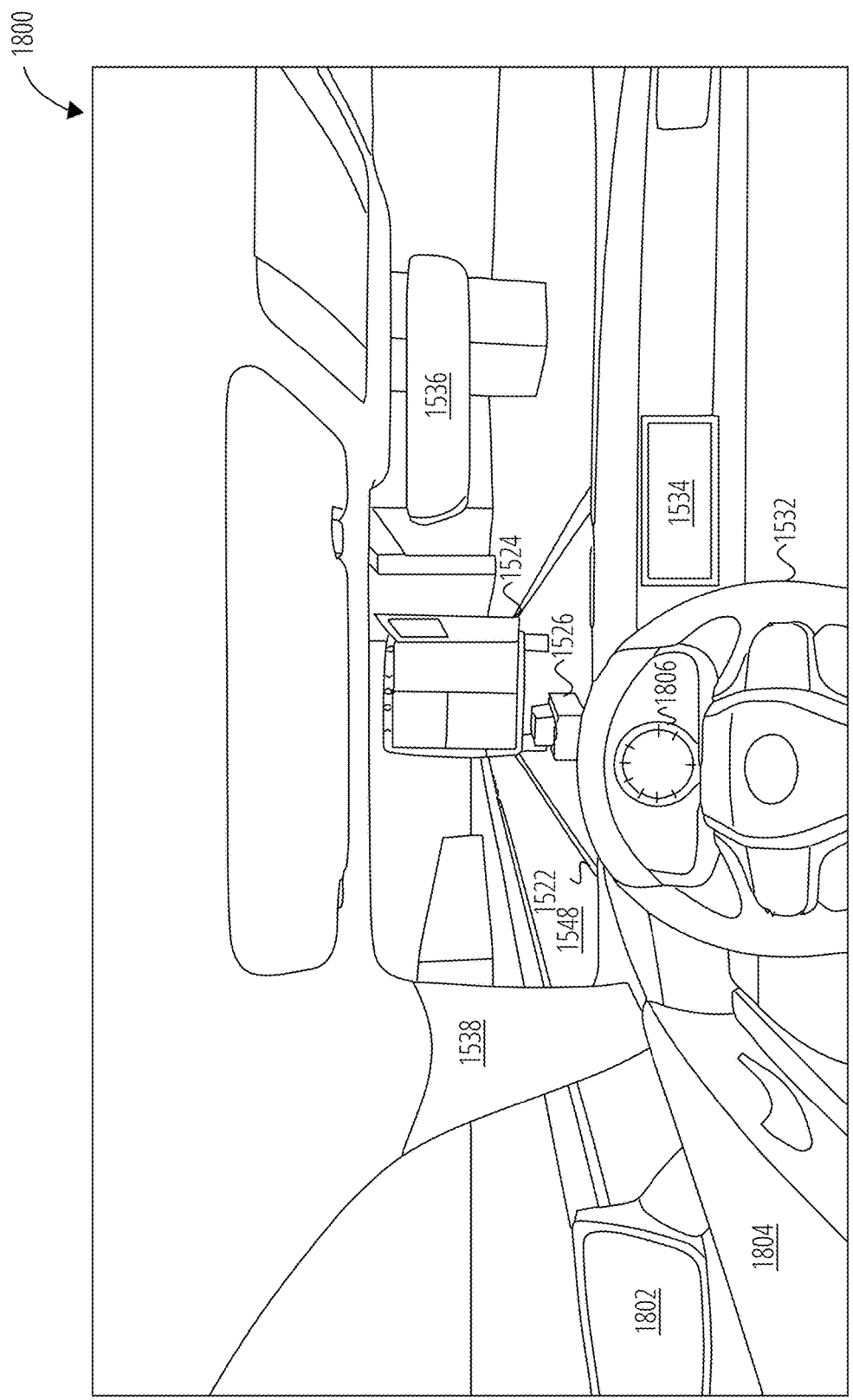
FIG. 18 illustrates a virtual environment 1800 in accordance with one embodiment.

The virtual environment may be generated from any number of vantage points of a remote operator. As non-limiting examples, the virtual environment may be generated from a vantage point within a driver's seat of the virtual vehicle (e.g., as illustrated in FIG. 18); from within another location within the virtual vehicle; and from a position outside of the virtual vehicle (e.g., as illustrated in FIG. 17), such as on top of the virtual vehicle, to the side of the virtual vehicle, behind the virtual vehicle, above the virtual vehicle, etc. In some examples, the remote operator may be able to select from any number of different vantage points and/or may be able to transition between different vantage points, even in the same remote control session. For example, the remote operator may start a remote control session from a first vantage point inside the cockpit of the virtual vehicle (e.g., in the driver's seat), and then, when navigating through a tight space or around an obstacle, may transition to a second vantage point outside of the virtual vehicle where the relationship between the tight space or the obstacle and the virtual vehicle may be more clearly visualized. In any example, the desired vantage point of the remote operator may be selectable within the remote control system. The remote operator may be able to set defaults or preferences with respect to vantage points.

The remote operator may be able to set defaults and/or preferences with respect to other information in the virtual environment, such as the representations of information that the remote operator would like to have available within the virtual environment, or more specifically with respect to the virtual vehicle in the virtual environment (e.g., the remote operator may select which features of the instrument panel should be populated, what should be displayed on a virtual HMI display, which portions of the vehicle should be transparent and/or removed, what color the virtual vehicle should be, what color the interior should be, etc.). As such, the remote operator may be able to generate a custom version of the virtual vehicle within the virtual environment. In any example, even where the virtual vehicle is not the same year, make, model, and/or type as the autonomous vehicle 1502 in the real-world environment, the virtual vehicle may be scaled to occupy a substantially similar amount of space in the virtual environment as the autonomous vehicle 1502 in the real-world environment. As such, even when the virtual vehicle is of a different size or shape as the vehicle 102, the representation of the virtual vehicle may provide a more direct visualization to the remote operator of the amount of space the autonomous vehicle 1502 occupies in the real-world environment.

In other examples, the virtual vehicle may be generated according to the year, make, model, type, and/or other information of the autonomous vehicle 1502 in the real-world environment (e.g., if the autonomous vehicle 1502 is a Year N (e.g. 2019), Make X, and Model Y, the virtual vehicle may represent a vehicle with the dimensions, and steering/driving profiles consistent with a Year N, Make X, Model Y vehicle). In such examples, the remote operator may still be able to customize the virtual vehicle, such as by removing or making transparent certain features, changing a color, changing an interior design, etc., but, in some examples, may not be able to customize the general shape or size of the vehicle.

The virtual environment (e.g., virtual environment 1528) may be rendered and displayed on a display of the VR headset 1516 of the remote operator (e.g., remote operator 1530 located in the driver's seat 1546). The virtual environment 1528 may represent a virtual vehicle—that may correspond to the autonomous vehicle 1502— from a vantage point of the driver's seat. The virtual environment 1528 may include a representation of what a passenger of the autonomous vehicle 1502 may see when sitting in the driver's seat. The camera(s) or other sensor(s) 1510 may not capture the sensor data from the same perspective of a passenger or driver of the vehicle. As a result, in order to generate the virtual environment 1528 (or other virtual environments where the vantage point does not directly correspond to a field(s) of view of the sensor(s)), the sensor data may be manipulated. For example, the sensor data may be distorted or warped, prior to displaying the rendering on the display of the VR headset 1516. In some examples, distorting or warping the sensor data may include performing a fisheye reduction technique on one more of the sensor data feeds (e.g., video feeds from one or more camera(s)). In other examples, distorting or warping the sensor data may include executing a positional warp technique to adjust a vantage point of a sensor data feed to a desired vantage point. In such an example, such as where a camera(s) is roof-mounted on the autonomous vehicle 1502, a positional warp technique may be used to adjust, or bring down, the image data feed from roof-level of the camera(s) to eye-level of a virtual driver of the virtual vehicle (e.g., the remote operator).

In examples, the sensor data may be manipulated in order to blend or stitch sensor data corresponding to different fields of view of different sensors. For example, two or more sensors may be used to generate the representation of the environment (e.g., a first camera with a first field of view to the front of the autonomous vehicle 1502, a second camera with a second field of view to a left side of the autonomous vehicle 1502, and so on). In such examples, image or video stitching techniques may be used to stitch together or combine sensor data, such as images or video, to generate a field of view (e.g., 360 degrees) for the remote operator with virtually seamless transitions between fields of view represented by the different sensor data from different sensor(s) 1510. In one or more example embodiments, the sensor data may be manipulated and presented to the remote operator in a 3D visualization (e.g., stereoscopically). For example, one or more stereo camera(s) 2504 of the autonomous vehicle 1502 may generate images, and the images may be used (e.g., using one or more neural networks, using photometric consistency, etc.) to determine depth (e.g., along a Z-axis) for portions of the real-world environment that correspond to the images. As such, the 3D visualization may be generated using the stereoscopic depth information from the stereo camera(s) 2504. In other examples, the depth information may be generated using LIDAR sensors, RADAR sensors, and/or other sensors of the autonomous vehicle 1502. In any example, the depth information may be leveraged to generate the 3D visualization for display or presentation to the remote operator within the virtual environment. In such examples, some or all of rendering or display of the virtual environment to the remote operator may include a 3D visualization.

In some examples, because the autonomous vehicle 1502 may be an autonomous vehicle capable of operating at autonomous driving level 5 (e.g., fully autonomous driving), the autonomous vehicle 1502 may not include a steering wheel. However, even in such examples, the virtual vehicle may include the steering wheel 1532 (e.g., in a position relative to a driver's seat, if the autonomous vehicle 1502 had a driver's seat) in order to provide the remote operator 1530 a natural point of reference for controlling the virtual vehicle. In addition to the steering wheel 1532, the interior of the virtual vehicle may include a rear-view mirror 1536 (which may be rendered to display image data representative of a field(s) of view of a rear-facing camera(s)), wing mirrors (which may be rendered to display image data representative of field(s) of view of side-view camera(s), wing-mounted camera(s), etc.), a virtual HMI display 1534, door handles, doors, a roof, a sunroof, seats, consoles, and/or other portions of the virtual vehicle (e.g., based on default settings, based on preferences of the remote operator, and/or preferences of another user(s) of the remote control system 1506, etc.).

As described herein, at least some of the portions of the virtual vehicle may be made at least partially transparent and/or be removed from the virtual environment. An example is support column 1538 of the vehicle chassis being at least partially transparent and/or removed from the virtual vehicle, such that objects and the surface in the virtual environment are not occluded or at least less occluded by the support column 1538. Examples of the virtual environment 1528 are described in more detail herein with respect to FIG. 18.

The instance of the virtual environment 1528 in FIG. 15 (and correspondingly, FIG. 18) may represent a time that the image 1520 was captured by the autonomous vehicle 1502, and thus may include, as viewed through a windshield of the virtual vehicle, virtual representations of the van 1524, the unloaded boxes 1526, the divided street 1548, and the solid line 1522. In some examples, such as in the virtual environment 1528, each of the virtual objects in the virtual environment may be rendered relative to the virtual vehicle to correspond to the relative location of the objects in the real-world environment with respect to the autonomous vehicle 1502 (e.g., using depth information from the sensor data). The virtual representations of the image data may include the images or video from the image data, rendered within the virtual environment. As described herein, the virtual environment may be rendered from any of a number of different vantage points (including those illustrated in FIG. 17-FIG. 18), and the virtual environment 1528 is only one, non-limiting example of a virtual environment.

The remote operator 1530 may use the remote control(s) 1514 to control the virtual vehicle in the virtual environment. The remote control(s) 1514 may include a steering wheel 1540 (or other control(s) for providing steering inputs, such as keyboards, joysticks, handheld controllers, etc.), an acceleration component 1542 (which may be a physical pedal as illustrated in FIG. 15, or may be a keyboard, a joystick, a handheld controller, a button, etc.), a braking component 1544 (which may be a physical pedal as illustrated in FIG. 15, or may be a keyboard, a joystick, a handheld controller, a button, etc.), and/or other control components, such as blinker actuators (which may be physical levers, or may be controlled using a keyboard, a joystick, a handheld controller, voice, etc.), a horn, light actuators (such as a button, lever, or knob for turning on and off lights, including driving lights, fog lights, high-beams, etc.), etc.

In some examples, the remote control(s) may include pointers (e.g., controllers or other objects) that may be used to indicate or identify a location in the environment that the virtual vehicle should navigate to. In such examples, the remote control(s) 1514 may be used to provide input to the autonomous vehicle 1502 as to where in the real-world environment the autonomous vehicle 1502 should navigate, and the autonomous vehicle 1502 may use this information to generate controls for navigating to the location. For example, with respect to the image 1520, the remote operator 1530 may point to a location in the lane to the left of the autonomous vehicle 1502 and the van 1524, such that the autonomous vehicle 1502 is able to use the information to override the rules of the road that have stopped the vehicle from passing the van 1524, and to proceed to the adjacent lane in order to pass the van 1524 and the unloaded boxes 1526. More detail is provided herein for control input types with respect to FIG. 16.

In any example, the remote operator 1530 may control the virtual vehicle through the virtual environment 1528, and the control inputs to the remote control(s) 1514 may be captured. Control data representative of each of the control inputs (e.g., as they are received by the remote control system 1506) may be transmitted to the autonomous vehicle 1502 over the network(s) 1504. In some examples, as described in more detail herein, the control data may be encoded by the remote control system 1506 prior to transmission and/or may be encoded upon receipt by the autonomous vehicle 1502. The encoding may be to convert the control data from the remote control system 1506 to vehicle control data suitable for use by the autonomous vehicle 1502. The control data may be scaled, undergo a format change, and/or other encoding may be executed to convert the control data to vehicle control data that the autonomous vehicle 1502 understands and can execute. As a result, as the remote operator 1530 controls the virtual vehicle through the virtual environment, the autonomous vehicle 1502 may be controlled through the real-world environment accordingly. With respect to the image 1520 and the virtual environment 1528, the remote operator 1530 may control the virtual vehicle to navigate around the virtual representation of the van 1524 by entering the adjacent lane of the divided street 1548 to the left of the van 1524, passing the van 1524, and then reentering the original lane. Responsive to the input controls from the remote operator 1530, the autonomous vehicle 1502 may, at substantially the same time, navigate around the van 1524 by entering the adjacent lane of the divided street 1548 in the real-world environment, proceeding past the van 1524, and then reentering the original lane of the divided street 1548.

In some examples, such as depending on the preferences of the owner and/or operator of the autonomous vehicle 1502, a remote control session may be substantially seamless to any passengers of the vehicle 102, such that the passengers may not be made aware or notice the transfer of control to the remote control system 1506 and then back to the autonomous vehicle 1502. In other examples, further depending on the preferences of the owner and/or operator, the passengers of the vehicle may be informed prior to and/or during the time when the control is passed to the remote control system 1506. For example, the remote control system 1506 may include a microphone(s) and/or a speaker(s) (e.g., headphones, standalone speakers, etc.), and the autonomous vehicle 1502 may include a microphone(s) and/or a speaker(s), such that one-way or two-way communication may take place between the passengers and the remote operator 1530. In such examples, once control is passed back to the autonomous vehicle 1502, the passengers may again be made aware of the transition.

Now referring to FIG. 16, FIG. 16 may include a more detailed illustration of the autonomous vehicle control system 1500 of FIG. 15. The autonomous vehicle 1502 may include the drive stack 1508, which may include a sensor manager 1602, perception component(s) 1604 (e.g., corresponding to a perception layer of the drive stack 1508), a world model manager 1606, planning component(s) 1608 (e.g., corresponding to a planning layer of the drive stack 1508), control component(s) 1610 (e.g., corresponding to a control layer of the drive stack 1508), obstacle avoidance component(s) (e.g., corresponding to an obstacle or collision avoidance layer of the drive stack 1508), actuation component(s) 1614 (e.g., corresponding to an actuation layer of the drive stack 1508), and/or other components corresponding to additional and/or alternative layers of the drive stack 1508.

The sensor manager 1602 may manage and/or abstract sensor data from sensor(s) 1510 of the autonomous vehicle 1502. For example, and with reference to FIG. 27, the sensor data may be generated (e.g., perpetually, at intervals, based on certain conditions) by GNSS sensor(s) 2514, RADAR sensor(s) 2528, ultrasonic sensor(s) 2542, LIDAR sensor(s) 2530, IMU sensor(s) 2508, microphone(s) 2540, stereo camera(s) 2504, wide-view camera(s) 2506, infrared camera(s) 2502, surround camera(s) 2518, long range long-range and/or mid-range camera(s) 2602, and/or other sensor types.

The sensor manager 1602 may receive the sensor data from the sensors in different formats (e.g., sensors of the same type, such as LIDAR sensors, may output sensor data in different formats), and may be configured to convert the different formats to a uniform format (e.g., for each sensor of the same type). As a result, other components, features, and/or functionality of the autonomous vehicle 1502 may use the uniform format, thereby simplifying processing of the sensor data. In some examples, the sensor manager 1602 may use a uniform format to apply control back to the sensors of the autonomous vehicle 1502, such as to set frame rates or to perform video gain control. The sensor manager 1602 may also update sensor packets or communications corresponding to the sensor data with timestamps to help inform processing of the sensor data by various components, features, and functionality of the autonomous vehicle control system 1500.

A world model manager 1606 may be used to generate, update, and/or define a world model. The world model manager 1606 may use information generated by and received from the perception component(s) 1604 of the drive stack 1508. The perception component(s) 1604 may include an obstacle perceiver, a path perceiver, a wait perceiver, a map perceiver, and/or other perception component(s) 1604. For example, the world model may be defined, at least in part, based on affordances for obstacles, paths, and wait conditions that can be perceived in real-time or near real-time by the obstacle perceiver, the path perceiver, the wait perceiver, and/or the map perceiver. The world model manager 1606 may continually update the world model based on newly generated and/or received inputs (e.g., data) from the obstacle perceiver, the path perceiver, the wait perceiver, the map perceiver, and/or other components of the autonomous vehicle control system 1500.

The world model may be used to help inform planning component(s) 1608, control component(s) 1610, obstacle avoidance component(s) 1612, and/or actuation component(s) 1614 of the drive stack 1508. The obstacle perceiver may perform obstacle perception that may be based on where the autonomous vehicle 1502 is allowed to drive or is capable of driving, and how fast the autonomous vehicle 1502 can drive without colliding with an obstacle (e.g., an object, such as a structure, entity, vehicle, etc.) that is sensed by the sensor(s) 1510 of the autonomous vehicle 1502.

The path perceiver may perform path perception, such as by perceiving nominal paths that are available in a particular situation. In some examples, the path perceiver may further take into account lane changes for path perception. A lane graph may represent the path or paths available to the autonomous vehicle 1502, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information.

The wait perceiver may be responsible to determining constraints on the autonomous vehicle 1502 as a result of rules, conventions, and/or practical considerations. For example, the rules, conventions, and/or practical considerations may be in relation to traffic lights, multi-way stops, yields, merges, toll booths, gates, police or other emergency personnel, road workers, stopped busses or other vehicles, one-way bridge arbitrations, ferry entrances, etc. In some examples, the wait perceiver may be responsible for determining longitudinal constraints on the autonomous vehicle 1502 that require the vehicle to wait or slow down until some condition is true. In some examples, wait conditions arise from potential obstacles, such as crossing traffic in an intersection, that may not be perceivable by direct sensing by the obstacle perceiver, for example (e.g., by using sensor data from the sensor(s) 1510, because the obstacles may be occluded from field of views of the sensor(s) 1510). As a result, the wait perceiver may provide situational awareness by resolving the danger of obstacles that are not always immediately perceivable through rules and conventions that can be perceived and/or learned. Thus, the wait perceiver may be leveraged to identify potential obstacles and implement one or more controls (e.g., slowing down, coming to a stop, etc.) that may not have been possible relying solely on the obstacle perceiver.

The map perceiver may include a mechanism by which behaviors are discerned, and in some examples, to determine specific examples of what conventions are applied at a particular locale. For example, the map perceiver may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver may inform the autonomous vehicle 1502 of static or stationary infrastructure objects and obstacles. The map perceiver may also generate information for the wait perceiver and/or the path perceiver, for example, such as to determine which light at an intersection has to be green for the autonomous vehicle 1502 to take a particular path.

Figure 28:
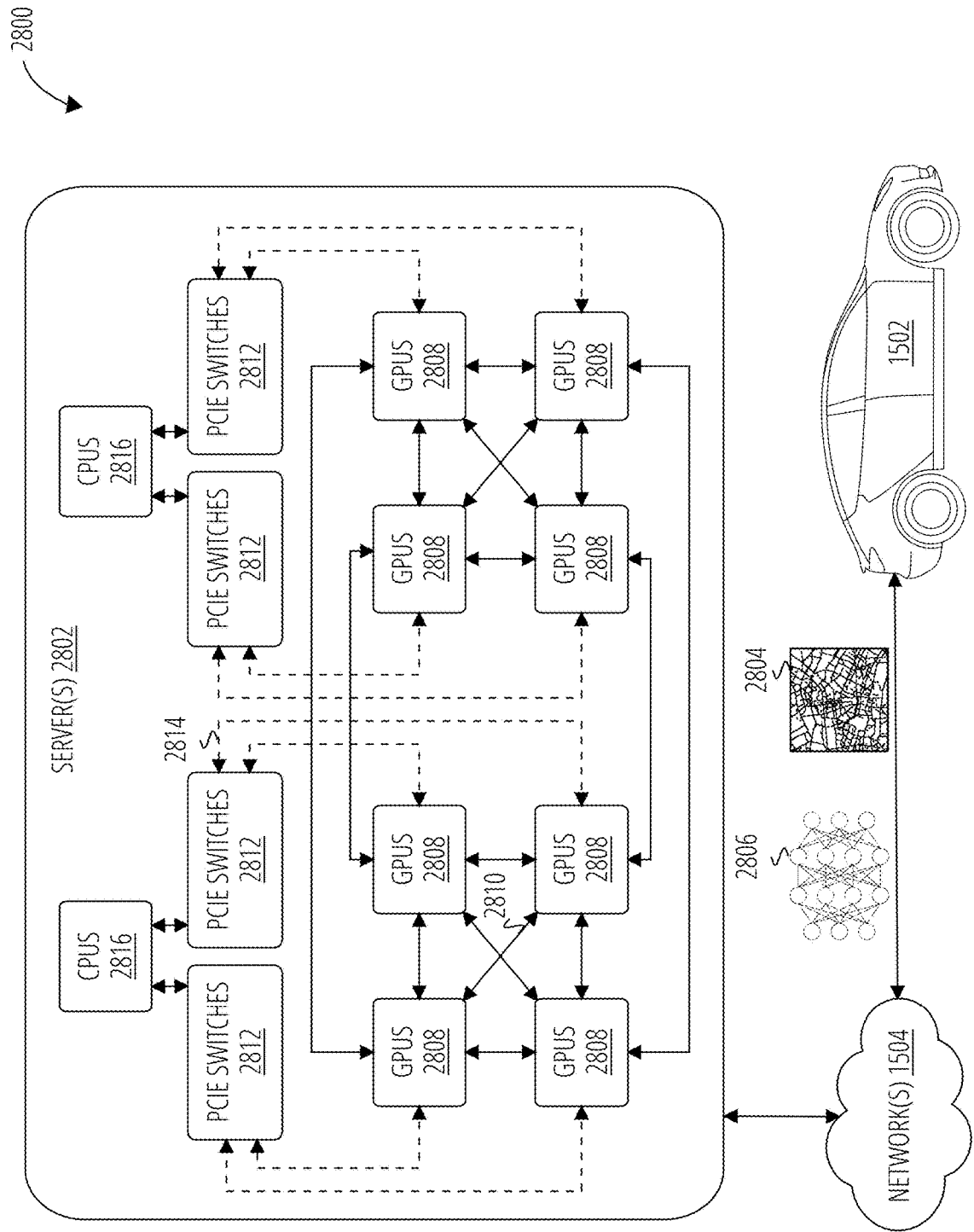
FIG. 28 illustrates a system 2800 in accordance with one embodiment.

In some examples, information from the map perceiver may be sent, transmitted, and/or provided to server(s) (e.g., to a map manager of server(s) 2802 of FIG. 28), and information from the server(s) may be sent, transmitted, and/or provided to the map perceiver and/or a localization manager of the autonomous vehicle 1502. The map manager may include a cloud mapping application that is remotely located from the autonomous vehicle 1502 and accessible by the autonomous vehicle 1502 over the network(s) 1504. For example, the map perceiver and/or the localization manager of the autonomous vehicle 1502 may communicate with the map manager and/or one or more other components or features of the server(s) to inform the map perceiver and/or the localization manager of past and present drives or trips of the autonomous vehicle 1502, as well as past and present drives or trips of other vehicles. The map manager may provide mapping outputs (e.g., map data) that may be localized by the localization manager based on a particular location of the autonomous vehicle 1502, and the localized mapping outputs may be used by the world model manager 1606 to generate and/or update the world model.

In any example, when a determination is made, based on information from the path perceiver, the wait perceiver, the map perceiver, the obstacle perceiver, and/or another component of the perception component(s) 1604, that prevents the autonomous vehicle 1502 from proceeding through a certain situation, scenario, and/or environment, at least partial control may be transferred to the remote control system 1506. In some examples, the passengers of the autonomous vehicle 1502 may be given an option to wait until the autonomous vehicle 1502 is able to proceed based on internal rules, conventions, standards, constraints, etc., or to transfer the control to the remote control system 1506 to enable the remote operator to navigate the autonomous vehicle 1502 through the situation, scenario, and/or environment. The remote operator 1530, once given control, may provide control inputs to the remote control(s) 1514, and the autonomous vehicle 1502 may execute vehicle controls corresponding to the control inputs that are understandable to the autonomous vehicle 1502.

The planning component(s) 1608 may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints). The waypoints may be representative of a specific distance into the future for the autonomous vehicle 1502, such as a number of city blocks, a number of kilometers/miles, a number of meters/feet, etc., that may be used as a target for the lane planner.

The lane planner may use the lane graph (e.g., the lane graph from the path perceiver), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the autonomous vehicle 1502, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) 1610 may follow a trajectory or path (lateral and longitudinal) that has been received from the behavior selector of the planning component(s) 1608 as closely as possible and within the capabilities of the autonomous vehicle 1502. In some examples, the remote operator may determine the trajectory or path, and may thus take the place of or augment the behavior selector. In such examples, the remote operator may provide controls that may be received by the control component(s) 1610, and the control component(s) may follow the controls directly, may follow the controls as closely as possible within the capabilities of the vehicle, or may take the controls as a suggestion and determine, using one or more layers of the drive stack 1508, whether the controls should be executed or whether other controls should be executed.

The control component(s) 1610 may use tight feedback to handle unplanned events or behaviors that are not modeled and/or anything that causes discrepancies from the ideal (e.g., unexpected delay). In some examples, the control component(s) 1610 may use a forward prediction model that takes control as an input variable, and produces predictions that may be compared with the desired state (e.g., compared with the desired lateral and longitudinal path requested by the planning component(s) 1608). The control(s) that minimize discrepancy may be determined.

Although the planning component(s) 1608 and the control component(s) 1610 are illustrated separately, this is not intended to be limiting. For example, in some embodiments, the delineation between the planning component(s) 1608 and the control component(s) 1610 may not be precisely defined. As such, at least some of the components, features, and/or functionality attributed to the planning component(s) 1608 may be associated with the control component(s) 1610, and vice versa.

The obstacle avoidance component(s) 1612 may aid the autonomous vehicle 1502 in avoiding collisions with objects (e.g., moving and stationary objects). The obstacle avoidance component(s) 1612 may include a computational mechanism at a "primal level" of obstacle avoidance that may act as a "survival brain" or "reptile brain" for the autonomous vehicle 1502. In some examples, the obstacle avoidance component(s) 1612 may be used independently of components, features, and/or functionality of the autonomous vehicle 1502 that is required to obey traffic rules and drive courteously. In such examples, the obstacle avoidance component(s) may ignore traffic laws, rules of the road, and courteous driving norms in order to ensure that collisions do not occur between the autonomous vehicle 1502 and any objects. As such, the obstacle avoidance layer may be a separate layer from the rules of the road layer, and the obstacle avoidance layer may ensure that the autonomous vehicle 1502 is only performing safe actions from an obstacle avoidance standpoint. The rules of the road layer, on the other hand, may ensure that vehicle obeys traffic laws and conventions, and observes lawful and conventional right of way (as described herein).

In some examples, when controls are received from the remote control system 1506, the obstacle avoidance component(s) 1612 may analyze the controls to determine whether implementing the controls would cause a collision or otherwise not result in a safe or permitted outcome. In such an example, when it is determined that the controls may not be safe, or may result in a collision, the controls may be aborted or discarded, and the autonomous vehicle 1502 may implement a safety procedure to get the autonomous vehicle 1502 to a safe operating condition. The safety procedure may include coming to a complete stop, pulling to the side of the road, slowing down until a collision is no longer likely or imminent, and/or another safety procedure. In examples, when controls from the remote control system 1506 are determined to be unsafe, control by the remote control system 1506 may be transferred, at least temporarily, back to the autonomous vehicle 1502.

In some examples, such as the example in FIG. 16, the obstacle avoidance component(s) 1612 may be located after the control component(s) 1610 in the drive stack 1508 (e.g., in order to receive desired controls from the control component(s) 1610, and test the controls for obstacle avoidance). However, even though the obstacle avoidance component(s) 1612 are shown stacked on top of (e.g., with respect to an autonomous driving software stack) the planning component(s) 1608 and the control component(s) 1610, this is not intended to be limiting. For example, the obstacle avoidance component(s) 1612 may be additionally or alternatively implemented prior to either of the planning component(s) 1608 or the control component(s) 1610, prior to the control component(s) 1610 but after the planning component(s) 1608, as part of or integral to the planning component(s) 1608 and/or the control component(s) 1610, as part of one or more of the perception component(s) 1604, and/or at a different part of the drive stack 1508 depending on the embodiment. As such, the obstacle avoidance component(s) 1612 may be implemented in one or more locations within an autonomous vehicle driving stack or architecture without departing from the scope of the present disclosure.

In some examples, as described herein, the obstacle avoidance component(s) 1612 may be implemented as a separate, discrete feature of the autonomous vehicle 1502. For example, the obstacle avoidance component(s) 1612 may operate separately (e.g., in parallel with, prior to, and/or after) the planning layer, the control layer, the actuation layer, and/or other layers of the drive stack 1508.

The encoder 1616 may encode the sensor data from the sensor manager 1602 and/or the sensor(s) 1510 of the autonomous vehicle 1502. For example, the encoder 1616 may be used to convert the sensor data from a first format to a second format, such as a compressed, down sampled, and/or lower data size format that the first format. In such an example, the first format may be a raw format, a lossless format, and/or another format that includes more data (e.g., for image data, the first format may include a raw image format, that may include enough data to fully represent each frame of video). The second format may be in a format that includes less data, such as a lossy format and/or a compressed format (e.g., for image data, the second format may be H264, H265, MPEG-4, MP4, Advanced Video Coding High Definition (AVCHD), Audio Video Interleave (AVI), Windows Media Video (WMV), etc.). The sensor data may be compressed to a smaller data size in order to ensure efficient and effective transmission of the sensor data over the network(s) 1504 (e.g., cellular networks, such as 5G).

Once the sensor data is encoded by the encoder 1616, a communication component 1618 of the autonomous vehicle 1502 may transmit or send the encoded sensor data to the remote control system 1506. Although the sensor data is described as being transmitted as encoded sensor data, this is not intended to be limiting. In some examples, there may not be an encoder 1616, and/or at least some of the sensor data may be transmitted in an uncompressed or non-encoded format.

The remote control system 1506 may receive the sensor data at communication component 1624 of the remote control system 1506. Where a communication is received and/or transmitted as a network communication, the communication component 1618 and/or communication component 1624 may comprise a network interface which may use one or more wireless antenna(s) and/or modem(s) to communicate over one or more networks. By including one or more modems and/or one or more wireless antennas, the autonomous vehicle 1502 may be capable of communication across different network types (e.g., Wi-Fi, cellular 4G, LTE, 5G, etc.), and may also have redundancy for when one or more networks may not be available, when one or more networks may not have a strong enough connection to transmit the sensor data, and/or for when one or more of the modems goes offline or stops working. For example, the network interface may be capable of communication over Long-Term Evolution (LTE), Wideband Code-Division Multiple Access (WCDMA), Universal Mobile Telecommunications Service (UMTS), Global System for Mobile communications (GSM), CDMA2000, etc. The network interface may also enable communication between objects in the environment (e.g., vehicles, mobile devices, etc.), using local area network(s), such as Bluetooth, Bluetooth Low Energy (LE), Z-Wave, ZigBee, etc., and/or Low Power Wide-Area Network(s) (LPWANs), such as Long Range Wide-Area Network (LoRaWAN), SigFox, etc.

In some examples, such as where the network strength is below a threshold, or a certain network type is not available for connection (e.g., only a 4G cellular connection is available, and 5G is preferable), only required or necessary sensor data may be transmitted to the remote control system 1506 (or required or necessary sensor data may be prioritized in fitting the sensor data into network constraints). For example, during standard or normal operation, all of the sensor data may be transmitted to the remote control system 1506 (e.g., sensor data from each of the sensor(s) 1510 that generate sensor data for use by the remote control system 1506). However, once the network signal drops below a threshold signal strength, or once a certain network type becomes unavailable, less sensor data, such as sensor data from a subset of the sensors 110, may be transmitted.

In such examples, orientation data representative of an orientation of the VR headset 1516 of the remote control system 1506 may be used. For example, if the remote operator is looking toward the left-front of the virtual vehicle within the virtual environment, the sensor data from the sensor(s) 1510 that have a field(s) of view of the left-front of the autonomous vehicle 1502 may be determined. These sensor(s) 1510 may be a left-facing camera(s), a forward-facing camera(s), a LIDAR sensor and/or RADAR sensor(s) with a field(s) of view to the left and/or front of the autonomous vehicle 1502 and/or other sensor types. The orientation data may be used to inform the autonomous vehicle 1502 (e.g., via one or more signals) of a subset of the sensor data that should be transmitted to the remote control system 1506. As a result (e.g., based on the signal(s)), the subset of the sensor data may be encoded and transmitted across the network(s) 1504 to the remote control system 1506. As the remote operator continues to look around the virtual environment, updated orientation data may be generated and transmitted over the network(s) 1504 to the autonomous vehicle 1502, and updated subsets of the sensor data may be received by the remote control system 1506. As a result, the remote operator may be presented with a field of view that includes information relevant to where the remote operator is looking, and the other portions of the virtual environment may not be streamed or rendered.

In some examples, a subset of the sensor data may be transmitted to the remote control system 1506 that enables the virtual environment 1528 to be rendered without providing any image data (e.g., images or video of the real-world or physical environment). For example, locations of objects, surfaces, and/or structures, as well as types of objects, surfaces, and/or structures may be determined from the sensor data, and this information may be transmitted to the remote control system 1506 for generating a completely synthetic virtual environment (e.g., no images or video of the real or physical world, just a virtual world). In such an example, if it is determined a vehicle is to the left of the autonomous vehicle 1502, and a person is to the right, the virtual environment may be rendered to include a vehicle and a person (e.g., generic representations) at locations that correspond to the real-world. In a more detailed example, the vehicle type of the vehicle may be determined, and the virtual environment may include a virtual representation of the vehicle type (e.g., as determined from a data store).

In other examples, a combination of a fully rendered virtual environment and image data (e.g., images or video) may be used within the virtual environment. For example, images or video may be included within the virtual environment in a field of view of the remote operator, but other portions of the virtual environment may include only virtual representations. As a result, if a remote operator changes orientation, and image data has not yet been received for the updated field of view of the remote operator, there may still be enough information within the environment (e.g., the virtual representations of the objects, surfaces, and/or structures) based on the rendering to allow the remote operator to control the autonomous vehicle 1502 safely.

Although the signal strength or connection type is described as a reason for transmitting only a subset of the sensor data, this is not intended to be limiting. For example, the subset of the sensor data may be transmitted at all times, regardless of network connection strength and/or type, in order to reduce bandwidth or preserve network resources.

In some examples, once received by the remote control system 1506, the sensor data (e.g., encoded sensor data) may be decoded by decoder 1626 of the remote control system 1506. In other examples, the encoded sensor data may be used by the virtual environment generator 1518 and/or the remote control(s) 1514 (e.g., for calibration) without decoding. The virtual environment generator 1518 may use the sensor data to generate the virtual environment. The sensor data may include image data from camera(s), LIDAR data from LIDAR sensor(s), RADAR data from RADAR sensor(s), and/or other data types from other sensor(s) 1510, such as vehicle state data and/or configuration data, as described herein. The virtual environment generator 1518 may use the sensor data to generate or render the virtual environment and at least a portion of the virtual environment may be displayed on a display of the VR headset 1516. Examples of the virtual environment are described in more detail herein, such as with reference to FIG. 17 and FIG. 18.

In some examples, the virtual environment may be generated using the vehicle state data and/or the calibration data, in addition to image data, LIDAR data, SONAR data, etc. In such examples, the vehicle state data may be used to update a location and/or orientation of the virtual vehicle in the virtual environment and/or to update visual indicators of the vehicle state in the virtual environment (e.g., to update a speedometer, a revolutions per minute (RPM) display, a fuel level display, a current time where the autonomous vehicle 1502 is located, an odometer, a tachometer, a coolant temperature gauge, a battery charge indicator, a gearshift indicator, a turn signal indicator, a headlight/high beam indicator, a malfunction/maintenance indicator, etc.). As a further example, the vehicle state data may be used to apply one or more rendering effects to the virtual environment, such as motion blur that is based at least in part on the velocity and/or acceleration of the autonomous vehicle 1502.

In some examples, state data may be determined by the autonomous vehicle 1502 for the objects and surface in the environment, and this state information may be used to generate the virtual environment (e.g., to provide visual indicators of types of objects, such as persons, vehicles, animals, inanimate objects, etc., or surfaces, such as a paved road, a gravel road, an uneven road, an even road, a driveway, a one-way street, a two-way street, etc., to provide visual indicators about objects, such as speeds of objects, directions of objects, etc., and/or other information pertaining to the environment).

The calibration data may be used to update the virtual controls (e.g., the representation of the remote control(s) 1514 in the virtual environment). For some non-limiting examples, if the steering wheel is turned to the left, the virtual steering wheel may be rendered as turned to the left, if the wheels are turned to the right, the virtual wheels may be rendered to be turned to the right, if the windows are down, the virtual windows may be rendered to be down, if the seats are in a certain position, the virtual seats may be rendered to be in the certain positions, if the instrument panel and/or HMI display is on, at a certain light level, and/or showing certain data, the virtual instrument panel and/or HMI display may be on, at the certain light level, and/or showing the certain data in the virtual environment.

Any other examples for updating the virtual environment to reflect the autonomous vehicle 1502 and/or other aspects of the real-world environment are contemplated within the scope of the present disclosure. By updating at least a portion of the virtual vehicle and/or other features of the virtual environment using the calibration data, the remote operator may have a more immersive, true-to-life, and realistic virtual environment to control the virtual vehicle within, thereby contributing to the ability of the remote operator to control the autonomous vehicle 1502 in the real-world environment more safely and effectively.

At least some of the sensor data may be used by the remote control(s) 1514, such as the calibration data for calibrating the remote control(s) 1514. For example, similar to described herein with respect to updating the virtual environment using the calibration data, the remote control(s) 1514 may be calibrated using the calibration data. In some examples, a steering component (e.g., a steering wheel, a joystick, etc.) of the remote control(s) 1514 may be calibrated to an initial position that corresponds to the position of steering component(s) 1628 of the autonomous vehicle 1502 at the time of transfer of the control to the remote control system 1506. In another example, the steering component sensitivity may be calibrated using the calibration data, such that inputs to the steering component of the remote control(s) 1514 (e.g., turning the steering wheel x number of degrees to the left) substantially correspond to the inputs to the steering component(s) 1628 of the autonomous vehicle 1502 (e.g., the resulting actuation of the autonomous vehicle 1502 may correspond to turning the steering wheel of the autonomous vehicle 1502 x number of degrees to the left). Similar examples may be implemented for the acceleration component and/or the braking component of the remote control(s) to correspond to the sensitivity, degree of movement, pedal stiffness, and/or other characteristics of acceleration component(s) 1632 and braking component(s) 1630, respectively, of the autonomous vehicle 1502. In some examples, any of these various calibrations may be based at least in part on the year, make, model, type, and/or other information of the autonomous vehicle 1502 (e.g., if the autonomous vehicle 1502 is a Year N, Make X, Model Y, the virtual vehicle may retrieve associated calibration settings from a data store).

In some examples, the calibration data may be used calibrate the remote control(s) 1514 such that the remote control(s) are scaled to the autonomous vehicle 1502 (or object, such as a robot), such as where the vehicle is larger, smaller, or of a different type than the virtual vehicle. For example, the autonomous vehicle 1502 or object may be a small vehicle or object (e.g., that cannot fit passengers), such as a model car or an exploratory vehicle (e.g., for navigating into tight or constrained environments, such as tunnels, beneath structures, etc.), etc., or may be a larger object, such as a bus, a truck, etc. In such examples, calibration data may be used to scale the remote control(s) 1514 to that of the smaller, larger, or different type of object or vehicle. For example, providing an input to the steering component of the remote control(s) 1514, such as by turning a steering wheel 10 degrees, may be scaled for a smaller vehicle to 2 degrees, or for a larger vehicle, to 20 degrees. As another example, the braking component of the remote control(s) 1514 may correspond to anti-skid braking control inputs, but the autonomous vehicle 1502 or object, especially when small, may use skid braking. In such examples, the remote control(s) may be calibrated such that inputs to the braking component of the remote control(s) is adjusted for skid braking.

The scaling may additionally, or alternatively, be performed on the outputs of the remote control(s) (e.g., the control data). For example, after the control inputs to the remote control(s) 1514, the control inputs may be scaled to correspond to the control(s) of the smaller, larger, or different type of autonomous vehicle 1502 or object. This may allow the remote operator to control the virtual vehicle or object using the remote control(s) 1514 in a way that feels more natural to the remote operator, but while calibrating or scaling the control data representative of the control inputs for the autonomous vehicle 1502 or other object to correspond to the vehicle control data that is useable for the autonomous vehicle 1502 or other object. In some examples, this may be performed by the encoder 1620 of the remote control system 1506, and/or by another component.

In any example, prior to transmission of the control data to the autonomous vehicle 1502, the control data may be encoded by the encoder 1620. The encoded control data may be in a format that is useable to the vehicle (e.g., the control data from the remote control(s) 1514 may be encoded to generate vehicle control data that is useable by the autonomous vehicle 1502). In other examples, the control data may be transmitted to the autonomous vehicle 1502 over the network(s) 1504 using the communication communication component 1624 and communication component 1618, and the autonomous vehicle 1502 may encode the control data to generate the vehicle control data. As such, the control data from the remote control(s) 1514 may be converted to the vehicle control data prior to transmission by the remote control system 1506, after receipt by the autonomous vehicle 1502, or a combination thereof.

The control data, in some examples, may be received by the communication component 1618 of the autonomous vehicle 1502 and decoded by the decoder 1622. The vehicle control data may then be used by at least one of the layers of the drive stack 1508 or may bypass the drive stack 1508 (e.g., where full control is transferred to the remote control system 1506 and the autonomous vehicle 1502 exits self-driving or autonomous mode completely) and be passed directly to the control components of the autonomous vehicle 1502, such as the steering component(s) 1628, the braking component(s) 1630, the acceleration component(s) 1632, and/or other components (e.g., a blinker, light switches, seat actuators, etc.). As such, the amount of control given to the remote control system 1506 may include from no control, full control, or partial control. The amount of control of the autonomous vehicle 1502 may inversely correspond to the amount of control given to the remote control system 1506. Thus, when the remote control system 1506 has full control, the autonomous vehicle 1502 may not execute any on-board control, and when the remote control system 1506 has no control, the autonomous vehicle 1502 may execute all on-board control.

In examples where the vehicle control data (e.g., corresponding to the control data generated based on control inputs to the remote control(s) 1514) is used by the drive stack 1508, there may be different levels of use. In some examples, only the obstacle avoidance component(s) 1612 may be employed. In such examples, the vehicle control data may be analyzed by the obstacle avoidance component(s) 1612 to determine whether implementing the controls corresponding to the vehicle control data would result in a collision or an otherwise unsafe or undesirable outcome.

When a collision or unsafe outcome is determined, the autonomous vehicle 1502 may implement other controls (e.g., controls that may be similar to the controls corresponding to the vehicle control data but that decrease, reduce, or remove altogether the risk of collision or other unsafe outcome). In the alternative, the autonomous vehicle 1502 may implement a safety procedure when a collision or other unsafe outcome is determined, such as by coming to a complete stop. In these examples, the control inputs from the remote control(s) 1514 may be associated (e.g., one-to-one) with the controls of the autonomous vehicle 1502 (e.g., the control inputs to the remote control(s) 1514 may not be suggestions for control of the vehicle, such as waypoints, but rather may correspond to controls that should be executed by the autonomous vehicle 1502).

As described herein, the control inputs from the remote control(s) 1514 may not be direct or one-to-one controls for the autonomous vehicle 1502, in some examples. For example, the control inputs to the remote control(s) 1514 may be suggestions. One form of suggestion may be an actual input to a steering component, an acceleration component, a braking component, or another component of the remote control(s) 1514. In such an example, the vehicle control data corresponding to these control inputs to the remote control(s) 1514 may be used by the drive stack 1508 to determine how much, or to what degree, to implement the controls. For example, if the remote operator provides an input to a steering component of the remote control(s) 1514 (e.g., to turn a steering wheel 10 degrees), the planning component(s) 1608 and/or the control component(s) 1610 of the drive stack 1508 may receive the vehicle control data representative of the input to the steering component, and determine to what degree to turn to the left (or to not turn left at all). The drive stack 1508 may make a determination to turn left, for example, but may determine that a more gradual turn is safer, follows the road shape or lane markings more accurately, and/or otherwise is preferable over the rate of the turn provided by the remote operator (e.g., the 10 degree turn of the steering wheel). As such, the vehicle control data may be updated and/or new vehicle control data may be generated by the drive stack 1508, and executed by the steering component(s) 1628 of the autonomous vehicle 1502 (e.g., based at least in part on a command or signal from the actuation component(s) 1614).

Similar use of the vehicle control data may be performed based at least in part on inputs to the acceleration component, braking component, and/or other components of the remote control(s) 1514. For example, an input to an acceleration component of the remote control(s) 1514 may cause an acceleration by the acceleration component(s) 1632 of the autonomous vehicle 1502, but the acceleration rate may be less, more, or zero, depending on the determination(s) by the drive stack 1508. As another example, an input to a braking component of the remote control(s) 1514 may cause a braking by the braking component(s) 1630 of the autonomous vehicle 1502, but the deceleration rate may be less, more, or zero, depending on the determination(s) by the drive stack 1508.

Another form of suggestions from the remote control(s) 1514 may be waypoint suggestions. For example, the remote operator may use a remote control(s) 1514 that is a pointer (e.g., a virtual laser pointer), and may point to virtual locations in the virtual environment that the virtual vehicle is to navigate to (e.g., a virtual waypoint). The real-world locations in the real-world environment that correspond to the virtual locations in the virtual environment may be determined, and the vehicle control data may represent the real-world locations (e.g., the real-world waypoints). As such, the drive stack 1508, such as the planning component(s) 1608 and/or the control component(s) 1610, may use the real-world waypoint to determine a path and/or control(s) for following the path to reach the real-world waypoint. The actuation component(s) 1614 may then cause the steering component(s) 1628, the braking component(s) 1630, the acceleration component(s) 1632, and/or other components of the autonomous vehicle 1502 to control the autonomous vehicle 1502 to travel to the real-world location corresponding to the real-world waypoint. The remote operator may continue to provide these control inputs to navigate the autonomous vehicle 1502 through the situation, scenario, and/or environment that necessitated the transfer of at least partial control to the remote control system 1506.

Now referring to FIG. 17 and FIG. 18, FIG. 17 and FIG. 18 illustrate non-limiting examples of a virtual environment 1700 that may be generated by the virtual environment generator 1518. In one or more embodiments, the virtual environments may be displayed on a display of the VR headset 1516. Alternatively, the virtual environments may be displayed on a display corresponding to a physical representation of a vehicle. The physical representation may include any configuration of control (e.g., a steering wheel, one or more accelerators or brakes, one or more transmission controls), seating, or visibility (e.g., one or more displays positioned as mirrors) features corresponding to physical, real-world counterparts in an ego-vehicle. Virtual environment 1700 of FIG. 17 may include a virtual environment where an exterior of a vehicle 1702 is rendered, such that a field of view of the remote operator includes the exterior of the vehicle 1702. In one or more embodiments, the vehicle 1702 may be presented as a virtually simulated vehicle. Alternatively, the virtual environment 1700 may be rendered in one or more displays positioned around a partially or completely physical vehicle 1702 calibrated to correspond to the ego-vehicle. In the cases where the vehicle 1702 comprises a virtual vehicle, the virtual vehicle 1702 may be rendered on a surface 1704 of the virtual environment 1700. In this case, the surface 1704 may be one of any number of suitable surfaces, such as a representation of a garage floor, a laboratory floor, etc. However, this is not intended to be limiting, and in some examples, the surface 1704 may be rendered to represent the surface the autonomous vehicle 1502 is on in the real-world environment (e.g., using sensor data generated from cameras with a field(s) of view of the surface around the autonomous vehicle 1502, such as a parking camera(s)).

The sensor data, such as image data, representative of a field(s) of view of the sensor(s) 1510 may be displayed within the virtual environment 1700 on one or more virtual displays 1706, and/or additional or alternative virtual displays 1706. In some examples, the virtual displays 1706 may be rendered to represent up to a 360 degree field of view of the sensor(s) 1510 of the autonomous vehicle 1502. As described herein, the surface 1704 and/or an upper portion 1708 of the virtual environment 1700 may also be rendered to represent the real-world environment of the autonomous vehicle 1502. The upper portion 1708 may include buildings, trees, the sky, and/or other features of the real-world environment, such that the virtual environment 1700 may represent a fully immersive environment. The surface 1704 and/or the upper portion 1708, similar to the virtual displays 1706, may include images or video from image data generated by the autonomous vehicle 1502, may include rendered representations of the environment as gleaned from the sensor data (e.g., image data, LIDAR data, RADAR data, etc.), or a combination thereof.

The instance of the virtual environment 1700 illustrated in FIG. 17 may represent the scenario represented in the image 1520. For example, the virtual display 206B may include the virtual representations of the van 1524, the unloaded boxes 1526, the divided street 1548, and/or other features of the image 1520. The virtual representations of the image data may include the images or video from the image data, rendered within the virtual environment 1700. As such, the images or video displayed on the virtual displays 1706 may be the actual images or video (e.g., not a virtual representation thereof). In other examples, the images or video displayed on the virtual displays 1706 may be a rendered representation of the environment, which may be generated from the sensor data (e.g., the image data, the LIDAR data, the SONAR data, etc.).

As described herein, the vehicle state data and/or the calibration data may be used to generate the virtual environment. In such examples, wheels 1710 of the virtual vehicle 1702 may be rendered at approximately the wheel angle of the wheels of the autonomous vehicle 1502 in the real-world environment. In this illustration, the wheels may be straight. Similarly, lights may be turned on or off, including brake lights when braking, emergency lights when turned on, etc. When the vehicle 1702 includes a physical, tangible representation, the vehicle state data and/or the calibration data of the ego-vehicle may be used to calibrate and orient the physical representation vehicle 1702.

When controlling a virtual vehicle 1702 implemented as a virtual vehicle in the virtual environment 1700, or other virtual environments where the vantage point of the remote operator is outside of the virtual vehicle 1702, the remote operator may be able to move around the virtual environment 1700 freely to control the virtual vehicle 1702 from different vantage points (or may be able to change the vantage point to inside the virtual vehicle, as illustrated in FIG. 18). For example, the remote operator may be able to sit on top of or above the virtual vehicle 1702, to the side of the virtual vehicle 1702, in front of the virtual vehicle 1702, behind the virtual vehicle 1702, etc.

In examples where the remote operator provides virtual waypoints rather than actual controls, a vantage point outside of the virtual vehicle 1702 may be more useful. For example, the remote operator may have a vantage point from on top of the virtual vehicle 1702, such as at location 1712 within the virtual environment 1700, and may use device 1714 (e.g., a virtual pointer, a virtual laser, etc.) to identify a location within the virtual environment 1700 and/or a location within the image data represented within the virtual environment 1700, such as location 1716. When the location 1716 corresponds to the image data, such as a point(s) or pixel(s) within the image data, the real-world coordinates corresponding to the point(s) or the pixel(s) may be determined (e.g., by the autonomous vehicle 1502 and/or the remote control system 1506). For example, the camera(s) that captured the image data may be calibrated such that transformations from two-dimensional locations of the point(s) or the pixel(s) within the image data to three-dimensional points in the real-world environment may be computed or known. As a result, the virtual way-points (e.g., the location 1716) identified within the virtual environment 1700 by the remote operator may be used to determine real-world locations (e.g., corresponding to the location 1716) for the autonomous vehicle 1502 to navigate to. As described herein, the autonomous vehicle 1502 may use this information to determine the path, controls, and/or actuations that will control the autonomous vehicle 1502 to the real-world location.

As the autonomous vehicle 1502 is controlled through the real-world environment, the virtual displays 1706 may be updated to reflect the updated sensor data over time (e.g., at the frame rate that the sensor data is captured, such as 30 frames per second ("fps"), 60 fps, etc.). As the (virtual) vehicle 1702 is being controlled, the wheels, lights, windows, blinkers, etc., may be updated according to the corresponding features on the autonomous vehicle 1502 in the real-world environment.

Now referring to FIG. 18, the virtual environment 1528 may be the same virtual environment 1528 of FIG. 15 described herein. Although the vantage point illustrated in FIG. 18 is from a left-side driver's seat within the virtual vehicle, this is not intended to be limiting. For example, and without departing from the scope of the present disclosure, the remote operator may have a vantage point from the position a right-side driver's seat (e.g., for jurisdictions where driving is on the left side of the road), a passenger's seat, a back seat, an imaginary seat (e.g., a middle-driver's seat), or from a vantage point within the virtual vehicle not corresponding to a seat, such as from anywhere within the virtual vehicle.

As described herein, one or more of the features of the virtual vehicle may be made at least partially transparent and/or may be removed from the rendering of the virtual vehicle. For example, certain portions of a real-world vehicle (alternatively referred to herein as "ego-vehicle" or "physical vehicle") may be used for structural support, but may cause occlusions for a driver (e.g., "blind spots). In a virtual vehicle, this need for structural support is non-existent, so portions of the virtual vehicle that may be visually occluding may be removed and/or made at least partially transparent in the virtual environment 1528. For example, the support column 1538, and/or other support columns of the virtual vehicle, may be made transparent (as illustrated in FIG. 18) or may be removed completely from the rendering. In other examples, doors 1804 may be made transparent (e.g. but for an outline) or entirely removed. As a result, the remote operator may be presented with a field(s) of view that is more immersive, with less occlusions, thereby facilitating more informed, safer control.

In addition, a portion(s) of the virtual vehicle may be made at least partially transparent or be removed even where the portion(s) of the virtual vehicle does not cause occlusions, in order to allow the remote operator to visualize information about the virtual vehicle (and thus the autonomous vehicle 1502) that would not be possible in a real-world environment. For example, a portion of the virtual vehicle between a vantage point of the remote operator and one or more of the wheels and/or tires of the vehicle may be made at least partially transparent or may be removed from the rendering, such that the remote operator is able to visualize an angle of the wheel(s) and/or the tire(s) (e.g., where the wheels and/or tires are at the angle based on the calibration data).

The virtual environment 1528 may include, in addition to or alternatively from the features described herein with respect to FIG. 15, a virtual instrument panel 1806, virtual side-view or wing-mirrors 1802, and/or other features. The virtual instrument panel 1806 may display any number of different information, such as, without limitation, a speedometer, a fuel level indicator, an oil pressure indicator, a tachometer, an odometer, turn indicators, gearshift position indicators, seat belt warning light(s), parking-brake warning light(s), engine-malfunction light(s), airbag (SRS) system information, lighting controls, safety system controls, navigation information, etc. The virtual side-view or wing-mirrors 1802 may display sensor data captured by one or more sensor(s) 1510 (e.g., camera(s)) of the autonomous vehicle 1502 with a field(s) of view to the rear and/or to the side of the autonomous vehicle 1502 (e.g., to represent a side-view or wing-mirror of the autonomous vehicle 1502).

Figure 19:
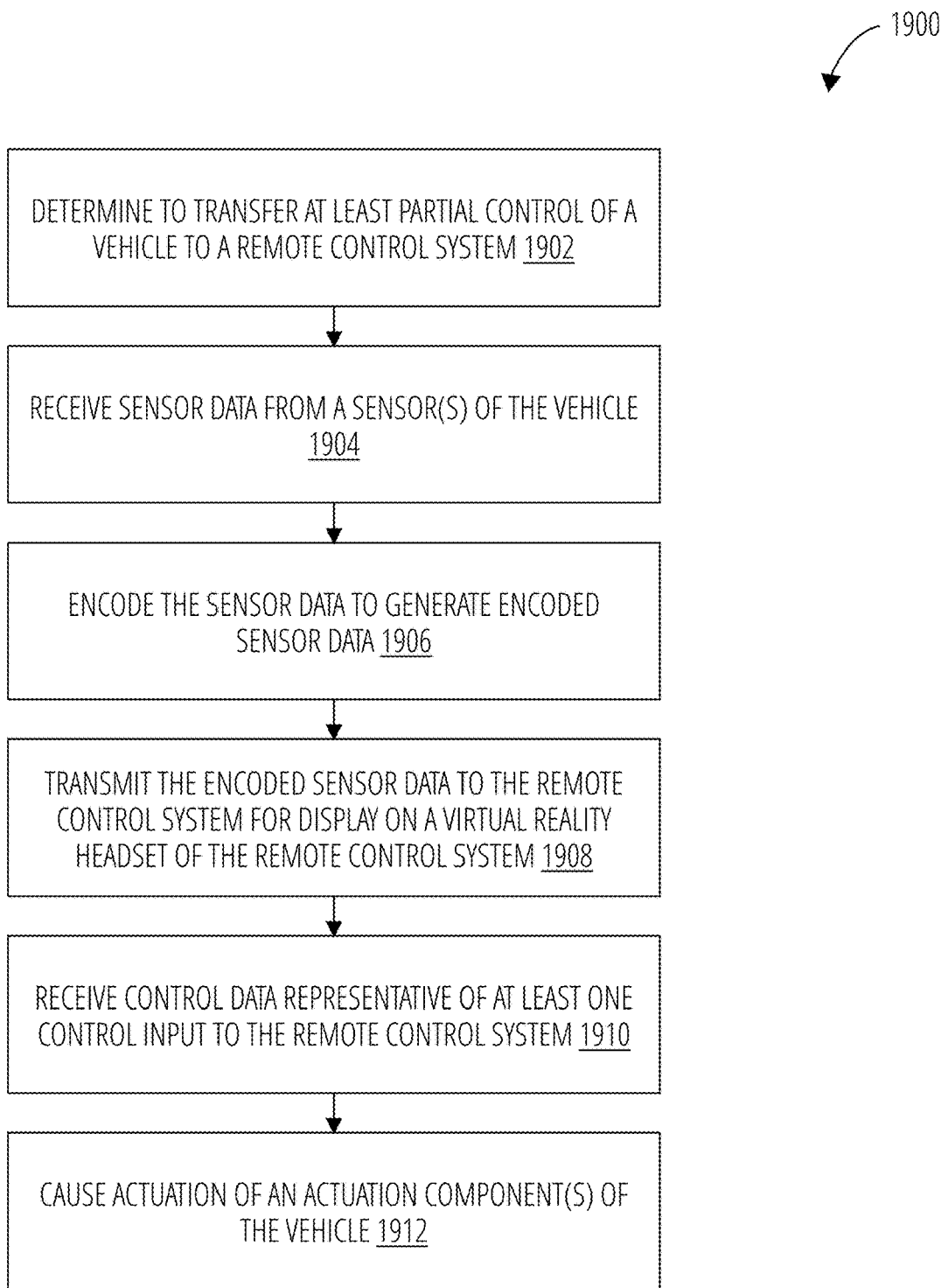
FIG. 19 illustrates a method 1900 in accordance with one embodiment.
Figure 20:
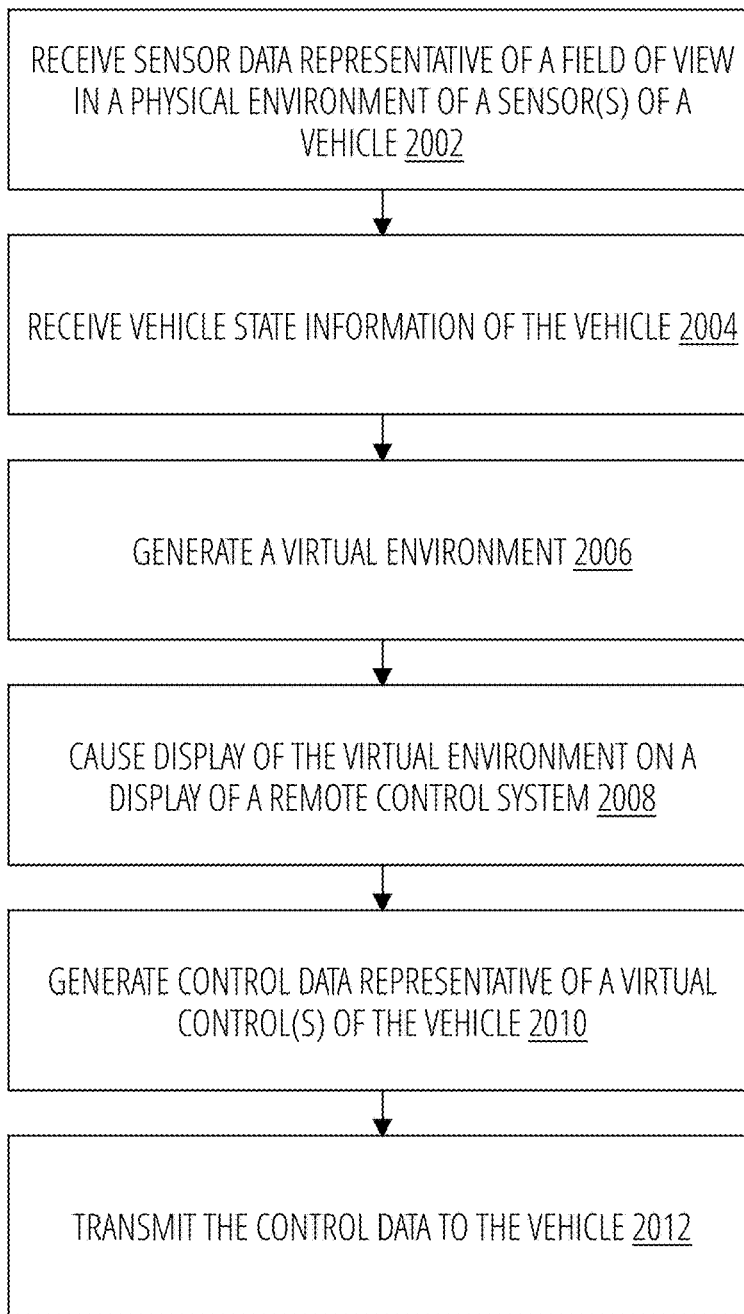
FIG. 20 illustrates a method 2000 in accordance with one embodiment.

Now referring to FIG. 19 and FIG. 20, each block of method 1900 and method 2000, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 1900 and method 2000 are described, by way of example, with respect to the autonomous vehicle control system 1500 of FIG. 15 and FIG. 16. However, these methods may additionally or alternatively be executed by any one system, or any combination of systems, including, but not limited to, those described herein.

FIG. 19 is a flow diagram showing a method 1900 of remote control of an autonomous vehicle, in accordance with some embodiments of the present disclosure. The method 1900, at block 1902, includes determining to transfer at least partial control of a vehicle to a remote control system. For example, the autonomous vehicle 1502 (e.g., one or more components of the drive stack 1508), the remote operator, a passenger, and/or another actor may determine to transfer at least partial control to the remote control system 1506. In such examples, the determination may be to activate, initiate, or otherwise begin a remote control session. In examples where the autonomous vehicle 1502 determines to transfer control, the determination, as described herein, may be based on a constraint on the autonomous vehicle 1502 such as rules of the road, an obstacle in a path of the autonomous vehicle 1502, etc., that may not allow the autonomous vehicle 1502 to navigate a situation, scenario, and/or environment. The determination may be made based on an analysis of sensor data of the autonomous vehicle 1502, and may be made by one or more layers of the drive stack 1508 in some examples.

The method 1900, at block 1904, includes receiving sensor data from a sensor(s) of the vehicle. For example, sensor data from the sensor(s) 1510 may be received.

The method 1900, at block 1906, includes encoding the sensor data to generate encoded sensor data. For example, the sensor data may be encoded into a different format, such as a less data intense format. If the sensor data includes image data, for example, the image data may be converted from a first format (e.g., a raw image format) to a second format (e.g., an encoded video format, such as H.264, H.265, AV1, VP9, or another image format, including but not limited to those described herein).

The method 1900, at block 1908, includes transmitting the encoded sensor data to the remote control system for display by a virtual reality headset of the remote control system. For example, the encoded sensor data may be transmitted to the remote control system 1506 for display on a display of the VR headset 1516.

The method 1900, at block 1910, includes receiving control data representative of at least one control input to the remote control system. For example, control data representative of at least one input to the remote control(s) 1514 may be received from the remote control system 1506. In some examples, the control data may not be in a format useable by the autonomous vehicle 1502, and thus may be converted or encoded to vehicle control data useable by the autonomous vehicle 1502. In other examples, the control data may be useable by the autonomous vehicle 1502, or may have already been encoded by the remote control system 1506 and thus the control data received may include the vehicle control data.

The method 1900, at block 1912, includes causing actuation of an actuation component(s) of the vehicle. For example, the control data (and/or the vehicle control data) may be used by the autonomous vehicle 1502 to cause actuation of at least one actuation component of the autonomous vehicle 1502, such as the steering component(s) 1628, the braking component(s) 1630, and/or the acceleration component(s) 1632.

FIG. 20 is an example flow diagram for a method 2000 of remote control of an autonomous vehicle, in accordance with some embodiments of the present disclosure. The method 2000, at block 2002, includes receiving sensor data representative of a field of a view in a physical environment of a sensor(s) of a vehicle. For example, sensor data representative of a field(s) of view of the sensor(s) 1510 of the autonomous vehicle 1502 in the real-world environment may be received.

The method 2000, at block 2004, includes receiving vehicle state information of the vehicle. For example, the vehicle state information may be received from the autonomous vehicle 1502.

The method 2000, at block 2006, includes generating a virtual environment. For example, the virtual environment generator 1518 may generate a virtual environment based on the sensor data, the vehicle state data, and/or calibration data.

The method 2000, at block 2008, includes causing display of the virtual environment on a display of a remote control system. For example, the virtual environment may be displayed on a display of the VR headset 1516 of the remote control system 1506.

The method 2000, at block 2010, includes generating control data representative of a virtual control(s) of the vehicle. For example, control data representative of control input(s) to the remote control(s) 1514 for controlling a virtual vehicle may be generated.

The method 2000, at block 2012, includes transmitting the control data to the vehicle. For example, the control data may be transmitted to the autonomous vehicle 1502. In some examples, prior to transmission, the control data may be encoded to create vehicle control data useable by the autonomous vehicle 1502.

Figure 21:
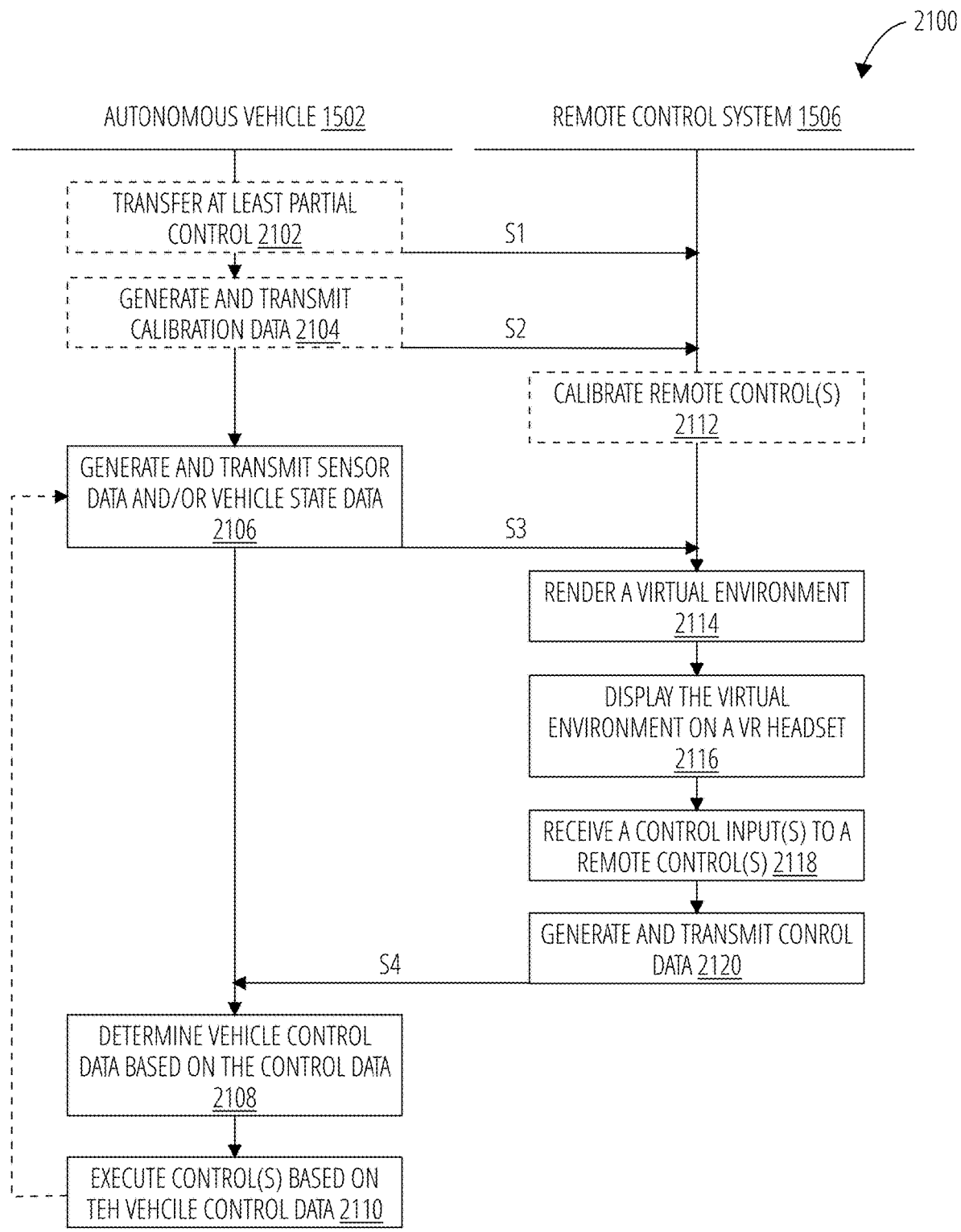
FIG. 21 illustrates a method 2100 in accordance with one embodiment.

Now referring to FIG. 21, each block of method 2100, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 2100 is described, by way of example, with respect to the autonomous vehicle control system 1500 of FIG. 15 and FIG. 16. However, these methods may additionally or alternatively be executed by any one system, or any combination of systems, including, but not limited to, those described herein.

FIG. 21 is an example signal flow diagram for a method 2100 of remote control of an autonomous vehicle, in accordance with some embodiments of the present disclosure. The method 2100, as illustrated in FIG. 21, may begin at the top of the page and end at the bottom. However, this is not intended to be limiting, and one or more of the blocks may be in alternative order and/or may be removed, or one or more additional or alternative blocks may be used in the method 2100 without departing from the scope of the present disclosure.

The method 2100, at block 2102, includes transferring at least partial control. For example, at least partial control may be transferred by the autonomous vehicle 1502 to the remote control system 1506. In such examples, a signal(s), S1, may be generated and transmitted from the autonomous vehicle 1502 (e.g., via the communication component 1624) to the remote control system 1506 (e.g., via the communication component 1618) to inform the remote control system 1506 that at least partial control is being transferred. The signal(s), S1, may be representative of data indicating that control is being transferred. The transfer of control may not be executed, in some examples, as illustrated by the dashed lines. For example, where control of the vehicle 102 or object is always performed by the remote control system 1506, there may not be a need to transfer control.

The method 2100, at block 2104, includes generating and transmitting calibration data. For example, the sensor(s) 1510 of the autonomous vehicle 1502 may generate calibration data, and the autonomous vehicle 1502 may transmit the calibration data to the remote control system 1506 (e.g., via the communication component 1624 or communication component 1618). In such examples, a signal(s), S2, may be generated and transmitted from the autonomous vehicle 1502 to the remote control system 1506 that represents the calibration data. The generating and transmitting of the calibration data may not be executed, in some examples, as illustrated by the dashed lines.

The method 2100, at block 2112, includes calibrating remote control(s). For example, the calibration data received via the signal(s), S2, may be used by the remote control system 1506 to calibrate the remote control(s) 1514. The calibrating of the remote control(s) 1514 may not be executed, in some examples, as illustrated by the dashed lines.

The method 2100, at block 2106, includes generating and transmitting sensor data and/or vehicle state data. For example, the sensor(s) 1510 of the autonomous vehicle 1502 may generate sensor data and/or vehicle state data and the autonomous vehicle 1502 may transmit the sensor data and/or the vehicle state data to the remote control system 1506 (e.g., via the communication component 1624 and/or communication component 1618). In such examples, a signal(s), S3, may be generated and transmitted from the autonomous vehicle 1502 to the remote control system 1506 that represents the sensor data and/or the vehicle state data.

The method 2100, at block 2114, includes rendering a virtual environment. For example, the virtual environment generator 1518 may generate and/or render the virtual environment based on the sensor data, the vehicle state data, and/or the calibration data.

The method 2100, at block 2116, includes displaying the virtual environment on a VR headset. For example, the virtual environment, or at least a portion thereof, may be displayed on the VR headset 1516 of the remote control system 1506.

The method 2100, at block 2118, includes receiving control input(s) to remote control(s). For example, the remote operator may provide one or more control inputs to the remote control(s) 1514.

The method 2100, at block 2120, includes generating and transmitting control data. For example, the remote control(s) 1514 of the remote control system 1506 may generate control data based on the control input(s) and the remote control system 1506 may transmit the control data to the autonomous vehicle 1502 (e.g., via the communication component 1624 and/or communication component 1618). In such examples, a signal(s), S4, may be generated and transmitted from the remote control system 1506 to the autonomous vehicle 1502 that represents the control data.

The method 2100, at block 2108, includes determining vehicle control data based on the control data. For example, the autonomous vehicle 1502 may determine whether the control data is useable by the autonomous vehicle 1502 and, if not, may generate vehicle control data that corresponds to the control data but that is useable by the autonomous vehicle 1502.

The method 2100, at block 2110, includes executing control(s) based on the vehicle control data. For example, one or more controls may be executed by the autonomous vehicle 1502 that may correspond to the control input(s) to the remote control system 1506.

Figure 22:
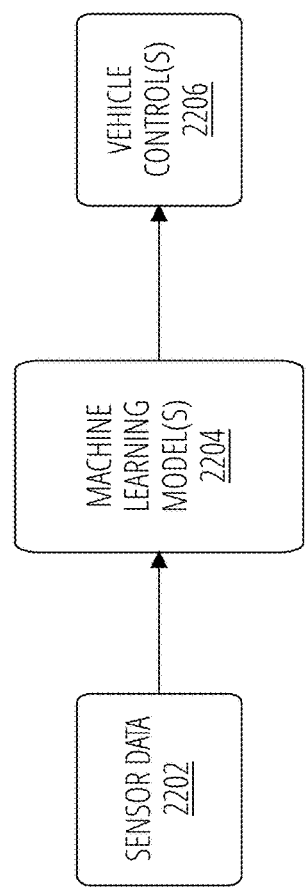
FIG. 22 illustrates a process 2200 in accordance with one embodiment.

Now referring to FIG. 22, FIG. 22 is an example data flow diagram illustrating a process 2200 for training an autonomous vehicle using a machine learning model(s), in accordance with some embodiments of the present disclosure. Any number of inputs, including but not limited to sensor data 2202 and/or control data representative of control input(s) to remote control(s) 1514 of the remote control system 1506, may be input into a machine learning model(s) 2204.

The machine learning model(s) 2204 may generate or compute any number of outputs, including but not limited to vehicle control data representative of vehicle control(s) 2206 for controlling the autonomous vehicle 1502. In some examples, the output may be control data, such as the control data generated by the remote control(s) 1514 of the remote control system 1506, and the control data may be, where necessary, encoded or otherwise converted to vehicle control data representative of the vehicle control(s) 2206 useable by the autonomous vehicle 1502. In some examples, the vehicle control(s) 2206 may include vehicle trajectory information, such as a path, or points along a path, that the autonomous vehicle 1502 should navigate along within the environment. The vehicle control(s) 2206 may be transmitted or sent to a control component(s) 1610, planning component(s) 1608, and/or other layers of the drive stack 1508, and the control component(s) 1610, the planning component(s) 1608, and/or other layers of the drive stack 1508 may use the vehicle control(s) 1512 to control the autonomous vehicle 1502 according to the vehicle control(s) 2206.

The sensor data 2202 may be image data, LIDAR data, SONAR data, and/or data from one or more other sensor(s) 1510 of the autonomous vehicle 1502 that may be representative of the real-world environment of the autonomous vehicle 1502. In some examples, the sensor data may further include vehicle state data representative of the state of the vehicle 102, such as speed, velocity, acceleration, deceleration, orientation or pose, location or position in the environment and/or other status information. This data may be captured by and/or received from one or more of the sensors 110 of the autonomous vehicle 1502, such as one or more of the IMU sensor(s) 2508, speed sensor(s) 2536, steering sensor(s) 2524, vibration sensor(s) 2534, and/or one or more sensors of the brake sensor system 2532, propulsion system 2526, and/or steering system 2516. The vehicle state data (e.g., speed, orientation, etc.) may be valuable to the machine learning model(s) 2204 in computing the vehicle control(s) 2206 as the vehicle state data may inform the machine learning model(s) 2204 as to what vehicle control(s) 2206 are most useful given the current vehicle state.

For example, the autonomous vehicle 1502 may transfer at least partial control to the remote control system 1506 as a result of encountering a situation, scenario, and/or environment that the autonomous vehicle 1502 is not permitted to handle autonomously (e.g., due to one or more constraints). A remote operator may control the virtual vehicle through the virtual environment, and the control inputs by the remote operator may be represented by control data. The control data may then be encoded or converted to vehicle control data useable by the autonomous vehicle 1502, and the autonomous vehicle 1502 may be controlled through the situation, scenario, and/or environment based on the vehicle control data. Throughout the remote control session, the sensor(s) 1510 of the autonomous vehicle 1502 may generate sensor data 2202. The sensor data 2202 (e.g., image data and/or vehicle state data) may be input into the machine learning model(s) 2204, and the machine learning model(s) 2204 may learn (e.g. using ground truth control data) the vehicle control(s) 2206 for navigating the situation, scenario, and/or environment, and/or similar situations, scenarios, and/or environments, such that during a next occurrence, the autonomous vehicle 1502 may be able to navigate itself through the situation, scenario, and/or environment without the need for the remote control system 1506.

The machine learning model(s) 2204 may include any type of machine learning model(s), such as machine learning models using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short terms memory, Hopfield, Boltzmann, deep belief, deconvolutional, generative adversarial, liquid state machine, etc.), and/or other types of machine learning models.

Figure 23:
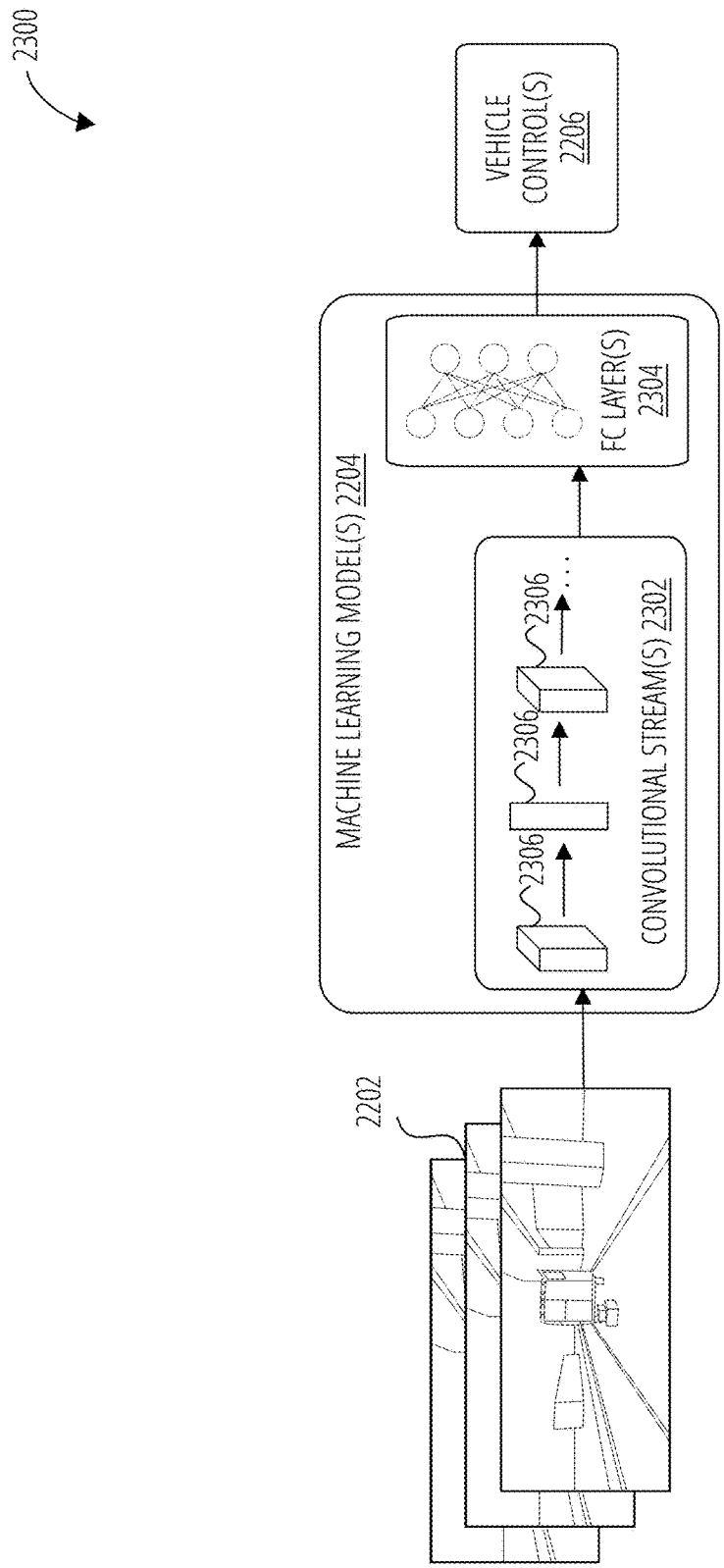
FIG. 23 illustrates a process 2300 in accordance with one embodiment.

Now referring to FIG. 23, FIG. 23 is an example illustration of a machine learning model(s) for training an autonomous vehicle according to the process of FIG. 22, in accordance with some embodiments of the present disclosure. The machine learning model(s) 2204 of FIG. 23 may be one example of a machine learning model(s) that may be used in the process 2200. However, the machine learning model(s) 2204 of FIG. 23 is not intended to be limiting, and the machine learning model(s) 2204 may include additional and/or different machine learning models than the machine learning model(s) 2204 of FIG. 23. The machine learning model(s) 2204 of FIG. 23 may include a convolutional neural network and thus may alternatively be referred to herein as convolutional neural network or convolutional network.

The convolutional network includes the sensor data 2202 representative of one or more images generated based on image data from one or more camera(s) of the autonomous vehicle 1502. In some examples, the convolutional network may also include other inputs as sensor data, such as LIDAR data, RADAR data, vehicle state data, etc. The sensor data 2202 may be input into convolutional stream(s) 2302 of the convolutional network. For example, sensor data from each sensor (e.g., where two or more sensors are used) may be input its own convolutional stream(s) 2302.

A convolutional stream(s) 2302 may include any number of layers, such as the layers 2306. One or more of the layers may include an input layer. The input layer may hold values associated with the sensor data. For example, the input layer may hold values representative of the raw pixel values of the image(s) input to the convolutional network as a volume (e.g., a width, a height, and color channels (e.g., RGB), such as 32×32×3).

One or more layers may include convolutional layers. The convolutional layers may compute the output of neurons that are connected to local regions in an input layer (e.g., the input layer), each computing a dot product between their weights and a small region they are connected to in the input volume. A result of the convolutional layers may be another volume, with one of the dimensions based at least in part on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include a fully connected layer. Each neuron in the fully connected layer(s) may be connected to each of the neurons in the previous volume. The fully connected layer may compute class scores, and the resulting volume may be 1×1×number of classes. In some examples, the convolutional stream(s) 2302 may include a fully connected layer, while in other examples, a fully connected fully connected layer(s) 2304 of the convolutional network 504 may be the fully connected layer for the convolutional stream(s) 2302.

Although input layers, convolutional layers, pooling layers, ReLU layers, and fully connected layers are discussed herein with respect to the convolutional stream(s) 2302, this is not intended to be limiting. For example, additional or alternative layers may be used in the convolutional stream(s) 2302, such as normalization layers, SoftMax layers, and/or other layer types. Further, the order and number of layers of the convolutional network and/or the convolutional stream(s) 2302 is not limited to any one architecture.

In addition, some of the layers may include parameters (e.g., weights), such as the convolutional layers and the fully connected layers, while others may not, such as the ReLU layers and pooling layers. In some examples, the parameters may be learned by the convolutional stream(s) 2302 and/or the fully connected layer(s) 2304 during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited, and may differ depending on the embodiment.

The output of the convolutional stream(s) 2302 may be input to the fully connected layer(s) 2304 of the convolutional network. In addition to the output of the convolutional stream(s) 2302, variable(s), at least some of which may be representative of the vehicle state, may be input to the fully connected layer(s) 2304.

The machine learning model(s) 2204 may be trained using example control data (e.g., vehicle control data, trajectories, etc.) as ground truth data and/or sensor data 2202 for given inputs to the machine learning model(s) 2204. In some examples, the control data may be based on the control inputs to the remote control(s) 1514 of the remote control system 1506, and/or based on the vehicle control data generated as a result of the control inputs. In some examples, the training data may correspond to a virtual vehicle, such as a vehicle driven in a virtual simulation comprising a virtual environment.

Figure 24:
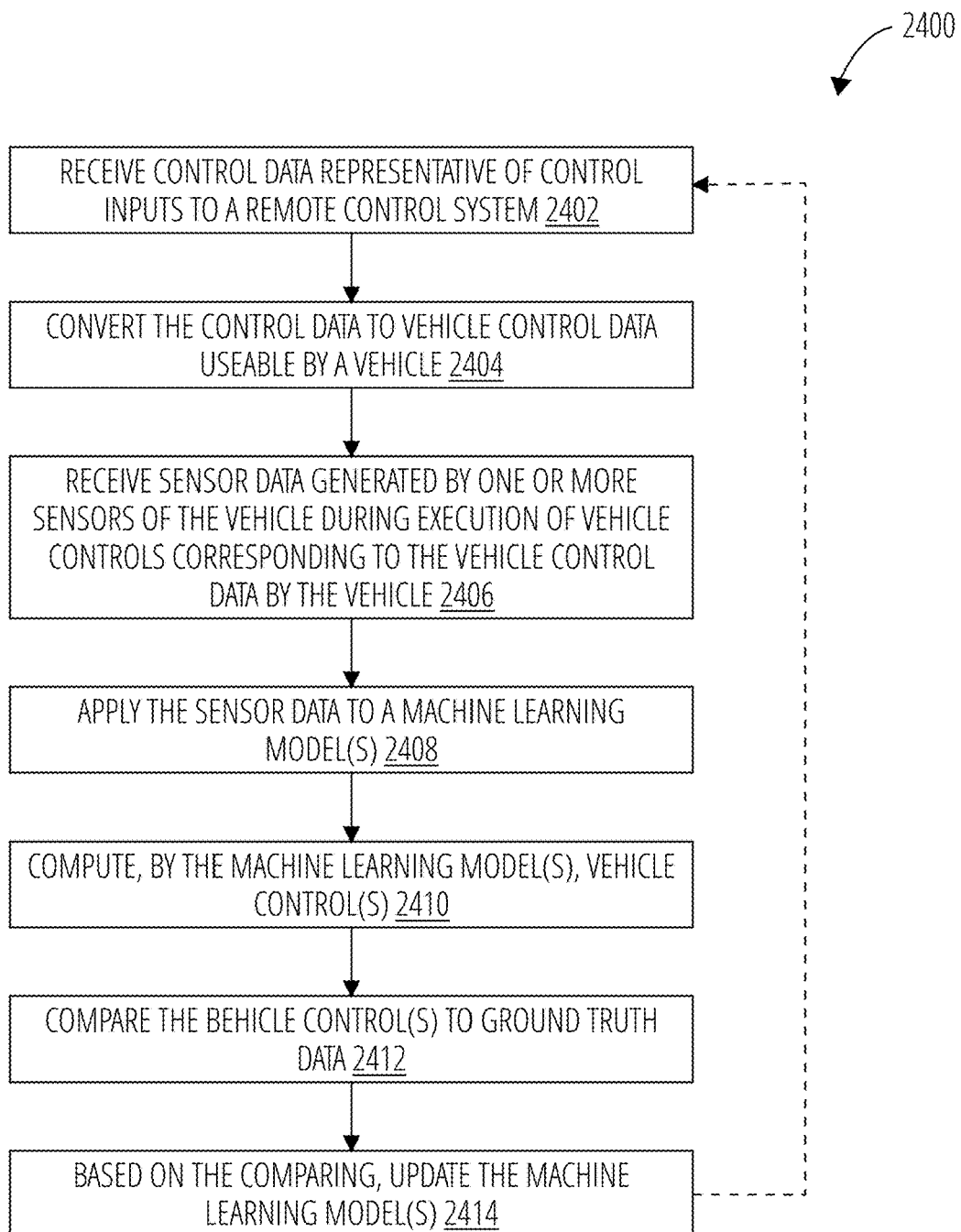
FIG. 24 illustrates a method 2400 in accordance with one embodiment.

Now referring to FIG. 24, each block of method 2400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 2400 may be executed by any one system, or any combination of systems, including but not limited to those described herein.

FIG. 24 is an example flow diagram for a method 2400 of training an autonomous vehicle using a machine learning model(s), in accordance with some embodiments of the present disclosure. The method 2400, at block 2402, includes receiving control data supplied from a remote control system representative of control inputs. For example, control data representative of control inputs supplied by a remote control system 1506 may be received (e.g., by the remote control system 1506, by a model training server(s), by the autonomous vehicle 1502, etc.).

The method 2400, at block 2404, includes converting the control data to vehicle control data usable by a vehicle. For example, the control data may be converted to vehicle control data that is useable by a vehicle (e.g., by the autonomous vehicle 1502).

The method 2400, at block 2406 includes receiving sensor data generated by one or more sensors of the vehicle during executing of vehicle controls corresponding to the vehicle control data by the vehicle. For example, sensor data may be received (e.g., by the remote control system 1506, the model training server(s), the autonomous vehicle 1502, etc.), where the sensor data is or was generated during execution of vehicle controls corresponding to the vehicle control data. The vehicle controls may be the controls from the control component(s) 1610, the planning component(s) 1608, the actuation component(s) 1614, the steering component(s) 1628, the braking component(s) 1630, the acceleration component(s) 1632, and/or other components of the autonomous vehicle 1502 (and/or another vehicle or object).

The method 2400, at block 2408, includes applying the vehicle control data and/or the sensor data to a machine learning model(s). For example, the sensor data (e.g., image data, LIDAR data, SONAR data, vehicle state data, etc.) may be applied to the machine learning model(s) (e.g., the machine learning model(s) 2204 of FIG. 22 and FIG. 23). In some examples, the sensor data may be applied to the machine learning model(s) and the vehicle control data may be used as ground truth data to train the machine learning model(s).

The method 2400, at block 2410, includes computing, by the machine learning model(s), vehicle control(s). For example, the machine learning model(s) may compute vehicle control(s) (e.g., represented as vehicle control data) that correspond to the sensor data.

The method 2400, at block 2412, includes comparing the vehicle control(s) to ground truth data. For example, the ground truth data may include the vehicle control data and/or paths or trajectories through the environment as labeled or annotated within the representations of the sensor data (e.g., the images).

The method 2400, at block 2414, includes, based on the comparing at block 2412, updating the machine learning model(s). For example, the parameters (e.g., weights, biases, etc.) of the machine learning model(s) may be updated (e.g., using backpropagation, parameter updates, etc.). This process may repeat until the machine learning model(s) has acceptable or desirable accuracy.

As a result of the method 2400, the machine learning model(s) may be trained such that the machine learning model(s), once deployed, may take sensor data as an input and generate vehicle control(s) for navigating through environments, situations, and/or scenarios without the need for remote control. As such, over time, the remote control system 1506 may be used to train the autonomous vehicle 1502 (and/or other vehicles or objects) how to navigate different types of scenarios, situations, and/or environments until the need for remote control, or a remote control system 1506, may become unnecessary.

Figure 25:
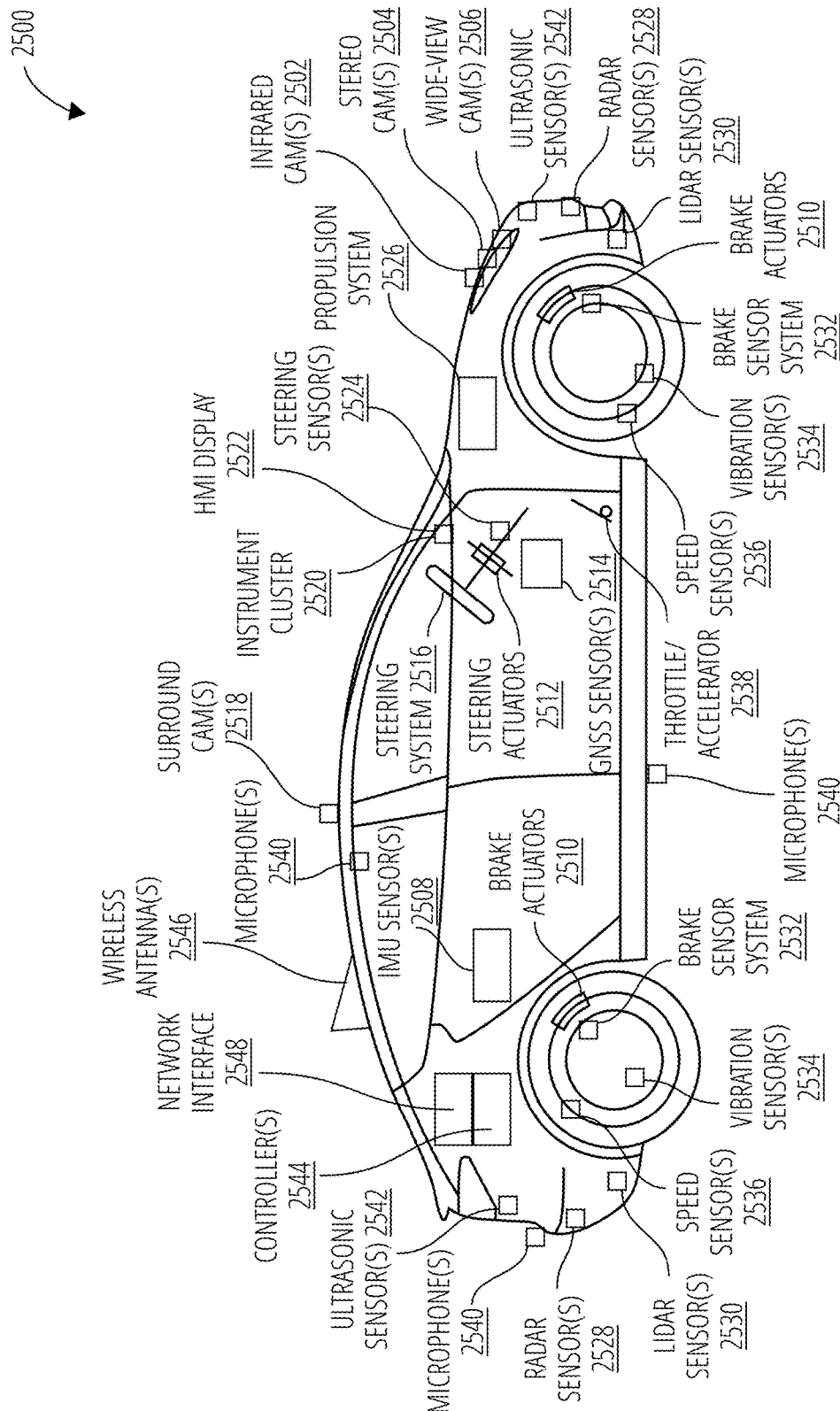
FIG. 25 illustrates an example autonomous vehicle 2500 in accordance with one embodiment.

FIG. 25 is an illustration of an example autonomous vehicle 2500, in accordance with some embodiments of the present disclosure. The autonomous vehicle 1502 may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The autonomous vehicle 1502 may be capable of functionality in accordance with one or more of Level 3-Level 5 of the autonomous driving levels. For example, the autonomous vehicle 1502 may be capable of conditional automation (Level 3), high automation (Level 4), and/or full automation (Level 5), depending on the embodiment.

The autonomous vehicle 1502 may include components such as a chassis, a vehicle body, wheels (e.g., 2, 4, 6, 8, 18, etc.), tires, axles, and other components of a vehicle. The autonomous vehicle 1502 may include a propulsion system 2526, such as an internal combustion engine, hybrid electric power plant, an all-electric engine, and/or another propulsion system type. The propulsion system 2526 may be connected to a drive train of the autonomous vehicle 1502, which may include a transmission, to enable the propulsion of the autonomous vehicle 1502. The propulsion system 2526 may be controlled in response to receiving signals from the throttle/accelerator(s) 2538.

A steering system 2516, which may include a steering wheel, may be used to steer the autonomous vehicle 1502 (e.g., along a desired path or route) when the propulsion system 2526 is operating (e.g., when the vehicle is in motion). The steering system 2516 may receive signals from steering actuators 2512. The steering wheel may be optional for full automation (Level 5) functionality.

The brake sensor system 2532 may be used to operate the vehicle brakes in response to receiving signals from the brake actuators 2510 and/or brake sensors.

Controller(s) 2544, which may include one or more systems on chips (SoC(s) 2702) (FIG. 27) and/or GPU(s), may provide signals (e.g., representative of commands) to one or more components and/or systems of the autonomous vehicle 1502. For example, the controller(s) may send signals to operate the vehicle brakes via one or more brake actuators 2510, to operate the steering system 2516 via one or more steering actuators 2512, to operate the propulsion system 2526 via one or more throttle/accelerator(s) 2538. The controller(s) 2544 may include one or more onboard (e.g., integrated) computing devices (e.g., supercomputers) that process sensor signals, and output operation commands (e.g., signals representing commands) to enable autonomous driving and/or to assist a human driver in driving the autonomous vehicle 1502. The controller(s) 2544 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. In some examples, a single controller may handle two or more of the above functionalities, two or more controller(s) 2544 may handle a single functionality, and/or any combination thereof.

The controller(s) 2544 may provide the signals for controlling one or more components and/or systems of the autonomous vehicle 1502 in response to sensor data received from one or more sensors (e.g., sensor inputs). The sensor data may be received from, for example and without limitation, global navigation satellite systems sensors (GNSS sensor(s) 2514) (e.g., Global Positioning System sensor(s)), RADAR sensor(s) 2528, ultrasonic sensor(s) 2542, LIDAR sensor(s) 2530, inertial measurement unit sensor(s) (IMU sensor(s) 2508) (e.g., accelerometer(s), gyroscope(s), magnetic compass(es), magnetometer(s), etc.), microphone(s) 2540, stereo camera(s) 2504, wide-view camera(s) 2506 (e.g., fisheye cameras), infrared infrared camera(s) 2502, surround camera(s) 2518 (e.g., 360 degree cameras), long-range and/or mid-range camera(s) 2602, speed speed sensor(s) 2536 (e.g., for measuring the speed of the autonomous vehicle 1502), vibration sensor(s) 2534, steering sensor(s) 2524, brake sensor(s) (e.g., as part of the brake sensor system 2532), and/or other sensor types.

One or more of the controller(s) 2544 may receive inputs (e.g., represented by input data) from an instrument cluster 2520 of the autonomous vehicle 1502 and provide outputs (e.g., represented by output data, display data, etc.) via a human-machine interface display (HMI display 2522), an audible annunciator, a loudspeaker, and/or via other components of the autonomous vehicle 1502. The outputs may include information such as vehicle velocity, speed, time, map data (e.g., the HD map 2708 of FIG. 27), location data (e.g., the autonomous vehicle 1502 location, such as on a map), direction, location of other vehicles (e.g., an occupancy grid), information about objects and status of objects as perceived by the controller(s) 2544, etc. For example, the HMI display 2522 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The autonomous vehicle 1502 further includes a network interface 2548 which may use one or more wireless antenna(s) 2546 and/or modem(s) to communicate over one or more networks. For example, the network interface 2548 may be capable of communication over LTE, WCDMA, UMTS, GSM, CDMA2000, etc. The wireless antenna(s) 2546 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 26:
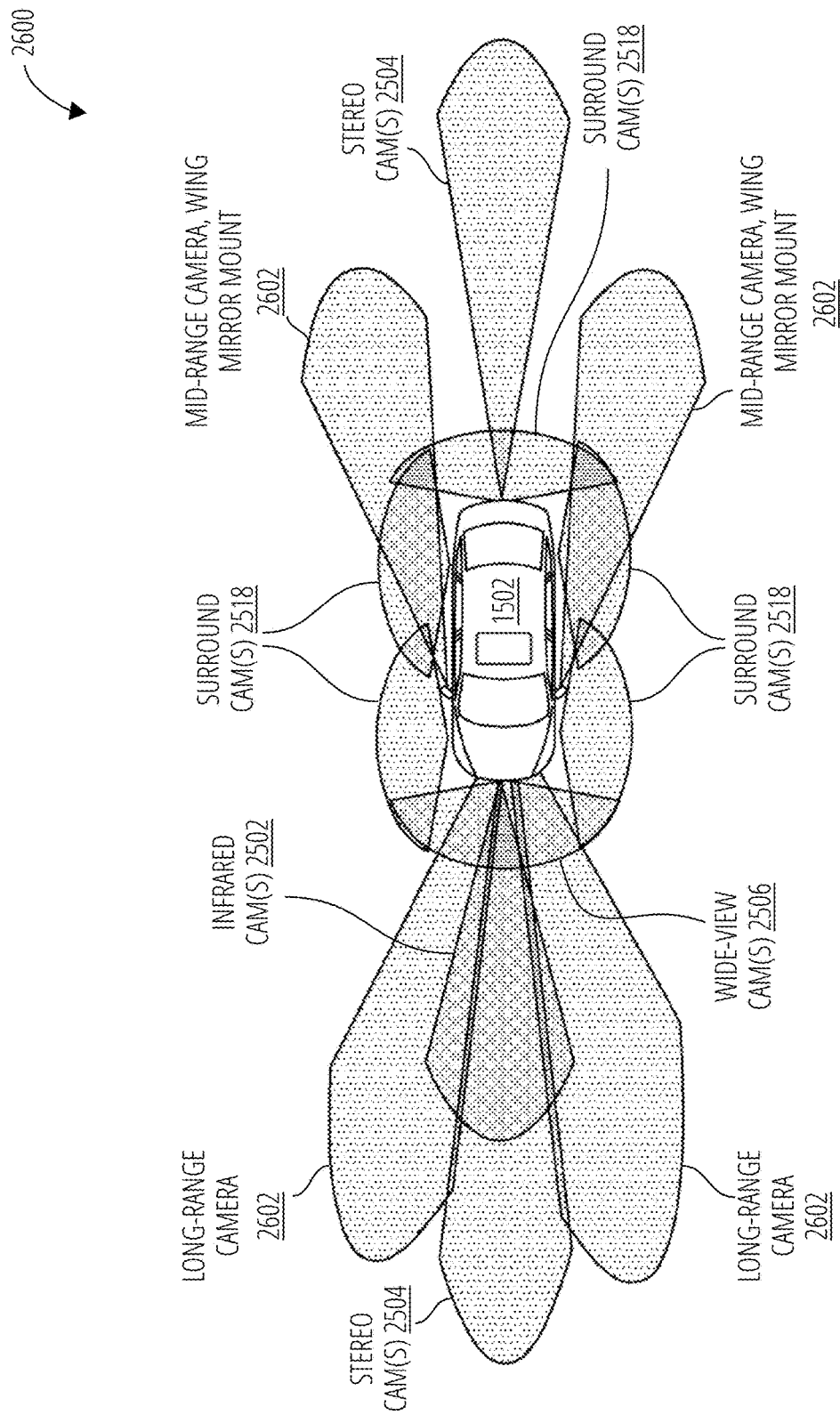
FIG. 26 illustrates a camera locations 2600 in accordance with one embodiment.

FIG. 26 is an example of camera locations and fields of view for the example autonomous vehicle 1502 of FIG. 25, in accordance with some embodiments of the present disclosure. The cameras and respective fields of view are one example embodiment and are not intended to be limiting. For example, additional and/or alternative cameras may be included and/or the cameras may be located at different locations on the autonomous vehicle 1502.

The camera types for the cameras may include, but are not limited to, digital cameras that may be adapted for use with the components and/or systems of the autonomous vehicle 1502. The camera(s) may operate at automotive safety integrity level (ASIL) B and/or at another ASIL. The camera types may be capable of any image capture rate, such as 60 frames per second (fps), 720 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the autonomous vehicle 1502 (e.g., front-facing cameras) may be used for surround view, to help identify forward facing paths and obstacles, as well aid in, with the help of one or more controller(s) 2544 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 2506 that may be used to perceive objects coming into view from the periphery (e.g., pedestrians, crossing traffic or bicycles). Although only one wide-view camera is illustrated in FIG. 26, there may any number of wide-view camera(s) 2506 on the autonomous vehicle 1502. In addition, long-range camera(s) (long-range and/or mid-range camera(s) 2602) (e.g., a long-view stereo camera pair) may be used for depth-based object detection, especially for objects for which a neural network has not yet been trained. The long-range camera(s) may also be used for object detection and classification, as well as basic object tracking.

One or more stereo camera(s) 2504 may also be included in a front-facing configuration. The stereo camera(s) 2504 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. Alternative stereo camera(s) 2504 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 2504 may be used in addition to, or alternatively from, those described herein.

Cameras with a field of view that include portions of the environment to the side of the vehicle 102 (e.g., side-view cameras) may be used for surround view, providing information used to create and update the occupancy grid, as well as to generate side impact collision warnings. For example, surround camera(s) 2518 (e.g., four surround camera(s) 2518 as illustrated in FIG. 26) may be positioned to on the vehicle 102. The surround camera(s) 2518 may include wide-view camera(s) 2506, fisheye camera(s), 360 degree camera(s), and/or the like. Four example, four fisheye cameras may be positioned on the vehicle's front, rear, and sides. In an alternative arrangement, the vehicle may use three surround camera(s) 2518 (e.g., left, right, and rear), and may leverage one or more other camera(s) (e.g., a forward-facing camera) as a fourth surround view camera.

Cameras with a field of view that include portions of the environment to the rear of the autonomous vehicle 1502 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 2602, stereo camera(s) 2504, infrared camera(s) 2502, etc.), as described herein.

Figure 27:
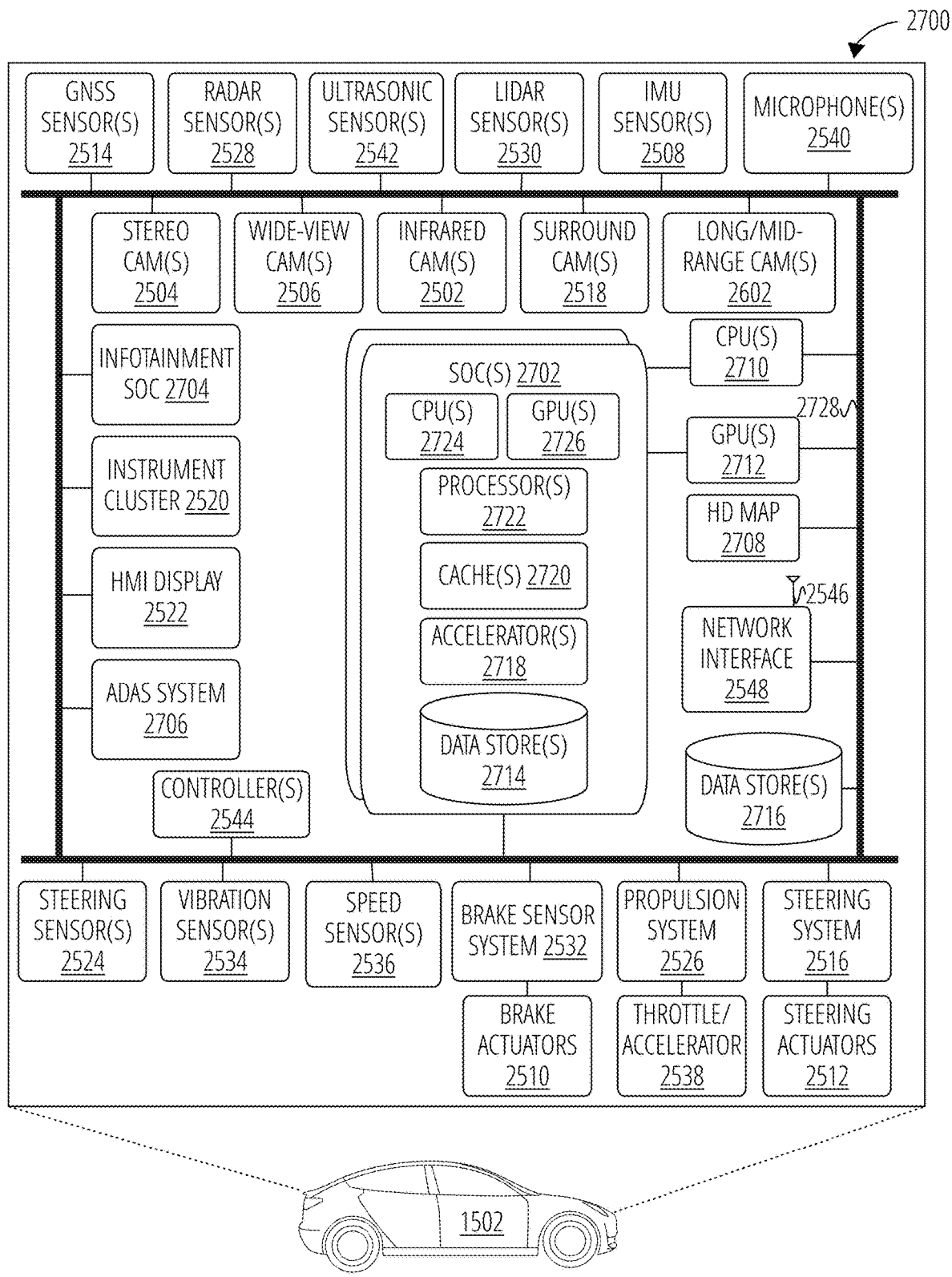
FIG. 27 illustrates a system architecture 2700 in accordance with one embodiment.

FIG. 27 is a block diagram of an example system architecture for the example autonomous vehicle 1502 of FIG. 25, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the autonomous vehicle 1502 in FIG. 27 are illustrated as being connected via bus 2728. The bus 2728 may include a Controller Area Network (CAN) data interface (alternatively referred to herein as a "CAN bus"). A CAN may be a network inside the autonomous vehicle 1502 used to aid in control of various features and functionality of the autonomous vehicle 1502, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 2728 is described herein as being a CAN bus, this is not intended to be limiting. For example, in addition to, or alternatively from, the CAN bus, FlexRay and/or Ethernet may be used. Additionally, although a single line is used to represent the bus 2728, this is not intended to be limiting. For example, there may be any number of busses, which may include one or more CAN busses, one or more FlexRay busses, one or more Ethernet busses, and/or one or more other types of busses using a different protocol. In some examples, two or more busses may be used to perform different functions, and/or may be used for redundancy. For example, a first bus 2728 may be used for collision avoidance functionality and a second bus 2728 may be used for actuation control. In any example, each bus 2728 may communicate with any of the components of the autonomous vehicle 1502, and two or more busses may communicate with the same components. In some examples, each SoC(s) 2702, each of the controller(s) 2544, and/or each computer within the vehicle may have access to the same input data (e.g., inputs from sensors of the autonomous vehicle 1502), and may be connected to a common bus, such the CAN bus.

The autonomous vehicle 1502 may include one or more controller(s) 2544, such as those described herein with respect to FIG. 25. The controller(s) 2544 may be used for a variety of functions. The controller(s) 2544 may be coupled to any of the various other components and systems of the autonomous vehicle 1502, and may be used for control of the autonomous vehicle 1502, artificial intelligence of the autonomous vehicle 1502, infotainment for the autonomous vehicle 1502, and/or the like.

The autonomous vehicle 1502 may include SoC(s) 2702. The SoC(s) 2702 may include CPU(s) 2724, GPU(s) 2726, processor(s) 2722, cache(s) 2720, accelerator(s) 2718, data store(s) 2714, and/or other components and features not illustrated. The SoC(s) 2702 may be used to control the autonomous vehicle 1502 in a variety of platforms and systems. For example, the SoC(s) 2702 may be combined in a system (e.g., the system of the vehicle 102) with an HD map 2708 which may obtain map refreshes and/or updates via a network interface 2548 from one or more servers (e.g., server(s) 2802 of FIG. 28).

The CPU(s) 2724 may include a CPU cluster or CPU complex (alternatively referred to herein as a "CCPLEX"). The CPU(s) 2724 may include multiple cores and/or L2 caches. For example, in some embodiments, the CPU(s) 2724 may include eight cores in a coherent multi-processor configuration. In some embodiments, the CPU(s) 2724 may include four dual-core clusters where each cluster has a dedicated L2 cache (e.g., a 2 MB L2 cache). The CPU(s) 2724 (e.g., the CCPLEX) may be configured to support simultaneous cluster operation enabling any combination of the clusters of the CPU(s) 2724 to be active at any given time.

The CPU(s) 2724 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 2724 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 2726 may include an integrated GPU (alternatively referred to herein as an "iGPU"). The GPU(s) 2726 may be programmable and may be efficient for parallel workloads. The GPU(s) 2726, in some examples, may use an enhanced tensor instruction set. The GPU(s) 2726 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 2726 may include at least eight streaming microprocessors. The GPU(s) 2726 may use compute application programming interface(s) (API(s)). In addition, the GPU(s) 2726 may use one or more parallel computing platforms and/or programming models (e.g., NVIDIA's CUDA).

The GPU(s) 2726 may be power-optimized for best performance in automotive and embedded use cases. For example, the GPU(s) 2726 may be fabricated on a Fin field-effect transistor (FinFET). However, this is not intended to be limiting and the GPU(s) 2726 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 2726 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 2726 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 2726 to access the CPU(s) 2724 page tables directly. In such examples, when the GPU(s) 2726 memory management unit (MMU) experiences a miss, an address translation request may be transmitted to the CPU(s) 2724. In response, the CPU(s) 2724 may look in its page tables for the virtual-to-physical mapping for the address and transmits the translation back to the GPU(s) 2726. As such, unified memory technology may allow a single unified virtual address space for memory of both the CPU(s) 2724 and the GPU(s) 2726, thereby simplifying the GPU(s) 2726 programming and porting of applications to the GPU(s) 2726.

In addition, the GPU(s) 2726 may include an access counter that may keep track of the frequency of access of the GPU(s) 2726 to memory of other processors. The access counter may help ensure that memory pages are moved to the physical memory of the processor that is accessing the pages most frequently.

The SoC(s) 2702 may include any number of cache(s) 2720, including those described herein. For example, the cache(s) 2720 may include an L3 cache that is available to both the CPU(s) 2724 and the GPU(s) 2726 (e.g., that is connected both the CPU(s) 2724 and the GPU(s) 2726). The cache(s) 2720 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 2702 may include one or more accelerator(s) 2718 (e.g., hardware accelerators, software accelerators, or a combination thereof). For example, the SoC(s) 2702 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 2726 and to off-load some of the tasks of the GPU(s) 2726 (e.g., to free up more cycles of the GPU(s) 2726 for performing other tasks). As an example, the accelerator(s) 2718 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 2718 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 2726, and by using an inference accelerator, for example, a designer may target either the DLA(s) or the GPU(s) 2726 for any function. For example, the designer may focus processing of CNNs and floating point operations on the DLA(s) and leave other functions to the GPU(s) 2726 and/or other accelerator(s) 2718.

The accelerator(s) 2718 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 2724. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 2718 (e.g., the hardware acceleration cluster) may include a computer vision network on-chip and SRAM, for providing a high-bandwidth, low latency SRAM for the accelerator(s) 2718. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61506 standards, although other standards and protocols may be used.

In some examples, the SoC(s) 2702 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 2718 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit sensor(s) (IMU sensor(s) 2508) output that correlates with the autonomous vehicle 1502 orientation, distance, 3D location estimates of the object obtained from the neural network and/or other sensors (e.g., LIDAR sensor(s) 2530 or RADAR sensor(s) 2528), among others.

The SoC(s) 2702 may include data store(s) 2714 (e.g., memory). The data store(s) 2714 may be on-chip memory of the SoC(s) 2702, which may store neural networks to be executed on the GPU and/or the DLA. In some examples, the data store(s) 2714 may be large enough in capacity to store multiple instances of neural networks for redundancy and safety. The data store(s) 2714 may comprise L2 or L3 cache(s) 2720. Reference to the data store(s) 2714 may include reference to the memory associated with the PVA, DLA, and/or other accelerator(s) 2718, as described herein.

The SoC(s) 2702 may include one or more processor(s) 2722 (e.g., embedded processors). The processor(s) 2722 may include a boot and power management processor that may be a dedicated processor and subsystem to handle boot power and management functions and related security enforcement. The boot and power management processor may be a part of the SoC(s) 2702 boot sequence and may provide runtime power management services. The boot power and management processor may provide clock and voltage programming, assistance in system low power state transitions, management of SoC(s) 2702 thermals and temperature sensors, and/or management of the SoC(s) 2702 power states. Each temperature sensor may be implemented as a ring-oscillator whose output frequency is proportional to temperature, and the SoC(s) 2702 may use the ring-oscillators to detect temperatures of the CPU(s) 2724, GPU(s) 2726, and/or accelerator(s) 2718. If temperatures are determined to exceed a threshold, the boot and power management processor may enter a temperature fault routine and put the SoC(s) 2702 into a lower power state and/or put the autonomous vehicle 1502 into a chauffeur to safe stop mode (e.g., bring the autonomous vehicle 1502 to a safe stop).

The processor(s) 2722 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 2722 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 2722 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 2722 may further include a real-time camera engine that may include a dedicated processor subsystem for handling real-time camera management.

The processor(s) 2722 may further include a high-dynamic range signal processor that may include an image signal processor that is a hardware engine that is part of the camera processing pipeline.

The processor(s) 2722 may include a video image compositor that may be a processing block (e.g., implemented on a microprocessor) that implements video post-processing functions needed by a video playback application to produce the final image for the player window. The video image compositor may perform lens distortion correction on wide-view camera(s) 2506, surround camera(s) 2518, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 2726 is not required to continuously render new surfaces. Even when the GPU(s) 2726 is powered on and active doing 3D rendering, the video image compositor may be used to offload the GPU(s) 2726 to improve performance and responsiveness.

The SoC(s) 2702 may further include a mobile industry processor interface (MIPI) camera serial interface for receiving video and input from cameras, a high-speed interface, and/or a video input block that may be used for camera and related pixel input functions. The SoC(s) 2702 may further include an input/output controller(s) that may be controlled by software and may be used for receiving I/O signals that are uncommitted to a specific role.

The SoC(s) 2702 may further include a broad range of peripheral interfaces to enable communication with peripherals, audio codecs, power management, and/or other devices. The SoC(s) 2702 may be used to process data from cameras (e.g., connected over Gigabit Multimedia Serial Link and Ethernet), sensors (e.g., LIDAR sensor(s) 2530, RADAR sensor(s) 2528, etc. that may be connected over Ethernet), data from bus 2728 (e.g., speed of autonomous vehicle 1502, steering wheel position, etc.), data from GNSS sensor(s) 2514 (e.g., connected over Ethernet or CAN bus). The SoC(s) 2702 may further include dedicated high-performance mass storage controllers that may include their own DMA engines, and that may be used to free the CPU(s) 2724 from routine data management tasks.

The SoC(s) 2702 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 2702 may be faster, more reliable, and even more energy-efficient and space-efficient than conventional systems. For example, the accelerator(s) 2718, when combined with the CPU(s) 2724, the GPU(s) 2726, and the data store(s) 2714, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 2712) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 2726.

In some examples, a CNN for facial recognition and vehicle owner identification may use data from camera sensors to identify the presence of an authorized driver and/or owner of the autonomous vehicle 1502. The always on sensor processing engine may be used to unlock the vehicle when the owner approaches the driver door and turn on the lights, and, in security mode, to disable the vehicle when the owner leaves the vehicle. In this way, the SoC(s) 2702 provide for security against theft and/or carjacking.

In another example, a CNN for emergency vehicle detection and identification may use data from microphone(s) 2540 to detect and identify emergency vehicle sirens. In contrast to conventional systems, that use general classifiers to detect sirens and manually extract features, the SoC(s) 2702 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 2514. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensor(s) 2542, until the emergency vehicle(s) passes.

The vehicle may include a CPU(s) 2710 (e.g., discrete CPU(s), or dCPU(s)), that may be coupled to the SoC(s) 2702 via a high-speed interconnect (e.g., PCIe). The CPU(s) 2710 may include an X86 processor, for example. The CPU(s) 2710 may be used to perform any of a variety of functions, including arbitrating potentially inconsistent results between ADAS sensors and the SoC(s) 2702, and/or monitoring the status and health of the controller(s) 2544 and/or infotainment SoC 2704, for example.

The autonomous vehicle 1502 may include a GPU(s) 2712 (e.g., discrete GPU(s), or dGPU(s)), that may be coupled to the SoC(s) 2702 via a high-speed interconnect (e.g., NVIDIA's NVLINK). The GPU(s) 2712 may provide additional artificial intelligence functionality, such as by executing redundant and/or different neural networks, and may be used to train and/or update neural networks based on input (e.g., sensor data) from sensors of the autonomous vehicle 1502.

The autonomous vehicle 1502 may further include the network interface 2548 which may include one or more wireless antenna(s) 2546 (e.g., one or more wireless antennas for different communication protocols, such as a cellular antenna, a Bluetooth antenna, etc.). The network interface 2548 may be used to enable wireless connectivity over the Internet with the cloud (e.g., with the server(s) 2802 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the autonomous vehicle 1502 information about vehicles in proximity to the autonomous vehicle 1502 (e.g., vehicles in front of, on the side of, and/or behind the autonomous vehicle 1502). This functionality may be part of a cooperative adaptive cruise control functionality of the autonomous vehicle 1502.

The network interface 2548 may include a SoC that provides modulation and demodulation functionality and enables the controller(s) 2544 to communicate over wireless networks. The network interface 2548 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The autonomous vehicle 1502 may further include data store(s) 2716 which may include off-chip (e.g., off the SoC(s) 2702) storage. The data store(s) 2716 may include one or more storage elements including RAM, SRAM, DRAM, VRAM, Flash, hard disks, and/or other components and/or devices that may store at least one bit of data.

The autonomous vehicle 1502 may further include GNSS sensor(s) 2514. The GNSS sensor(s) 2514 (e.g., GPS and/or assisted GPS sensors), to assist in mapping, perception, occupancy grid generation, and/or path planning functions. Any number of GNSS sensor(s) 2514 may be used, including, for example and without limitation, a GPS using a USB connector with an Ethernet to Serial (RS-232) bridge.

The vehicle 102 may further include RADAR sensor(s) 2528. The RADAR sensor(s) 2528 may be used by the vehicle 102 for long-range vehicle detection, even in darkness and/or severe weather conditions. RADAR functional safety levels may be ASIL B. The RADAR sensor(s) 2528 may use the CAN and/or the bus 2728 (e.g., to transmit data generated by the RADAR sensor(s) 2528) for control and to access object tracking data, with access to Ethernet to access raw data in some examples. A wide variety of RADAR sensor types may be used. For example, and without limitation, the RADAR sensor(s) 2528 may be suitable for front, rear, and side RADAR use. In some example, Pulse Doppler RADAR sensor(s) are used.

The RADAR sensor(s) 2528 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 2528 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's surroundings at higher speeds with minimal interference from traffic in adjacent lanes. The other two antennae may expand the field of view, making it possible to quickly detect vehicles entering or leaving the vehicle's lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The autonomous vehicle 1502 may further include ultrasonic sensor(s) 2542. The ultrasonic sensor(s) 2542, which may be positioned at the front, back, and/or the sides of the autonomous vehicle 1502, may be used for park assist and/or to create and update an occupancy grid. A wide variety of ultrasonic sensor(s) 2542 may be used, and different ultrasonic sensor(s) 2542 may be used for different ranges of detection (e.g., 2.5 m, 4 m). The ultrasonic sensor(s) 2542 may operate at functional safety levels of ASIL B.

The autonomous vehicle 1502 may include LIDAR sensor(s) 2530. The LIDAR sensor(s) 2530 may be used for object and pedestrian detection, emergency braking, collision avoidance, and/or other functions. The LIDAR sensor(s) 2530 may be functional safety level ASIL B. In some examples, the autonomous vehicle 1502 may include multiple LIDAR sensor(s) 2530 (e.g., two, four, six, etc.) that may use Ethernet (e.g., to provide data to a Gigabit Ethernet switch).

In some examples, the LIDAR sensor(s) 2530 may be capable of providing a list of objects and their distances for a 360-degree field of view. Commercially available LIDAR sensor(s) 2530 may have an advertised range of approximately 102m, with an accuracy of 2 cm-3 cm, and with support for a 102 Mbps Ethernet connection, for example. In some examples, one or more non-protruding LIDAR sensor(s) 2530 may be used. In such examples, the LIDAR sensor(s) 2530 may be implemented as a small device that may be embedded into the front, rear, sides, and/or corners of the autonomous vehicle 1502. The LIDAR sensor(s) 2530, in such examples, may provide up to a 720-degree horizontal and 35-degree vertical field-of-view, with a 200 m range even for low-reflectivity objects. Front-mounted LIDAR sensor(s) 2530 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the autonomous vehicle 1502. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 2530 may be less susceptible to motion blur, vibration, and/or shock.

The vehicle may further include IMU sensor(s) 2508. The IMU sensor(s) 2508 may be located at a center of the rear axle of the autonomous vehicle 1502, in some examples. The IMU sensor(s) 2508 may include, for example and without limitation, an accelerometer(s), a magnetometer(s), a gyroscope(s), a magnetic compass(es), and/or other sensor types. In some examples, such as in six-axis applications, the IMU sensor(s) 2508 may include accelerometers and gyroscopes, while in nine-axis applications, the IMU sensor(s) 2508 may include accelerometers, gyroscopes, and magnetometers.

In some embodiments, the IMU sensor(s) 2508 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 2508 may enable the autonomous vehicle 1502 to estimate heading without requiring input from a magnetic sensor by directly observing and correlating the changes in velocity from GPS to the IMU sensor(s) 2508. In some examples, the IMU sensor(s) 2508 and the GNSS sensor(s) 2514 may be combined in a single integrated unit.

The vehicle may include microphone(s) 2540 placed in and/or around the autonomous vehicle 1502. The microphone(s) 2540 may be used for emergency vehicle detection and identification, among other things.

The vehicle may further include any number of camera types, including stereo camera(s) 2504, wide-view camera(s) 2506, infrared camera(s) 2502, surround camera(s) 2518, long-range and/or mid-range camera(s) 2602, and/or other camera types. The cameras may be used to capture image data around an entire periphery of the autonomous vehicle 1502. The types of cameras used depends on the embodiments and requirements for the autonomous vehicle 1502, and any combination of camera types may be used to provide the necessary coverage around the autonomous vehicle 1502. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 25 and FIG. 26.

The autonomous vehicle 1502 may further include vibration sensor(s) 2534. The vibration sensor(s) 2534 may measure vibrations of components of the vehicle, such as the axle(s). For example, changes in vibrations may indicate a change in road surfaces. In another example, when two or more vibration sensor(s) 2534 are used, the differences between the vibrations may be used to determine friction or slippage of the road surface (e.g., when the difference in vibration is between a power-driven axle and a freely rotating axle).

The autonomous vehicle 1502 may include an ADAS system 2706. The ADAS system 2706 may include a SoC, in some examples. The ADAS system 2706 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 2528, LIDAR sensor(s) 2530, and/or a camera(s). The ACC systems may include longitudinal ACC and/or lateral ACC. Longitudinal ACC monitors and controls the distance to the vehicle immediately ahead of the vehicle 102 and automatically adjust the vehicle speed to maintain a safe distance from vehicles ahead. Lateral ACC performs distance keeping, and advises the vehicle 102 to change lanes when necessary. Lateral ACC is related to other ADAS applications such as LCA and CWS.

CACC uses information from other vehicles that may be received via the network interface 2548 and/or the wireless antenna(s) 2546 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the autonomous vehicle 1502), while the I2V communication concept provides information about traffic further ahead. CACC systems may include either or both I2V and V2V information sources. Given the information of the vehicles ahead of the autonomous vehicle 1502, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 2528, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 2528, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the autonomous vehicle 1502 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the autonomous vehicle 1502 if the autonomous vehicle 1502 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 2528, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the autonomous vehicle 1502 is backing up. Some RCTW systems include AEB to ensure that the vehicle brakes are applied to avoid a crash. RCTW systems may use one or more rear-facing RADAR sensor(s) 2528, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1502, the autonomous vehicle 1502 itself must, in the case of conflicting results, decide whether to heed the result from a primary computer or a secondary computer (e.g., a first controller or a second controller). For example, in some embodiments, the ADAS system 2706 may be a backup and/or secondary computer for providing perception information to a backup computer rationality module. The backup computer rationality monitor may run a redundant diverse software on hardware components to detect faults in perception and dynamic driving tasks. Outputs from the ADAS system 2706 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 2702.

In other examples, ADAS system 2706 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 2706 may be fed into the primary computer's perception block and/or the primary computer's dynamic driving task block. For example, if the ADAS system 2706 indicates a forward crash warning due to an object immediately ahead, the perception block may use this information when identifying objects. In other examples, the secondary computer may have its own neural network which is trained and thus reduces the risk of false positives, as described herein.

The autonomous vehicle 1502 may further include the infotainment SoC 2704 (e.g., an in-vehicle infotainment system (IVI)). Although illustrated and described as a SoC, the infotainment system may not be a SoC, and may include two or more discrete components. The infotainment SoC 2704 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the autonomous vehicle 1502. For example, the infotainment SoC 2704 may radios, disk players, navigation systems, video players, USB and Bluetooth connectivity, carputers, in-car entertainment, Wi-Fi, steering wheel audio controls, hands free voice control, a heads-up display (HUD), an HMI display 2522, a telematics device, a control panel (e.g., for controlling and/or interacting with various components, features, and/or systems), and/or other components. The infotainment SoC 2704 may further be used to provide information (e.g., visual and/or audible) to a user(s) of the vehicle, such as information from the ADAS system 2706, autonomous driving information such as planned vehicle maneuvers, trajectories, surrounding environment information (e.g., intersection information, vehicle information, road information, etc.), and/or other information.

The infotainment SoC 2704 may include GPU functionality. The infotainment SoC 2704 may communicate over the bus 2728 (e.g., CAN bus, Ethernet, etc.) with other devices, systems, and/or components of the autonomous vehicle 1502. In some examples, the infotainment SoC 2704 may be coupled to a supervisory MCU such that the GPU of the infotainment system may perform some self-driving functions in the event that the primary controller(s) 2544 (e.g., the primary and/or backup computers of the autonomous vehicle 1502) fail. In such an example, the infotainment SoC 2704 may put the autonomous vehicle 1502 into a chauffeur to safe stop mode, as described herein.

The autonomous vehicle 1502 may further include an instrument cluster 2520 (e.g., a digital dash, an electronic instrument cluster, a digital instrument panel, etc.). The instrument cluster 2520 may include a controller and/or supercomputer (e.g., a discrete controller or supercomputer). The instrument cluster 2520 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 2704 and the instrument cluster 2520. In other words, the instrument cluster 2520 may be included as part of the infotainment SoC 2704, or vice versa.

FIG. 28 is a system 2800 diagram for communication between cloud-based server(s) and the example autonomous vehicle 1502 of FIG. 25, in accordance with some embodiments of the present disclosure. The system 2800 may include server(s) 2802, network(s) 1504, and vehicles, including the autonomous vehicle 1502. The server(s) 2802 may include a plurality of GPUs 2808, PCIe switches 2812, and/or CPUs 2816. The GPUs 2808, the CPUs 2816, and the PCIe switches 2812 may be interconnected with high-speed interconnects such as, for example and without limitation, NVLink interfaces 2810 developed by NVIDIA and/or PCIe connections 2814. In some examples, the GPUs 2808 are connected via NVLink and/or NVSwitch SoC and the GPUs 2808 and the PCIe switches 2812 are connected via PCIe interconnects. Although eight GPUs 2808, two CPUs 2816, and two PCIe switches 2812 are illustrated, this is not intended to be limiting. Depending on the embodiment, each of the server(s) 2802 may include any number of GPUs 2808, CPUs 2816, and/or PCIe switches 2812. For example, the server(s) 2802 may each include eight, sixteen, thirty-two, and/or more GPUs 2808.

The server(s) 2802 may receive, over the network(s) 1504 and from the vehicles, image data representative of images showing unexpected or changed road conditions, such as recently commenced road-work. The server(s) 2802 may transmit, over the network(s) 1504 and to the vehicles, neural networks 2806, updated neural networks 2806, and/or 2804, including information regarding traffic and road conditions. The updates to the 2804 may include updates for the HD map 2708, such as information regarding construction sites, potholes, detours, flooding, and/or other obstructions. In some examples, the neural networks 2806, the updated neural networks 2806, and/or the 2804 may have resulted from new training and/or experiences represented in data received from any number of vehicles in the environment, and/or based on training performed at a datacenter (e.g., using the server(s) 2802 and/or other servers).

The server(s) 2802 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 1504, and/or the machine learning models may be used by the server(s) 2802 to remotely monitor the vehicles.

In some examples, the server(s) 2802 may receive data from the vehicles and apply the data to up-to-date real-time neural networks for real-time intelligent inferencing. The server(s) 2802 may include deep-learning supercomputers and/or dedicated AI computers powered by GPUs 2808, such as a DGX and DGX Station machines developed by NVIDIA. However, in some examples, the server(s) 2802 may include deep learning infrastructure that use only CPU-powered datacenters.

The deep-learning infrastructure of the server(s) 2802 may be capable of fast, real-time inferencing, and may use that capability to evaluate and verify the health of the processors, software, and/or associated hardware in the autonomous vehicle 1502. For example, the deep-learning infrastructure may receive periodic updates from the autonomous vehicle 1502, such as a sequence of images and/or objects that the autonomous vehicle 1502 has located in that sequence of images (e.g., via computer vision and/or other machine learning object classification techniques). The deep-learning infrastructure may run its own neural network to identify the objects and compare them with the objects identified by the autonomous vehicle 1502 and, if the results do not match and the infrastructure concludes that the AI in the autonomous vehicle 1502 is malfunctioning, the server(s) 2802 may transmit a signal to the autonomous vehicle 1502 instructing a fail-safe computer of the autonomous vehicle 1502 to assume control, notify the passengers, and complete a safe parking maneuver.

For inferencing, the server(s) 2802 may include the GPUs 2808 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

"Logic" is used herein to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method for modifying the behavioral logic of an autonomous vehicle, the method comprising:
    assigning a narrowness metric to each of one or more paths in a driving scenario, a path comprising a sequence of driving states of the autonomous vehicle;
    wherein the narrowness metric for a particular state in a path is determined based on a number of child states of the particular state;
    assigning an effort metric to the paths;
    assigning an amount of time for action by the autonomous vehicle to avoid collision along the paths; and
    updating the behavioral logic of the autonomous vehicle based on a scoring of the paths determined from an inverse of the narrowness metric, the effort metric, and the time for action.

2. The method of claim 1, wherein each node of the paths is assigned a node effort metric.

3. The method of claim 2, wherein:
    the effort metric of a path is a sum of the node effort metrics for the path; and
    the node effort metric is determined as a sum of steering and acceleration values to reach the node from a parent node of the path.

4. The method of claim 1, wherein the paths are generated by introducing perturbations into the driving scenario.

5. A non-transitory computer-readable storage medium, the computer-readable storage medium including instructions that when executed by a computer, cause the computer to:
    characterize a path in a driving scenario according to narrowness and effort of the path;
    wherein the narrowness of the path is determined by a number of children at each node of the path;

assign to each node of the path a minimum amount of time for action by a vehicle to avoid collision from the node; and apply the narrowness, effort, and minimum time for action to simulate the path in the computer.

6. The computer-readable storage medium of claim 5, the computer-readable storage medium including instructions that when executed by a computer, cause the computer to:
score the path based at least in part on the effort of the path.

7. A method for computer simulation of a driving scenario for an autonomous vehicle, the method comprising:
configuring the driving scenario with a set of road descriptors on which a set of actors operate, each actor assigned a behavioral policy, and wherein at least one actor is the autonomous vehicle;
deriving a multivariate metric for a number of safe driving paths in the driving scenario;
assigning a narrowness metric to each of the paths in the driving scenario, wherein the narrowness metric is determined based on a number of child nodes of each node of the path;
assigning an effort metric to nodes of the paths; and
assigning to each node a minimum amount of time for action by the autonomous vehicle to avoid collision from the node;
executing the driving scenario on the paths in the computer simulation; and
improving a behavioral policy of the autonomous vehicle based on results of the computer simulation.

8. The method of claim 7 further comprising:
generating unsafe paths into the driving scenario by introducing perturbations into the driving scenario.

9. The method of claim 7 further comprising:
scoring the driving scenario based on performance of the autonomous vehicle in the computer simulation;
prioritizing the driving scenario based on the scoring; and
applying the prioritization to improve the behavioral policy of the autonomous vehicle.

10. The method of claim 7 wherein the effort for a path is computed as a sum of node efforts in the path.

11. The method of claim 7 wherein the multivariate metric comprises:
a total number of paths to evaluate from a beginning of the driving scenario to an end of the driving scenario, wherein the total number of paths forms a tree comprising branches;
a number of no-collision driving paths from the beginning of the driving scenario to the end of the driving scenario;
an average effort for the no-collision driving paths;
a minimum no-collision driving path effort;
a minimum amount of time before a collision occurs in a branch of the tree comprising at least one no-collision driving path; and
an average of a minimum number of branches of the tree along each no-collision driving path.

12. The method of claim 7 wherein:
a rate of change of a state of an actor is defined as a control policy represented by $$f = \frac{ds}{dt} = \left[ a \frac{v \tan(\delta)}{L} \right]$$

wherein a is an acceleration of the actor, $\delta$ is a steering angle of the actor, L is a wheelbase of the actor, and v is a scalar velocity of the actor.

13. The method of claim 7 further comprising:
identifying a control policy for an unsafe actor A;
applying the control policy for the unsafe actor to generate a trajectory that minimizes an objective function $\gamma$ represented by
$\gamma_{AE} = D_{AE}^2 = \|x_A - x_E\|_2^2 = (x_{iA} - x_{iE})^2 + (x_{jA} - x_{jE})^2$ wherein a position of actors A and E in the driving scenario is defined by a vector $x = [x_i\ x_j]$ of Cartesian coordinates and wherein a square of a Euclidean distance between the unsafe actor and an autonomous vehicle E is minimized.

14. The method of claim 13, wherein:
reducing the objective function with time based on a constraint on a derivative of $\gamma AE$ such that $$\frac{\partial \gamma_{AE}}{\partial t} < 0.$$

15. The method of claim 14, wherein the constraint is applied such that the autonomous vehicle does not react to the unsafe actor and therefore the control policy of the autonomous vehicle is fixed.

16. The method of claim 15 wherein the constraint is relaxed on condition that the autonomous vehicle applies Safety Force Field (SFF).

17. The method of claim 7 wherein the behavioral policy for an actor is represented by:
$\beta_1 \alpha_A + \beta_2 \tan(\delta_A) < \text{const}$ where a is acceleration of the actor, and $\delta$ is a steering angle for the actor.

18. The method of claim 17 wherein additional constraints are placed on a maximum value of the steering angle and the acceleration.

19. The method of claim 7 further comprising the application of a plurality of modes, wherein:
a first mode for selecting a control policy for an unsafe actor comprises a policy with maximum acceleration and maximum steering;
a second mode for selecting the control policy for the unsafe actor comprises a policy with maximum acceleration and minimum steering; and
a third mode for selecting the control policy for the unsafe actor comprises a policy with maximum steering and minimum acceleration.

20. The method of claim 19 wherein the first mode comprises a maximum effort for creating an unsafe driving scenario.

21. The method of claim 19 further comprising a fourth mode for selecting the control policy for the unsafe actor, the fourth mode comprising a minimum effort for creating an unsafe driving scenario.

* * * * *